United States Patent [19]
Atkins

[11] Patent Number: 5,875,437
[45] Date of Patent: *Feb. 23, 1999

[54] SYSTEM FOR THE OPERATION AND MANAGEMENT OF ONE OR MORE FINANCIAL ACCOUNTS THROUGH THE USE OF A DIGITAL COMMUNICATION AND COMPUTATION SYSTEM FOR EXCHANGE, INVESTMENT AND BORROWING

[75] Inventor: Charles Agee Atkins, Charleston, S.C.

[73] Assignee: Proprietary Financial Products, Inc., Charleston, S.C.

[ * ] Notice: The term of this patent shall not extend beyond the expiration date of Pat. No. 5,644,727.

[21] Appl. No.: 842,589

[22] Filed: Apr. 15, 1997

Related U.S. Application Data

[63] Continuation of Ser. No. 350,442, Dec. 6, 1994, Pat. No. 5,644,727, which is a continuation-in-part of Ser. No. 780,590, Oct. 23, 1991, abandoned, which is a continuation-in-part of Ser. No. 686,319, Apr. 16, 1991, which is a continuation of Ser. No. 408,173, Sep. 15, 1989, abandoned, which is a continuation of Ser. No. 38,817, Apr. 15, 1987, Pat. No. 4,953,085.

[51] Int. Cl.$^6$ ........................................... G06F 19/00
[52] U.S. Cl. ............................................................. 705/40
[58] Field of Search ................................... 705/40, 38, 39

[56] References Cited

U.S. PATENT DOCUMENTS

| | | | |
|---|---|---|---|
| 4,376,442 | 3/1983 | Musmanno | 705/36 |
| 4,376,978 | 3/1983 | Musmanno | 705/36 |
| 4,597,046 | 6/1986 | Masmanno | 705/36 |
| 4,774,663 | 9/1988 | Musmanno | 705/36 |
| 5,644,727 | 7/1997 | Atkins | 705/40 |
| 5,910,676 | 3/1990 | Aldredge | 705/37 |

*Primary Examiner*—Donald E. McElheny, Jr.
*Attorney, Agent, or Firm*—Pennie & Edmonds LLP

[57] ABSTRACT

A practical communication and computer based system and method for effecting exchange, investment and borrowing involves the use of digital communication and computation terminals distributed to users and service providers. Through the system described and its combined computer and communication terminals, client/customers may purchase goods and services, save, invest, track bonuses and rebates and effect enhanced personal financial analysis, planning, management and record keeping with less effort and increased convenience. Through a prioritization function, the client specifies her financial objectives, her risk preference, and budgetary constraints. The prioritization function automatically suggests to the individual a portfolio of asset and liability accounts that may be credited and/or debited to provide the required funds for consumption and to form investments and borrowing to best realize her financial objectives over a defined time horizon. If desired, the system automatically manages a client's budgetary and financial affairs through a system of expert sweeps based on a client's preferences. The client's accounts are monitored via a borrowing power baseline, and considered imbalanced if the client's borrowing power is less than the minimum borrowing power. If the account is imbalanced, the client may reallocate the assets and liabilities within the client account and/or modify a set of constraints on the client account. If the client account is still not balanced after modification of the account, the system will deny authorization for certain requested transactions, and may initiate the liquidation of certain asset accounts and reduce the balances of one or more liability accounts.

23 Claims, 38 Drawing Sheets

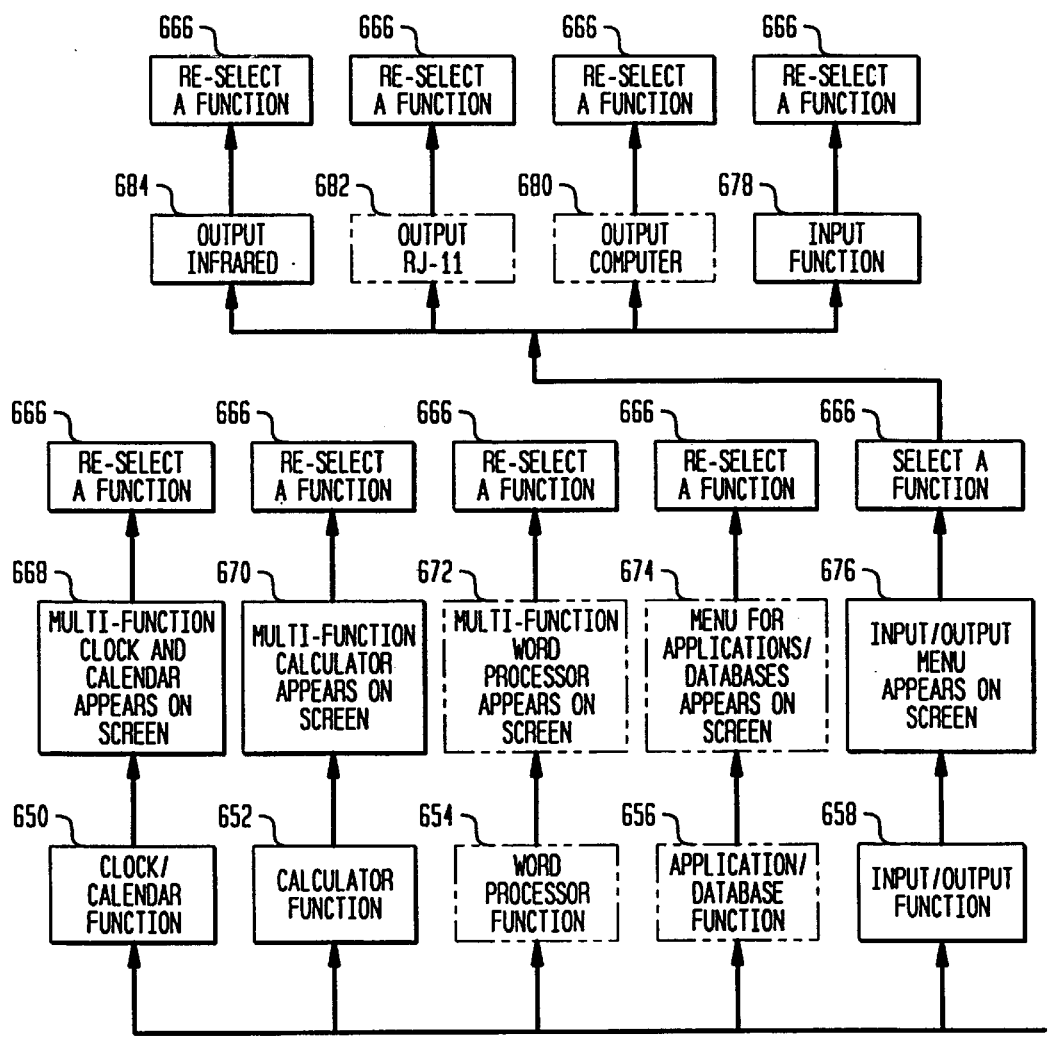
FIG. 15A1

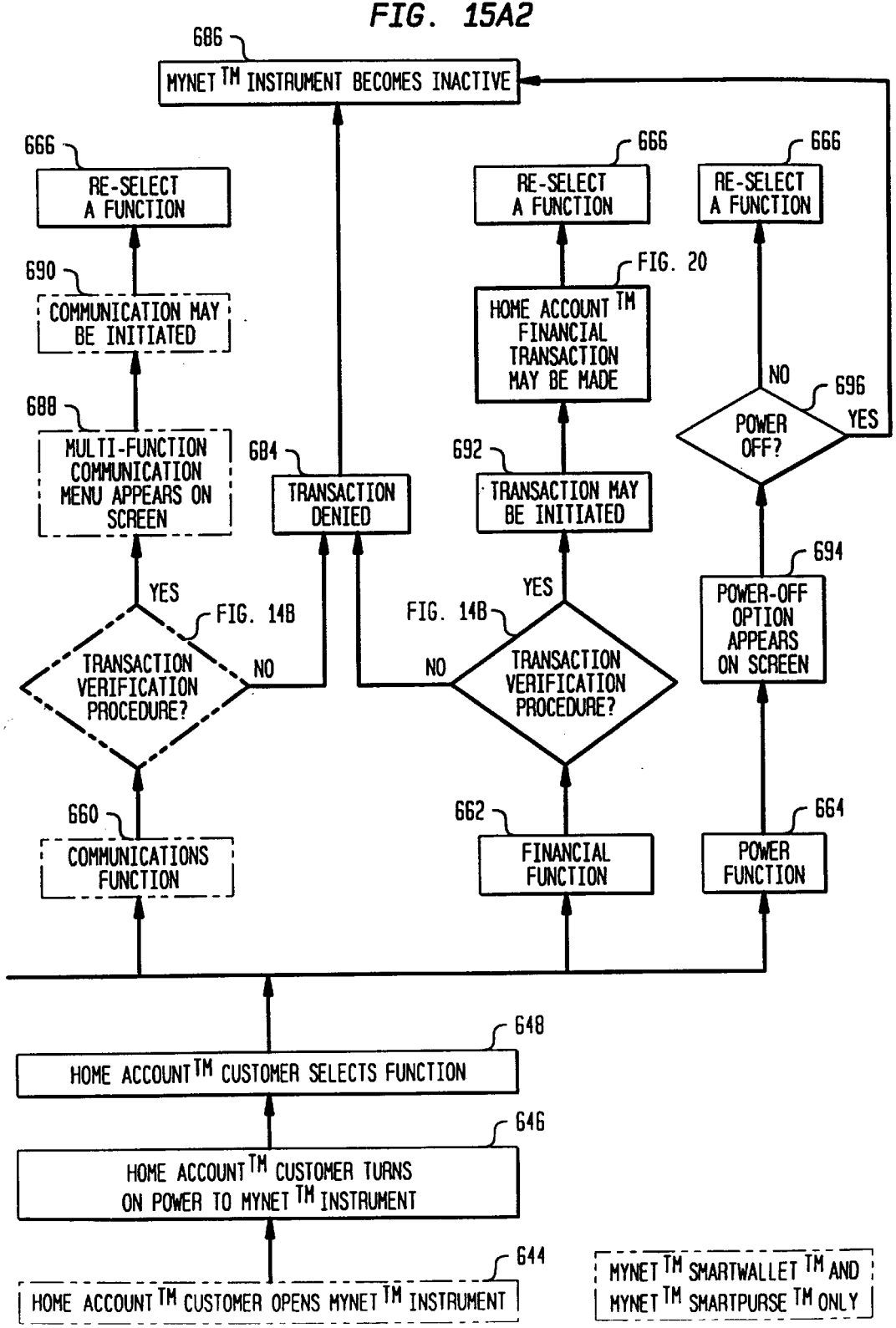
FIG. 15A2

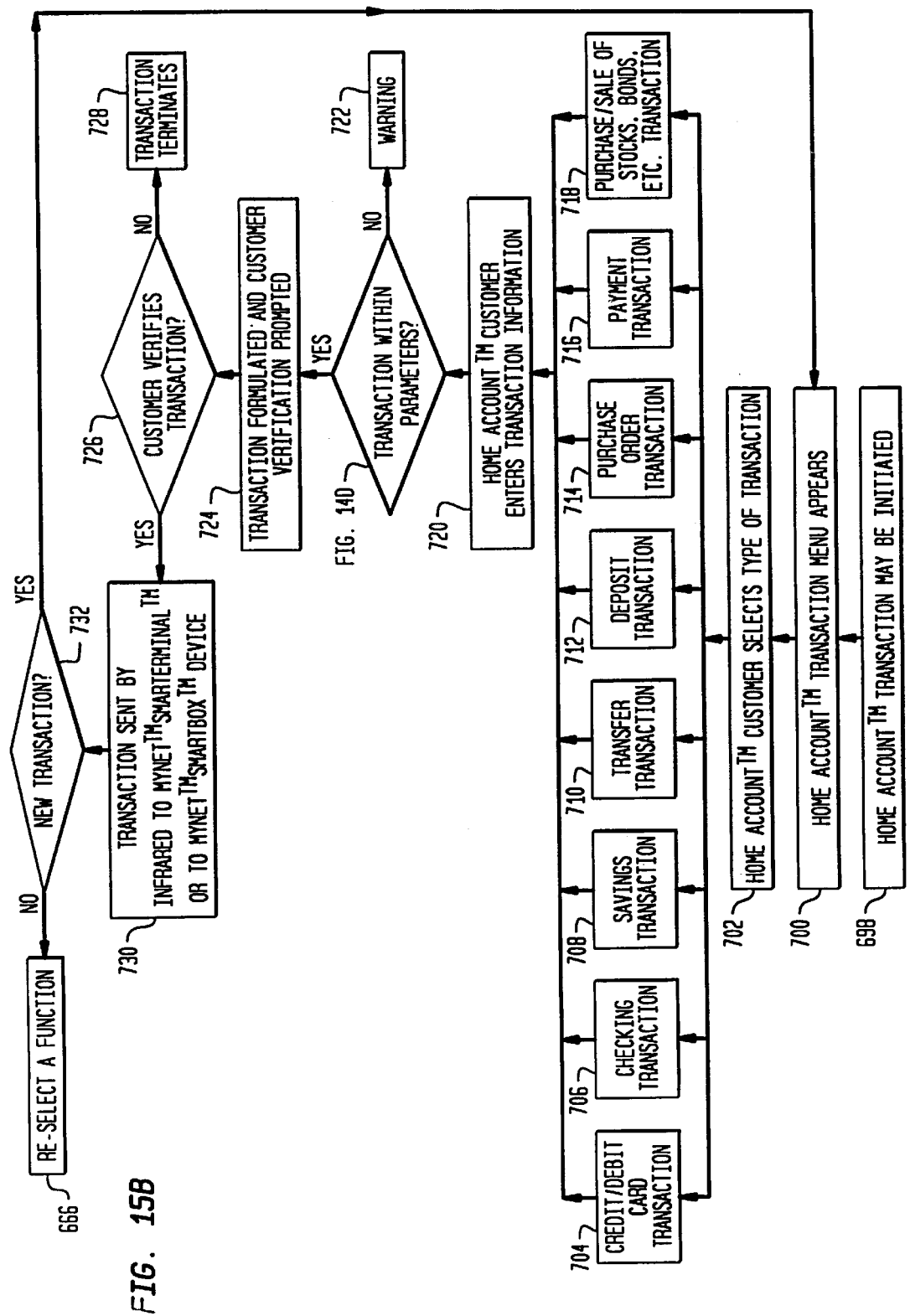

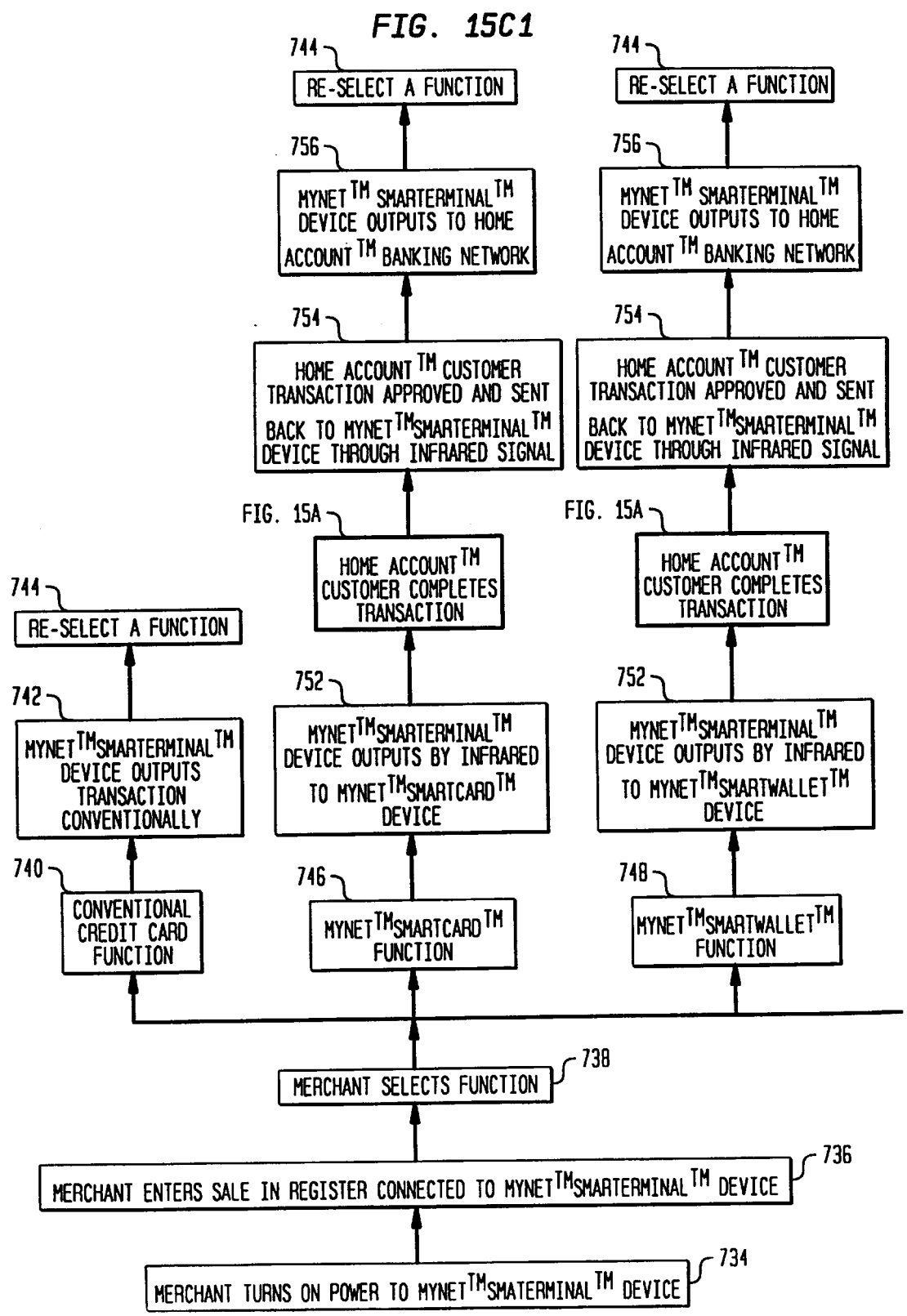

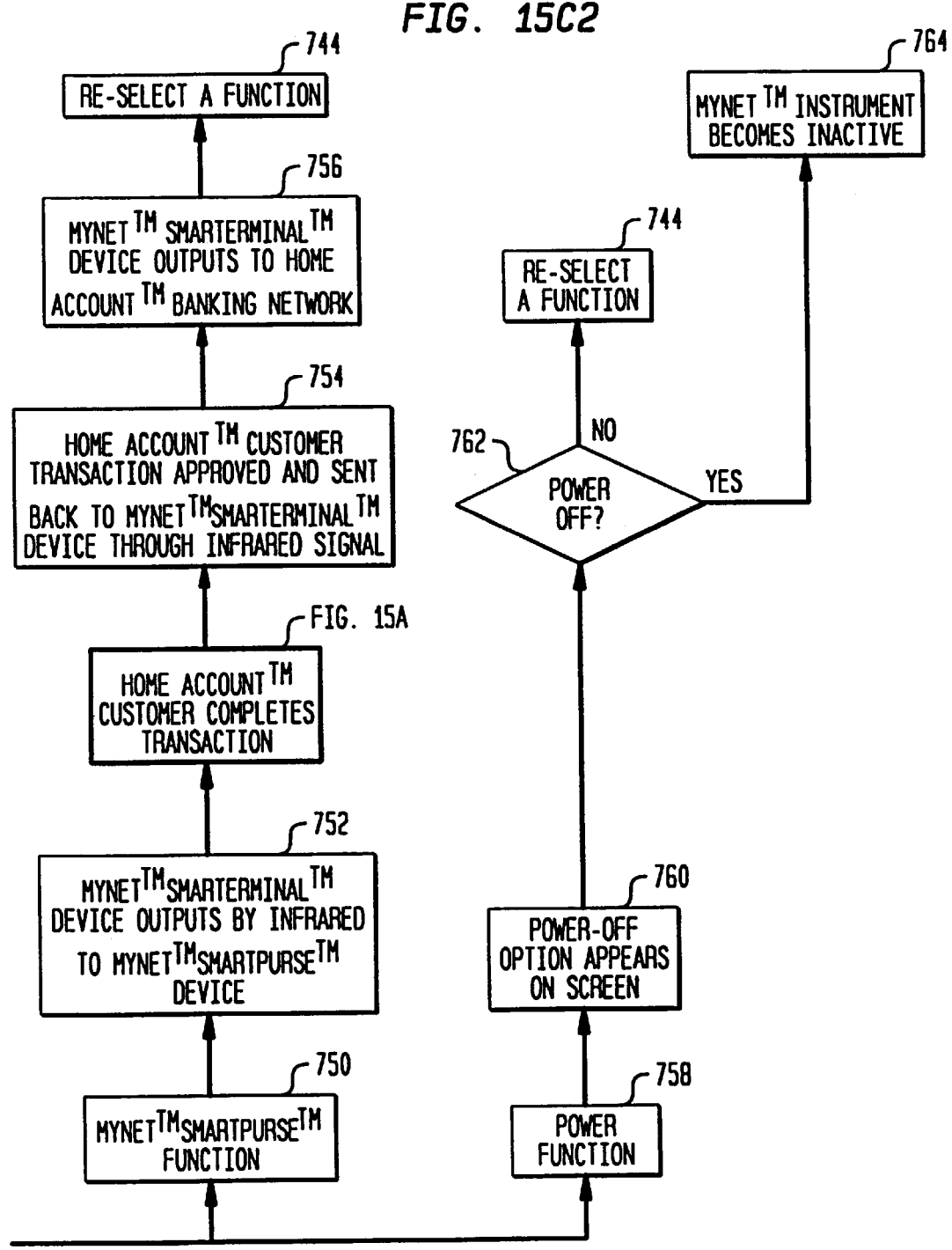

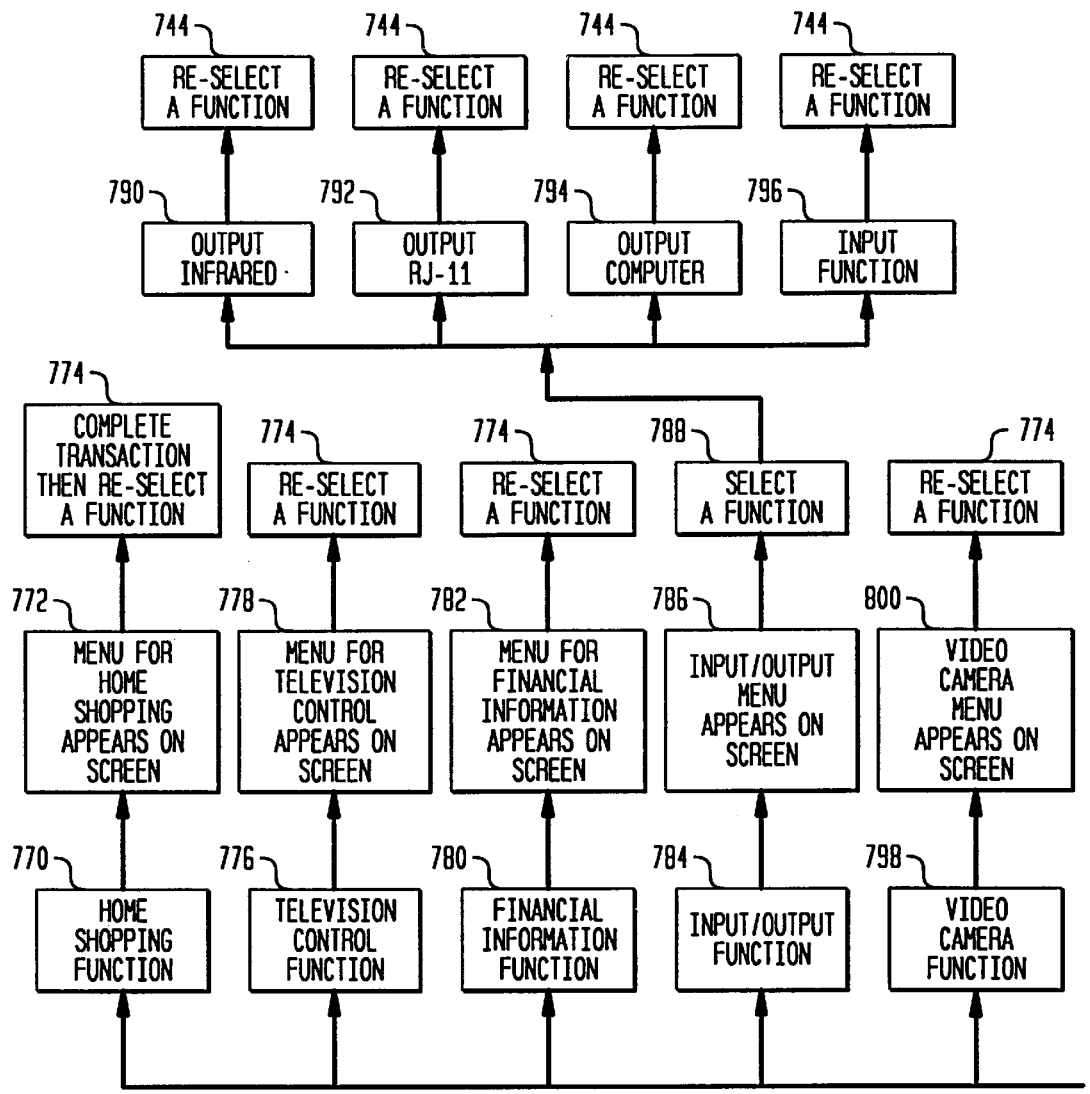
FIG. 15D1

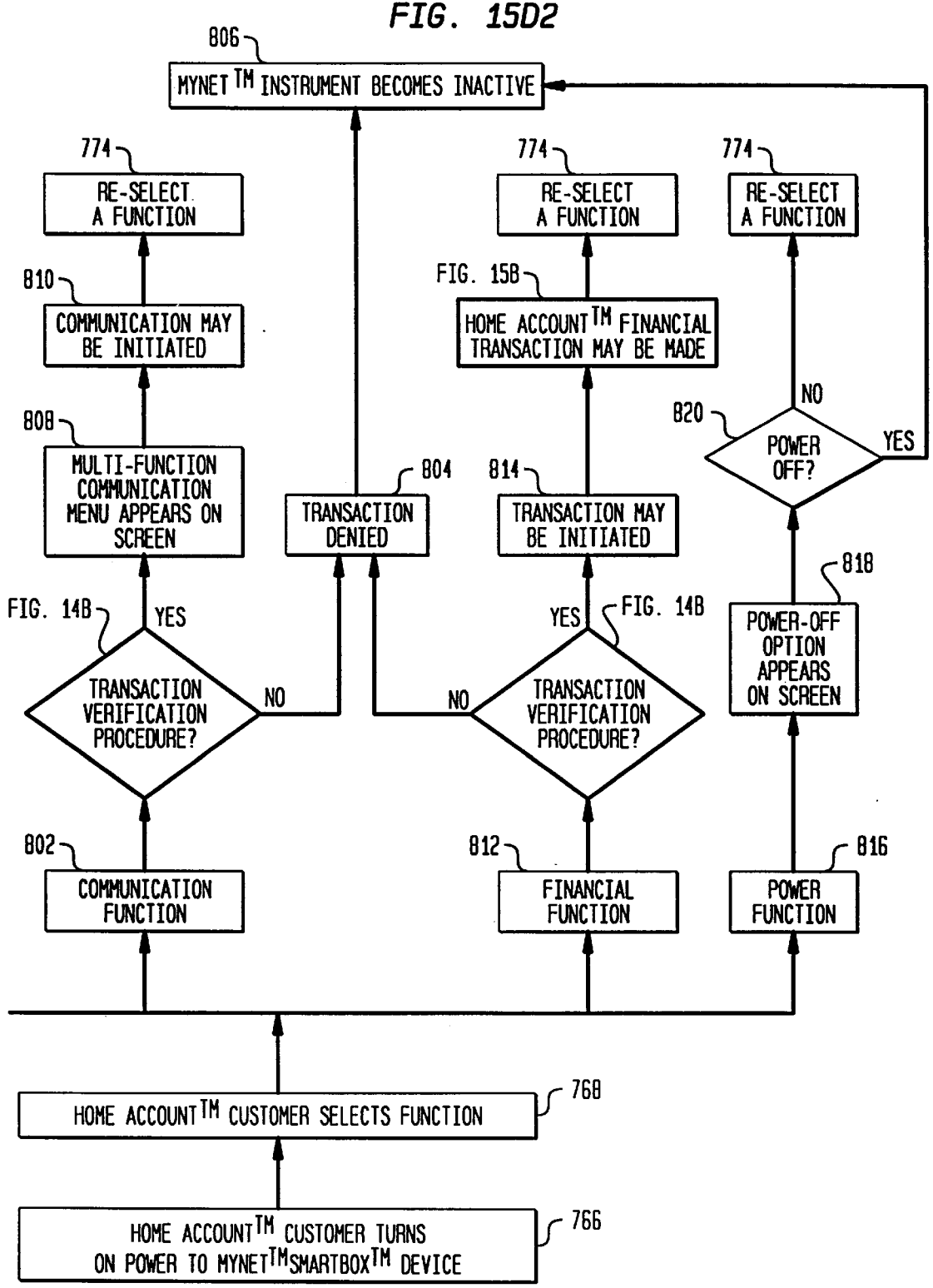

SYSTEM FOR THE OPERATION AND MANAGEMENT OF ONE OR MORE FINANCIAL ACCOUNTS THROUGH THE USE OF A DIGITAL COMMUNICATION AND COMPUTATION SYSTEM FOR EXCHANGE, INVESTMENT AND BORROWING

CROSS-REFERENCE TO RELATED APPLICATION

This is a continuation of application Ser. No. 08/350,442, filed Dec. 6, 1994, now U.S. Pat. No. 5,644,727, which is a continuation-in-part of application Ser. No. 07/780,590, filed Oct. 23, 1991, abandoned, which is a continuation-in-part of application Ser. No. 07/686,319, filed Apr. 16, 1991 which is a continuation of application Ser. No. 07/408,173, filed Sep. 15, 1989, now abandoned, which is a continuation of application Ser. No. 07/038,817, filed Apr. 15, 1987, now U.S. Pat. No. 4,953,085.

BACKGROUND OF THE INVENTION

This invention is a method and apparatus which provides an integrated financial product package together with a system of exchange, investment and borrowing that incorporates personal financial analysis, planning and management. This invention is realized, in the preferred embodiment, on a fault tolerant computer system with an operating system capable of real-time on-line transaction processing, and will be described in such context. It will be understood, however, that the invention may be applied in numerous other contexts, and variant forms, and offers benefits to consumers and producers of financial services other than those specifically referred to herein.

Historically, consumers have conducted most of their exchange transactions through non-electronic means. The use of non-electronic means of exchange requires manual record keeping in order to collect, collate, and analyze data on the sources and uses of funds. This has resulted in substantial expenditures for accounting by virtually all consumers. For example, at the end of each month many consumers try to: compile records of the amount of cash paid to providers of goods and services, balance their check book and collate all their credit card receipts and compare them to statements received from each card issuer. The consumer then determines whether she is over, under, or on budget. Despite a proliferation of personal financial management software in recent years, no means have been developed to eliminate the time and expense of data collection and entry or to enhance on-line financial management.

Banks and other financial intermediaries have offered consumers only standardized financial service products. The standardization of financial products reduced data processing and marketing costs for financial institutions, but resulted in financial services that were often ill-suited for consumers. For example, mortgage lending against homes has been practiced for many years, but only very recently have several new financial products been introduced in an effort to make mortgage lending more attractive to financial institutions, and to make housing more affordable to prospective homeowners. Additionally, many of the terms of the financial service products are fixed and inflexible. These products have not afforded consumers the ability to alter their consumption, investment or savings behavior to best suit their own or the economy's changing circumstances.

Moreover, product proliferation in the financial services market has presented the consumer with a confusing array of choices without a convenient, objective or clearly documented means of selecting the best combination of financial services to realize the consumer's financial objectives. Individual purveyors of financial services have often solicited customers and marketed their products on an ad hoc basis. Financial institutions usually possess only limited knowledge of the customer's total financial condition and hence they often try to sell a product that is most advantageous to the institution, not the customer. Moreover, at the present time customers must spend a substantial amount of time coordinating and monitoring their holdings of many different financial services from many different suppliers. In essence, consumers today are required to be the systems integrator for the disparate data processing systems of their financial providers. Few individuals have the time, interest or ability to perform this difficult task well.

Despite the development of some new financial products, such products have not succeeded in meeting the goals of either the mortgagor or the financial institutions. For example, financial institutions have traditionally lent funds to individuals on a fully secured basis, with an interest rate greater than their cost of funding the loan. In the last few years, however, the financial industry has been deregulated making it possible for a variety of financial institutions and firms that market financial services (hereinafter referred to as "financial institutions") to sell an entire range of financial products. Thus, in addition to the traditional objectives of a mortgagee, many financial institutions now view mortgage lending as a vehicle to encourage the borrower to purchase one or more financial service products. Methods are needed, however, to facilitate the provision of one or more financial services in an efficient and comprehensible manner.

From the point of view of the consumer, problems remain concerning the relative inflexibility of financial service products. Rapidly changing international, domestic, and personal economic circumstances require flexibility in financial service products. This allows the consumer the ability to adjust her asset and liability holdings and the terms of financial obligations to take best advantage of such changing circumstances. Many financial service products were developed at a time when it would have been impossible for a financial intermediary to offer customized, derivative or synthetic financial service products (hereinafter referred to as "derivative products") to individual consumers. With the advent of recent significant advances in information technology, it is possible for financial intermediaries to offer derivative financial service products to individual consumers in accordance with the individual's financial resources, forecast future income and expenses, and attitude toward investment risk.

For example, consider the relative inflexibility of the traditional fixed rate mortgage. (Here, "mortgage" means the entire relationship between the financial institution and the borrower: the loan, the security interest and the contractual obligation to pay the loan. In other contexts, the term "mortgage" will be used in its traditional sense to refer to a conditional transfer of real property to secure a loan.) The standard fixed rate thirty year mortgage was developed in part because it provided a standardized financial service product with constant monthly payments. Thus, it was cost effective for a financial service intermediary to offer its customers. It was structured to accommodate the accounting or data processing department of the bank or thrift institution as opposed to the best interest of the consumer. The mortgagor is locked in to an inflexible payment schedule which typically extends over most of the years in which he is working. This is analogous to a shoe store offering only one size and type of shoe. Under this arrangement, the shoe store realizes significant cost efficiencies at the expense of its customer's comfort.

The wide variety of individuals' financial resources and investment risk outlooks requires financial service products to be both tailored to the current needs of individuals and sufficiently flexible to accommodate future variations in their requirements. In addition, the constantly changing nature of an individual's financial circumstances, the financial markets, and the applicable income and estate tax regulations demand flexible financial service products.

Products currently offered do not take advantage of recent advances in information and problem solving technologies. Nor do they take advantage of the deregulation of the financial services industry. Moreover, financial service products do not adequately accommodate either the diversity or the constantly changing nature of individuals' financial preferences or circumstances. Financial service products are not offering the consumer a full range of financial services that would help maximize his financial return and make housing affordable to a greater number of individuals.

In addition to the failing of the financial service product offerings, there are certain fundamental problems with the methods and apparatus currently used to effect the exchange of goods and services, savings, investments and borrowing. Currently in the United States, there are 25,000 depositories and approximately 266 million individuals. Based upon an analysis made by two officials of the Federal Reserve, (Humphrey, David B. and Berger, Allen N. "Market Failure and Resource Use: Economic Incentives to Use Different Payment Instrument," 1990), approximately 97 percent of all payments are made by either cash or check, of which cash payments are 83.42 percent of the total and check transactions are equal to 14.04 percent. Credit cards account for only 1.52 percent of all transactions. Only 0.34 percent of all payments are made electronically in the United States. Clearly, the small percentage of credit card and electronic payments reveal a critical failing in the current methods employed to effect these methods of exchange.

Cash payments total 278.6 billion transactions per year, whereas those made by check are equal to 47 billion and those made by credit card are 5.11 billion. Because of the differences in the amount of the transactions, however, there is a greater dollar value with respect to transactions made by check, as opposed to cash. There were $55.8 trillion in checking transactions as opposed to only $1.4 trillion in cash and $0.317 trillion by credit card. The average size of a check transaction is $1,188, the average size of a credit card transaction is $62 and the average size of a cash transaction is only $5.

Recent studies from the Federal Reserve Board suggest an economic rationale which explains why consumers pay by check where larger dollar amounts are involved. They stated that, because of the benefits of the "float" which approximates 3.7 days for each checking transaction, consumers and businesses have an incentive to use checks for larger transactional payments. However, another compelling reason for consumers to use checks is that consumers are afforded, albeit in an archaic manual form, a means of record keeping for their transactions that is contemporaneous with the execution of the transaction. With cash transactions, obviously, that type of convenience and contemporaneous record keeping does not occur. With regard to transactions utilizing credit cards, although one receives a piece of paper, the transactions are not incorporated into any kind of systematic accounting that is held or may be easily accessed by the consumer. It is our view that this record keeping feature makes check transactions the most significant dollar value means of exchange in the United States. When the amount of money spent matters, consumers prefer to have a record of the transaction.

TABLE 2-A1

VOLUME, VALUE AND GROWTH OF DIFFERENT PAYMENT INSTRUMENTS

| Type of Payment Instrument | Volume (Millions) (1) | Total Value ($ trillions) (2) | Average Dollar Value (3) | Annual Growth (1986–1987) (4) | Percentage Volume Composition (5) |
|---|---|---|---|---|---|
| Nonelectronic | | | | | |
| Cash | 278,600 | $ 1.4 | $ 5 | 8% | 83.42% |
| checks | 47,000 | 55.8 | 1,188 | 5 | 14.07 |
| Credit Cards | 5,111 | 0.317 | 62 | 7 | 1.53 |
| Travelers Checks | 1,354 | 0.047 | 35 | 9 | 0.40 |
| Money Orders | 811 | 0.07 | 86 | 4 | 0.24 |
| Total Nonelectronic Transfers | | | | | 99.66% |
| Electronic | | | | | |
| ACH | 936 | $ 3.6 | $ 3,882 | 26% | 0.28% |
| Wire transfers | 84 | 281.0 | 3,300,000 | 7 | 0.03 |
| Pos | 55 | 0.000822 | 15 | 59 | 0.02 |
| ATM bill payment | 29 | 0.002 | 70 | 3 | 0.01 |
| Total Electronic Payments | 0.34% | | | | |

TABLE 21-2

USER PRICES AND SOCIAL COSTS OF DIFFERENT PAYMENT INSTRUMENTS, 1987

| Type of Payment Instrument | Production Cost (Unit Cost) (1) | Processing Cost (Unit Cost) (2) | Total Social or Real Resource Cost (Unit Cost) (1) + (2) = (3) | Float Transfer/ Payment (+ for Cost, − for Benefit) (Unit Cost) (4) | Total User Changes (Unit Price) (3) + (4) = (5) |
|---|---|---|---|---|---|
| Nonelectronic | | | | | |
| Cash | $ 419 | $10,858 | $11,277 | $ 13,283 | $24,560 |
|  | (0.00) | (0.04) | (0.04) | (0.05) | (0.09) |
| Checks | 1705 | 35,641 | 37,346 | −39,100 | −1,754 |
|  | (0.04) | (0.76) | (0.79) | (−0.83) | 2,249 |
| Credit Cards | 2,257 | 2,249 | 4,506 | 2,257 | 2,249 |
|  | (0.44) | (0.44) | (0.88) | (−0.44) | (0.44) |
| Travelers Checks | 995 | 609 | 1,604 | 0 | 1,604 |
|  | (0.73) | (0.45) | (1.18) | (0.00) | (1.79) |
| Money Orders | 933 | 518 | 1,451 | 0 | 1,451 |
|  | (1.15) | (0.64) | (1.79) | (0.00) | (1.79) |
| Electronic | | | | | |
| ACH | $ 0 | $ 273 | $ 273 | −$ 1 | $ 272 |
|  | (0.00) | (0.29) | (0.29) | (−0.00) | (0.29) |
| Wire transfers | 0 | 616 | 616 | −2 | 614 |
|  | (0.00) | (7.33) | (7.33) | ('10.02) | (7.31) |
| POS | 0 | 26 | 26 | 0 | 26 |
|  | (0.00) | (0.47) | (0.47) | (0.00) | (0.47) |
| ATM bill payment | 6 | 13 | 19 | 1 | 20 |
|  | (0.21) | (0.45) | (0.66) | (0.03) | (0.69) |

Source: Humphrey, David B. and Berger, Allen N. "Market Failure and Resource Use: Economic Incentives to Use Different Payment Instrument," in The U.S. Payment System; Efficiency, Risk and the Role of the Federal Reserve: Proceedings of a Symposium on the U.S. Payment System, Kluwer Academic Publishers, 1990.

Officials from the Federal Reserve Board have estimated the production and processing cost of cash transactions in the United States at approximately $11.27 billion. Transactions paid by check cost considerably more, $37.366 billion. Transactions paid by credit card cost $4.5 billion. This equates to a production and processing cost per transaction of $0.04 for every cash transaction, $0.79 for every transaction made by check and $0.88 for every transaction made by credit card. These cost estimates represent the direct production and processing costs that are ultimately borne by the consumer. They do not, however, include the attendant costs required for a consumer to then efficiently serve as the systems integrator for her banks, brokers, insurers and merchants. The consumer is left to aggregate disparate data from cash, check and credit card transactions into an amenable financial plan and integrate this information to satisfy annual reporting requirements such as tax returns to the treasury.

In addition to the approximately $50 billion cost of production and processing exchange transactions, currently there is no adequate means of assuring the security of transactional data, and tracking that data and compiling it for review. Credit card fraud losses are estimated to amount to $70 billion per year in the U.S. alone. Unreported cash transactions are estimated to defraud the U.S. Government of $150 billion in annual tax revenue. These annual fraud-related losses are approximately equal to the projected annual federal budget deficit. The current system of exchange and security verification revolves around the use of a social security number, name, address and credit card or checking account number. In other words, authentication of identity is almost solely based upon numeric or alphanumeric data. Once a criminal has misappropriated some or all of this data, he can effect almost any transaction and can effectively control an individual's assets, liabilities, and accounts.

Currently, there is no convenient or adequate means of tracking transactional data for consumption, savings, investments, bonuses, discounts and rebates associated with these activities. This is financially injurious to the U.S. Treasury, and it is very inconvenient for consumers. Billions of hours of citizens' time is spent compiling data for tax returns. Millions of hours of IRS officials' time is spent checking them for accuracy. James L. Payne in *Costly Returns* has estimated the annual cost of tax compliance in the United States alone at $360 billion. Moreover, under the current system of exchange it is impossible for economic policy makers to get an accurate real time reading on the state of the economy, and consequently, economic policy is frequently ill-timed and misguided.

Data is also not compiled and presented in a manner that allows individuals to make the appropriate informed decisions about their consumption, savings and investment behavior. This makes it difficult for consumers to properly visualize the value of their potential savings and investment. This has led to a consumption-based society with inadequate levels of personal savings, potentially resulting in disastrous long term consequences for the American economy and society at large.

Furthermore, this excessive reliance on paper-based transactional media has an adverse environmental impact and may, according to certain studies, directly contribute to global warming. There is a significant adverse environmental impact of the paper currency and paper check-based society. Credit and debit cards also generate paper and carbon based transactional reporting media. None of the current forms of exchange provide a sufficient benefit for consumers to change their modes of transactional behavior.

The current system of exchange, savings, investment and borrowing makes it very difficult to adequately manage risk exposure for and by consumers, banks, and the U.S. Government. Accordingly, each year, approximately 10 million individuals are forced to file bankruptcy; financial institutions incur substantial bad debt losses; and the U.S. government is forced to write off uncollectible tax revenues.

The aggregate production and processing cost of the current system of exchange in the United States is estimated by Federal Reserve officials to be in excess of $60 billion each year. However, as demonstrated above, the total direct and indirect social, economic and environmental costs associated with the predominantly cash and check-based current system are far greater.

SUMMARY OF THE INVENTION

The present invention is a method and apparatus for effecting an improved personal financial analysis, planning and management system incorporating a digital system of electronic exchange, investment and borrowing with means of implementing, coordinating, supervising, planning, analyzing and reporting upon an array of asset accounts such as investments and liability accounts such as credit facilities. The apparatus comprises a wide area network of digital computation and communication instruments, including various personal digital assistants that may be linked to central processors and data storing facilities.

Through a prioritization function, an individual may maximize her financial well being while satisfying the financial institution's objectives. The individual specifies her financial objectives, a forecast of economic and financial variables concerning a set of possible scenarios, her risk preference and the budgetary constraints to which she is subject. The prioritization function suggests consumption levels and investments and credit facilities to the individual to best realize her financial objectives. The function may also suggest one or more contractual agreement(s) reflecting a derivative form of financial instrument(s) that may best assist the individual in realizing her financial objectives. The suggested prioritization function may recommend various forms of "sweeping" or allocating funds from or to one or more asset or liability accounts.

Thus, the present invention provides a convenient, cost effective, and rigorous means of improving financial well-being. The prioritization function also provides financial institutions an easily definable means of managing individual accounts that have a potentially infinite number of investment opportunities in a way that minimizes the detrimental aspects of enforcing compliance while satisfying the financial institution's credit-related objectives.

The personal financial management system of the present invention includes both standard or derivative forms of asset accounts and liability accounts and may feature credit facilities or loans that are secured by one or more of the asset accounts. Periodic loan payments need not be used to pay off the principal of the loan, but may be used according to a prioritized allocation of funds. As will be detailed below, the elimination of amortization for a more advantageous use of the funds may result in substantial improvements in an individual's net worth while having the ultimate effect of making better housing affordable to a greater number of individuals.

In preferred embodiments, the financial management system includes a type of credit facility or loan that features a variable amortization schedule and is secured by one or more lien(s) on, security interest(s) in, pledge(s), agreement (s) or mortgage(s) of real property and one or more other assets. This loan is referred to as "Home Owner's Managed Equity" Account or HOME Account™ mortgage; and, regardless of the specific legal form it may take, the security element of this loan will be referred to as a lien. Unlike conventional loans which provide for regular amortization payments, the HOME Accounts™ mortgage need not be amortized.

Rather, the system of the present invention gives the individual borrower the opportunity to maximize her investment earnings by a variety of means including but not limited to distributing the monies that would normally be used to amortize the loan among assets that give her a greater return. For example, the borrower can receive expert advice and the assistance of decision support systems from the system of the present invention. He also has the option to use the funds that would otherwise have been used to amortize the loan to make a contribution to a pension or retirement account such as an IRA, KEOUGH, S. E. P. or corporate pension plan, or purchase investments such as life insurance or annuities in which earnings on premium payments are not taxed until they are withdrawn.

Alternatively, the borrower can use the funds that might have otherwise been used for amortization payments to decrease the amount outstanding in a liability account or to increase the value of an asset account which is used as collateral for the loan. The system is flexible and is not dependent upon the continuance of existing regulations. If the applicable regulations are altered, the system of the present invention will assist the individual by suggesting alternate allocations of funds to or from asset and liability accounts based upon the regulations then in effect or to be in effect in the future.

The system of the present invention utilizes various optimization techniques, for example, stochastic programming, and offers the consumer the benefits of an objective expert advisor at a very low cost. Such expert can provide her with an integrated financial plan that is frequently updated together with financial management tools such as expert account sweep features that automatically allocate funds in accordance with the plan. In addition, an analysis of current returns on asset accounts and costs of liabilities after consideration of applicable taxes and transaction costs may be provided. This system advantageously results in tremendous time savings to the individual consumer by allowing her to avoid much of the work currently required to coordinate and monitor her assets and liabilities.

Similarly, the financial institution may offer one or more derivative forms of financial instrument(s) or contractual agreements to the individual. Such instrument may detail investment and/or borrowing opportunities which can be realized through the acquisition or sale of one or more securities, real assets, credit facilities and/or financial instruments. Derivative products may also accommodate the individual's desired gross and net cash flows, desired balances in various asset and liability accounts over time, desired risk level while considering the level of uncertainty surrounding the value of forecast variables.

One particularly advantageous derivative product enables a present homeowner to enjoy the benefits of the present invention without having to immediately retire an existing mortgage and obtain entirely new refinancing on her home. In this instance, the homeowner continues to make periodic mortgage payments to the original mortgage holder either directly by the homeowner or through the financial institution that offers the HOME Account™ mortgage. In either case, as periodic payments are made to the original mortgage holder, a credit line from the HOME Account™ mortgage is debited and an asset account is credited with an amount equal to at least a part of the amortization portion of each periodic payment to the original mortgage holder. As a result, the sum of the principal remaining on the original mortgage and the credit extended through the HOME Account™ mortgage may be as much or more than the principal due on the original mortgage at the time the HOME Account™ mortgage credit line was first debited. Thus, this HOME Account™ mortgage derivative product may effectively reduce, eliminate or reverse the amortization feature of the original mortgage.

In similar fashion, the amount of an individual's mortgage can be increased with increases in value of her home and/or of other asset accounts used to secure any loans from her HOME Account™ mortgage. For example, as a individual's home increases in value, additional loans may be made to the individual so that the loan to value ratio remains constant at a predetermined percentage. If the individual moves and acquires a more expensive house, the HOME Account™ mortgage may be increased and the new house substituted as collateral.

The system of the present invention utilizes the computation and communications capability of a digital system including a variety of personal digital assistants to send and receive data from a myriad of sources. The system then consolidates that information for the benefit of the consumer regardless of the number of institutions with which the individual has account relationships. The digital system of the present invention can receive financial data, consolidate the financial information, analyze the information, recommend specific actions or transactions which optimize an individual's asset/liability allocation, capital budgeting, or portfolio selection, and negotiate with other parties (or other parties' personal digital assistants) to effect a transaction or series of transactions, and report the results to the individual.

The system integrates a widely distributed mobile network of transactional devices with conventional local area networks to form a wide area network (WAN). This innovative metacomputing networked system of the present invention provides a completely new level of financial service through which new financial products can be provided to individuals. The digital system may also substantially reduce the time and expense of accounting, offer on-line budgetary management, and offer reduced filing costs and processing for tax and other forms of required regulatory reporting, if desired by the consumer.

Through the digital system, the government may retain all of its seignorage rights. With the use of paper currency, the government retains the value of seignorage, but must bear the cost of printing currency, replacing currency (approximately every 18 months) and exacting tax revenue from those who don't report "bearer bond" commercial transactions. Officials of the Board of the Federal Reserve System have estimated the direct annual cost of printing, controlling the use of and retiring paper, metal currency and other forms of exchange to be approximately $60 billion. The use of a purely electronic currency would eliminate these costs while greatly enhancing the governmental revenues derived from seignorage rights. The system of the present invention would reduce the high cost of printing and coining money and processing checks while improving budgetary accounting and control for governments and individuals.

The system of the present invention offers but does not require, backward compatibility with the use of existing credit cards, credit card systems, POS terminals, ATM networks, credit card and check authorization systems, among others. Thus, the present invention does not require abandonment of current systems or hardware. Further, the multiple benefits of the system may motivate financial institutions to buy appropriate personal digital assistants in large quantities to give to customers, much as they currently give away check books and passbooks today.

Typically, personal digital assistants include infrared senders/receivers and are advantageously sized and shaped like wallets and/or purses. Once these personal digital assistants are widely used by consumers, merchants will desire to add infrared receivers/senders to their POS terminals. Such receivers/senders offer customers better security and convenience, and allow the merchants to generate more sales and get quicker transaction authorizations. The familiar form or the "walletness" and "purseness" of the personal digital assistants will aid in their rapid adoption. As described below, realistic sound and video action can also be added to these instruments, in order to enhance the user interface.

As stated above in the Background of the Invention, the proliferation of new financial service products has not resulted in easy or convenient means of selecting the appropriate forms of credit and investment products to suit consumer needs. Nor do these products include easy or convenient means of keeping track of expenses to make sure consumers stay "on budget". The digital system provided by the present invention offers a convenient means by which each of the aforementioned problems can be solved. Through the use of the HOME Account™ mortgage and appropriate personal digital assistants, consumers and providers of financial services gain a much higher level of security with regard to financial transactions and communications concerning implementation, authorization or reporting of that transactional data. The present invention affords consumers a greatly enhanced system for tracking and reporting information concerning their financial affairs. If consumers desire to share such information with their designated financial institution(s) and/or the appropriate tax and regulatory authorities, the digital system uses the designated institution(s) to monitor the consumer's and the institution's credit risk.

The present system provides a method and an apparatus to accelerate the movement toward a fully electronic means of exchange, savings and investment. Such system offers numerous advantages to consumers, providers of financial services and government institutions.

The system of the present invention also offers a means of improved personal financial analysis, planning and management through a fully integrated and interactive means of asset and liability management, capital budgeting and portfolio optimization. Improved financial analysis, planning and management permits consumers to better realize their financial objectives, such as increased savings for retirement, college education or the purchase of a home. In the preferred embodiment of the invention, various operations research techniques are used, such as stochastic programming, to assist with multiperiod optimization and scenario generation and to aid in the selection of credit and investment alternatives such as derivative financial instruments. The present invention is environmentally sensitive and will, in its fullest implementation substantially reduce the demand for paper and the energy used to make, print and transport the paper. Moreover, the system of the present invention offers a host of conveniences that will favorably impact all parties.

From the financial institution's perspective, in addition to the benefits derived from more effectively managing the marketing of a panoply of financial products, the HOME Account™ mortgage used in the system of the present invention is superior to the other forms of financial service products in that: (1) it offers the lender an additional source of liquid collateral that will, if properly invested, continually appreciate in value; (2) it establishes an account that will assist in the cross selling and marketing of other financial service products that will produce additional fee revenue for the financial institution; (3) it offers the lender a superior product to market to its individual customers thus affording it a competitive advantage over other financial institutions; (4) it will result in a longer duration of the credit accounts, increased individual loyalty and hence lower marketing costs; (5) it will allow the financial institution the ability to more closely monitor its own and its customers' risk exposures and to take appropriate corrective action; (6) it will allow better pricing margins for the institution because the institution will not be constrained to offering a commodity-like product; and (7) it should rapidly gain wide acceptance in the secondary market in the form of mortgage-backed securities or Real Estate Mortgage Investment Conduit (REMIC) paper because of its added security and longer average life.

In addition, origination, administration and servicing of the HOME Account™ mortgage of the present invention involves many more considerations than a conventional financial service product. For example, the home owner's total assets, as adjusted to provide the financial institution with a measure of security for its lending, must always be greater than some imposed minimum standard or minimum borrowing power. Calculation of adjusted total assets requires the financial institution to determine the current value of each asset and multiply it by its current loan to value ratio. In practice, these values must be calculated and checked periodically to correctly reflect changes in the value or quantity of any asset or liability which is part of the system. Thus, for example, if borrowing is made against the cash value of the individual's insurance policy or if the value of the individual's bond portfolio changes, the asset values may need to be re-calculated, a new borrowing power determined and this new borrowing power compared to the predetermined minimum borrowing power. If the asset value is less than the minimum, the individual must modify one or more of her account components, e.g., decrease her liabilities or increase the value of an asset account, to bring the total value into the permissible range. A customer information file stored in a relational or object oriented data base management system may be used to facilitate all credit checking activities of the system of the present invention.

The structure and complexity of the system of the present invention suggests that the system would be best implemented on a fault tolerant computer system utilizing a real time on-line transaction processing (OLTP) operating system. As described in its preferred embodiment below, the system provides a real time update of all the components which comprise the account and coordinates, supervises, plans, analyzes and reports upon activities among the various system components.

BRIEF DESCRIPTION OF THE DRAWINGS

These and other objects, features and advantages of the invention will be more readily apparent from the following detailed description of the preferred embodiments of the invention in which:

FIG. 15A illustrates the functions and operations of the MyNet™, SmartNet™, SmartCard™ and SmartPurse™ personal digital assistants;

FIG. 15B illustrates the financial functions and operations of the MyNet™ system;

FIG. 15C illustrates the function and operation of the MyNet™ SmarTerminal™ device;

FIG. 15D illustrates the function and operation of the MyNet™ SmartBox™ device;

DETAILED DESCRIPTION OF THE PREFERRED EMBODIMENT

In this section, I begin by describing the basic structure of the preferred embodiment of the invention and then I illustrate the economic impact realized by this system. The HOME Account™ mortgage and the MyNet™ system are disclosed in detail, including the computer system and data structure of the preferred embodiment. Finally, examples of the different processes that comprise the preferred embodiment of the present invention—the loan origination and servicing processes, the transfer, exchange, savings, investment and borrowing transaction order process, calculation of the Home Owner's Managed Equity Borrowing Power (HOMEPW), the Priority Asset and Liability Allocation Process, the Early Warning Process, and the HOME Account™ Compliance Routine (HACR) and the Emergency Liquidation Procedure—are described.

Introduction

Figure 1:
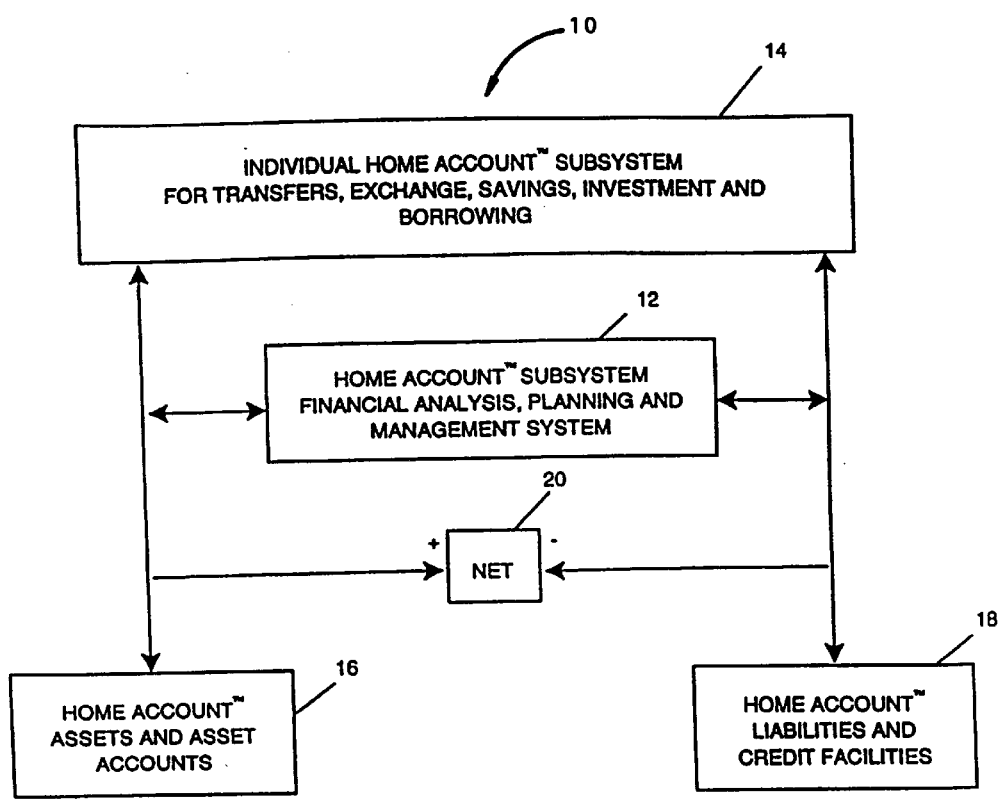
FIG. 1 illustrates the basic structure of the HOME Account™ mortgage financial analysis, planning and management system of the present invention.

FIG. 1 illustrates the basic structure of the preferred embodiment of the HOME Account™ system 10. The home owner's managed equity account, the HOME Account™ financial management system, utilizes an improved personal financial analysis, planning and management subsystem 12. This subsystem incorporates automatic or expert sweep features between asset and liability accounts that provide a means of implementing, coordinating, supervising, planning, analyzing, and reporting on investments in an array of assets and liabilities from a variety of credit facilities.

The individual account subsystem 14 is the central operating account through which all transfer, exchange, savings, investment, and borrowing transactions are implemented, coordinated, controlled, analyzed and reported to the individual. Through this HOME Account™ subsystem the individual is provided with individual reports, updated on a real time basis, as well as provided with portfolio management and financial services, including personal financial planning services. 10 One of the elements of the account subsystem is a special type of mortgage loan, referred to as a Home Owner's Managed Equity (HOME) Mortgage, which is secured by Home Account™ assets and asset accounts 16 such as one or more of the individual's homes and other asset accounts. The subsystem also includes Home Account™ liabilities and credit facilities 18. Calculation of the total collateral is as follows. The Net Equity Total (NET) 20 is equal to the difference between the sum of all assets 16 and all liabilities 18, excluding the value of the individual's home and mortgage. The NET and the value of the individual's home(s), adjusted by appropriate loan to value ratios, are used as collateral for the HOME Account™ mortgage.

The account subsystem provides the individual the opportunity to make increased investments in designated asset accounts 16 instead of decreasing the principal of the mortgage. Typically, the designated asset accounts are accounts that are not subject to frequent withdrawal of funds. Thus, these asset accounts may accrue substantial interest and dividend revenue over the term of the mortgage loan and may appreciate in capital value. Alternately, the individual can use the amortization payments to decrease a liability account, typically one which has a high interest rate such as a credit card account. By allowing the individual to invest monies that would be normally used to amortize a conventional mortgage into other asset accounts, the individual may be able to increase her investment income and net worth after payment of taxes, depending upon applicable regulations.

Through the system of the invention, the individual can optimize or, at least, improve the allocation of personal assets and liabilities to maximize her net worth. Over a period of time an individual may greatly increase net after-tax income on investments, or savings for retirement by maximizing, for example, the value of a home or homes that can be acquired by an individual given a certain income level.

The following example compares a conventional mortgage to the mortgage in the system of the present invention. Through it, I provide a static analysis of the economic impact of the system. Such analysis offers the most simplistic presentation, and it underestimates the economic benefit of the HOME Account™ system when deployed in a dynamic context. Assume the following:

(1) the initial value of the home is $120,000 and both mortgages are for $100,000 with a term of 30 years, a fixed rate of 10%, and equal monthly amortization payments;

(2) at the initiation of the mortgage, the individual's sole asset is the $20,000 required to make a down payment on her home, and the individual's sole source of initial income is her salary;

(3) a "pension account", such as a Keough, SEP or 401(K) plan, and an asset account such as an "insurance policy" both produce returns of 8% per annum compounded. No taxes are payable on the "pension account," the "insurance policy" or earnings thereon until distributions are made. The amount invested each year in the pension account and the insurance policy are equal to, respectively, the amount of the required amortization payment of the conventional mortgage and the tax savings generated by the system of the present invention;

(4) the taxes paid are based upon the taxes payable for the head of a household filing jointly with three dependents.

There are only two tax brackets of 15% and 28%, and a 5% tax surcharge for higher income tax payers;

(5) the home is assumed to appreciate at 4% per annum;

(6) the individual's net worth is equal to the value of the home, the pension account, and the insurance policy less the amount of the outstanding mortgage; and (7) the individual's annual income is initially $50,000 and increases by 5% each year.

TABLE 1

| Year 1 | Conventional Mortgage | System of the Present Invention |
| --- | --- | --- |
| Gross Taxable Income | $50,000 | $50,000 |
| Interest Payment | $9,833 | $10,000 |
| Amortization Payment | $3,334 | $0 |
| Outstanding Loan Balance | $96,666 | $100,000 |
| Pension Account Investment | $0 | $3,334 |
| Pension Account Balance | $0 | $3,467 |
| Net Taxable Income | $40,167 | $36,666 |
| Taxes Paid | $4,375 | $3,850 |
| Net Income After Tax | $35,792 | $32,816 |
| Disposable Income | $32,458 | $36,150 |
| Tax Savings Invested In Insurance | $0 | $500 |
| Insurance Policy Balance | $0 | $521 |
| Market Value of Home | $120,000 | $120,000 |
| Total Disposable Income | $32,458 | $36,150 |
| Net Worth | $23,334 | $23,988 |

In accordance with the present invention, the $3,334 that would otherwise be used annually to amortize the mortgage is instead contributed to a pension account which is not taxed in that year. Thus the individual's net taxable income is $36,666 as opposed to the $40,167 when the $3,334 is realized as personal income and used to amortize the mortgage. Correspondingly, the taxes paid are lower and the individual's disposable income is greater. In addition, the tax savings of $500 is invested in a tax favored investment such as a single premium whole life insurance policy which yields a balance of $521 at year end.

Referring to Table 2, in the second year the individual gains the same benefits using the system of the present invention. The individual now has an insurance investment balance of $1,048 and a pension account balance of $7,226.

TABLE 2

| Year 2 | Conventional Mortgage | System of the Present Invention |
|---|---|---|
| Gross Taxable Income | $52,590 | $52,500 |
| Interest Payment | $9,500 | $10,000 |
| Amortization Payment | $3,334 | $0 |
| Outstanding Loan Balance | $93,332 | $100,000 |
| Pension Account Investment | $0 | $3,334 |
| Pension Account Balance | $0 | 7,226 |
| Net Taxable Income | $43,000 | $39,166 |
| Taxes Paid | $5,093 | $4,225 |
| Net Income After Tax | $37,908 | $34,941 |
| Disposable Income | $34,574 | $38,275 |
| Tax Savings Invested In Insurance | $0 | $500 |
| Insurance Policy Balance | $0 | $1,048 |
| Market Value of Home | $124,800 | $124,800 |
| Total Disposable Income | $67,031 | $74,425 |
| Net Worth | $31,468 | $33,074 |

Referring to Table 3, over thirty years the individual's total disposable income is $2,371,379 compared to a disposable income of $2,343,173 for a person in like circumstances who is paying off a 30 year conventional mortgage. The principal amount owed on the home is still $100,000. However, the individual has accrued a pension account balance of $417,577 and an insurance policy balance of $109,023. The economic impact of the system is clearly realized by comparing the net worth of the individual using the system of the present invention and that of a person who purchased a home by taking out a conventional mortgage. Through the system of the present invention, the individual may more than double her net worth.

TABLE 3

| Totals After 30 Years | Conventional Mortgage | System of the Present Invention |
|---|---|---|
| Gross Taxable Income | $3,321,942 | $3,321,942 |
| Interest Payment | $149,971 | $300,000 |
| Amortization Payment | $100,000 | $0 |
| Outstanding Loan Balance | $0 | $100,000 |
| Pension Account Investment | $0 | $100,000 |
| Pension Account Balance | $0 | $417,577 |
| Net Taxable Income | $3,171,971 | $2,921,922 |
| Taxes Paid | $728,798 | $650,563 |
| Net Income After Tax | $2,443,173 | $2,271,359 |
| Disposable Income | $2,343,173 | $2,371,379 |
| Tax Savings Invested In Insurance | $0 | $29,806 |
| In Insurance Policy Balance | $0 | $109,023 |
| Market Value of Home | $374,235 | $374,235 |
| Total Disposable Income | $2,343,173 | $2,371,379 |
| Net Worth | $374,235 | $800,835 |

The economic advantages of the system are equally dramatic for an individual initially earning $100,000 a year, increasing 5% annually. Using the same assumptions stated in the example but with a house having an initial value of $240,000 and a mortgage for $200,000, the $6,667 that would be used annually to amortize the mortgage is placed in a pension account which is not taxed until distributions are made from the account after the individual retires. As a result, the individual accumulates $785,713 (including interest) in a pension or retirement account. In addition, the individual accumulates an insurance policy investment balance of $256,776. As a result, after 30 years of payments the individual's total disposable income is $3,588,342 which is higher than that of a person making payments on a 30 year conventional mortgage. Her net worth is $1,599,965, which is more than double the $748,486 net worth of an individual under similar financial conditions who has completed payments on a 30 year conventional mortgage.

The system of the present invention allows the individual to choose among a wide variety of mortgage amortization options. In the example below, regular payments made to the account are used to amortize the mortgage until a certain pre-specified, loan-to-value ratio (LTV) (mortgage amount/ home value amount) has been achieved. Having reached the pre-specified loan to value ratio, the financial institution applies the regular payments hierarchically, first to pay the interest on the mortgage and, second, to invest the remainder of the payment in such investment vehicles as will yield the optimal solution according to an optimization model. This model takes account of risk/return preferences, and personal and general economic and financial projections. As an alternative, the individual can choose to decrease a liability account other than the mortgage. Typically, the liability amount chosen will have a relatively high rate of interest, such as a credit card account balance. Other dynamic aspects of the HOME Account™ system maintain a constant loan to value ratio as the value of the home increases over time. By advancing additional loans such as home equity loans secured by the home and one or more other asset accounts, the loan to value ratio is always maintained at a constant percentage. In a preferred embodiment, such percentage is 80%.

An illustrative example which compares the relative financial positions over thirty years for a mortgagor holding a conventional mortgage versus a HOME Account™ mortgage is provided below. The example comprises a limited number of accounts and assumes certain initial parameters which are summarized below:

1) All mortgages are for a term of 30 years at a fixed rate of 9% per annum.
2) All mortgages are initially for $160,000.
3) In cases where a constant 80% loan-to-value ratio is maintained for liabilities secured against the home, all increases in liabilities against the home are shown as additions to the original mortgage. These increases in borrowing would ordinarily take the form of home equity line of credit borrowing with an interest rate equal to or slightly greater than that of the original mortgage.
   Alternatively, the individual may move into a more valuable home periodically and increase the amount of the mortgage and the amount of deductible interest expenses. For simplicity it assumed that the interest rates remain constant.
4) At the initiation of the mortgage, the individual's annual earned income is $60,000, and grows at 5% per year.
5) Combined federal and state taxes are paid at the end of each year.

6) The individual's net worth is equal to the current value of all assets including the primary residence, less all liabilities.

Table 4 lists the accounts included in this example. Note that these accounts are only intended to illustrate the potential value of the system. In no way should the list provided here be misconstrued as limiting the number or type of asset or liability accounts that may be used in conjunction with the product.

TABLE 4

ACCOUNTS INCLUDED IN MODEL

| | |
|---|---|
| Assets: | Checking |
| | Money Market Deposit Account (MMDA) |
| | Certificate of Deposit (CD) |
| | Individual Retirement Amount (IRA) |
| | Simplified Employee Pension(SEP) |
| | Annuity |
| | Corporate Bond |
| | Mixed Stock and Bond Fund |
| | Equity in Home |
| Liabilities: | Mortgage |
| | Home Equity Line of Credit (HELOC) |

Table 5 summarizes the initial parameters and investment assumptions for the model.

TABLE 5

MODEL ASSUMPTIONS AND PARAMETERS

| | |
|---|---|
| INCOME AND TAX | |
| Initial Annual Income: | $60,000 |
| Growing at: | 5% per annum |
| Taxed at: | 27% (includes state & federal) |
| Initial Disposable Income: | $20,000 |
| Growing at: | 6% per annum |
| HOME AND MORTGAGE | |
| Initial Value: | $200,000 |
| Growing at: | 5% per annum |
| of which Equity (initial) is: | $40,000 |
| of which Mortgage (initial) is: | $160,000 |
| Term of Mortgage: | 30 years |
| INTEREST RATES AND INFLATION | |
| Assets: | |
| Checking: | 0.0% |
| MMDA: | 6.0% |
| CD: | 7.0% |
| IRA: | 8.0% |
| SEP: | 8.0% |
| Annuity: | 8.0% |
| Corporate Bond: | 10.5% |
| Mixed Stock and Bond Fund: | 13.0% |
| Liabilities: | |

TABLE 5-continued

MODEL ASSUMPTIONS AND PARAMETERS

| | |
|---|---|
| Mortgage: | 9.0% |
| HELOC: | 10.5% |
| Inflation: | 4.0% |

Tables 6 and 7 outline the investment behavior for two different types of account holders: conservative and capital growth-oriented.

TABLE 6

INDIVIDUAL PROTOTYPE #1: CONSERVATIVE INVESTOR

Conventional Mortgage: Investor invests $2,000 per annum in an IRA, additional available funds up to $50,000 in MMDA, and the remainder in a CD.
HOME Account ™ Mortgage: Investor holds a home mortgage at a constant 80% loan to value ratio. Amortization payments cease at 80% loan to value ratio and interest only is paid on the loan. The lesser of $30,000 or 15% of earnings is invested in a SEP account, and the remainder is invested in an annuity product.

TABLE 7

INDIVIDUAL PROTOTYPE #2: GROWTH-ORIENTED INVESTOR

Conventional Mortgage: Investor invests $2,000 per annum in an IRA, additional available funds up to $50,000 in MMDA, and the remainder in a CD.
HOME Account ™ Mortgage: Investor holds home mortgage at a constant 80% loan to value ratio. Amortization payments cease at 80% loan to value ratio and interest only is paid on the loan. The lesser of $30,000 or 15% of earnings is invested in a SEP account, and the remainder is invested in a mixed stock and bond fund.

Table 8 shows the account balances in years 1, 10, 20 and 30 for a conservative investor using a conventional mortgage product, as well as total net worth, retirement savings, taxes paid and disposable income in these years. Table 9 sets forth the mortgage amortization schedule for the conventional mortgage.

In year 30, the nominal value of the borrower's total net worth based upon the use of a conventional mortgage is $1,740,111, with the greatest amounts being held in home equity ($864,388) and the CD account($492,332). The home is valued at $864,388 and the mortgage has been fully amortized (balance=$0). Total taxes paid in year 30 on earned income of $246,968 and interest income of $48,478 was $76,385.

Cumulative taxes paid over 30 years were $1,060,392.

TABLE 8

| YEAR | 1 | 10 | 20 | 30 |
|---|---|---|---|---|
| CURRENT INCOME POSITION | | | | |
| Gross earned income | $60,000 | $93,098 | $151,617 | $246,968 |
| Interest income | $ 307 | $ 3,898 | $ 16,691 | $ 48,478 |
| Total income | $60,307 | $96,977 | $168,308 | $295,446 |
| Net after tax income | $48,442 | $75,406 | $127,853 | $221,295 |
| Disposable income ex-model | $20,000 | $36,769 | $ 72,331 | $142,285 |

TABLE 8-continued

OPENING NET WORTH POSITION

|  |  |  |  |  |
|---|---|---|---|---|
|  | $ 50,000 | $223,237 | $650,640 | $1,598,099 |
| Assets | $219,868 | $394,131 | $814,940 | $1,698,951 |
| Financial Assets | $ 9,868 | $ 68,352 | $284,290 | $ 875,723 |
| checking account | $ 5,000 | $ 5,000 | $ 5,000 | $ 5,000 |
| MMDA | $ 2,788 | $ 33,220 | $ 79,723 | $ 142,772 |
| CD | $ 0 | $ 0 | $104,382 | $ 492,332 |
| IRA | $ 2,080 | $ 30,132 | $ 95,185 | $ 235,629 |
| SEP | $ 0 | $ 0 | $ 0 |  |
| Annuity | $ 0 | $ 0 | $ 0 |  |
| Corporate bonds | $ 0 | $ 0 | $ 0 |  |
| Mixed stock & bond fund | $ 0 | $ 0 | $ 0 |  |
| Tangible Assets | $210,000 | $325,779 | $530,660 | $ 864,388 |
| Home value | $210,000 | $325,779 | $530,660 | $ 864,388 |
| Liabilities | $158,806 | $141,940 | $ 99,541 |  |
| Credit Card | $ 0 | $ 0 | $ 0 |  |
| Personal line of credit | $ 0 | $ 0 | $ 0 |  |
| HELOC | $ 0 | $ 0 | $ 0 |  |
| Home mortgage | $158,806 | $141,940 | $ 99,541 |  |
| ENDING NET WORTH POSITION | $ 61,062 | $252,191 | $715,408 | $1,740,111 |
| NET CHANGE IN POSITION | $ 11,062 | $ 28,953 | $ 64,768 | $ 142,014 |

SUMMARY INFORMATION

| YEAR | 1 | 10 | 20 | 30 | CUM | NPV |
|---|---|---|---|---|---|---|
| Net after-tax income | $48,442 | $ 75,406 | $128,717 | $ 227,340 | $3,408,502 | $1,092,941 |
| Taxes paid | $11,856 | $ 21,572 | $ 40,774 | $ 76,385 | $1,060,392 | $ 355,998 |
| Net worth | $61,062 | $252,191 | $715,408 | $1,740,111 |  | $ 520,945 |
| Retirement savings | $ 4,868 | $ 63,352 | $273,359 | $ 796,416 |  | $ 255,372 |

TABLE 9

MORTGAGE AMORTIZATION SCHEDULE
CONVENTIONAL MORTGAGE

| YEAR END | TOTAL PAYMENT | INTEREST | PRINCIPAL | MORTGAGE BALANCE | HOME VALUE |
|---|---|---|---|---|---|
| 0 |  |  |  | $160,000 | $200,000 |
| 1 | $15,449 | $14,255 | $ 1,193 | $158,806 | $210,000 |
| 2 | $15,449 | $14,149 | $ 1,300 | $157,506 | $220,500 |
| 3 | $15,449 | $14,033 | $ 1,416 | $156,090 | $231,525 |
| 4 | $15,449 | $13,907 | $ 1,542 | $154,548 | $243,101 |
| 5 | $15,449 | $13,769 | $ 1,679 | $152,868 | $255,256 |
| 6 | $15,449 | $13,620 | $ 1,829 | $151,039 | $268,019 |
| 7 | $15,449 | $13,457 | $ 1,992 | $149,047 | $281,420 |
| 8 | $15,449 | $13,279 | $ 2,169 | $146,877 | $295,491 |
| 9 | $15,449 | $13,086 | $ 2,363 | $144,514 | $310,266 |
| 10 | $15,449 | $12,875 | $ 2,573 | $141,940 | $325,779 |
| 11 | $15,449 | $12,646 | $ 2,802 | $139,138 | $342,068 |
| 12 | $15,449 | $12,396 | $ 3,052 | $136,085 | $359,171 |
| 13 | $15,449 | $12,124 | $ 3,324 | $132,761 | $377,130 |
| 14 | $15,449 | $11,828 | $ 3,620 | $129,140 | $395,986 |
| 15 | $15,449 | $11,506 | $ 3,943 | $125,197 | $415,786 |
| 16 | $15,449 | $11,154 | $ 4,294 | $120,902 | $436,575 |
| 17 | $15,449 | $10,772 | $ 4,677 | $116,225 | $458,404 |
| 18 | $15,449 | $10,355 | $ 5,093 | $111,131 | $481,324 |
| 19 | $15,449 | $ 9,901 | $ 5,547 | $105,583 | $505,390 |
| 20 | $15,449 | $ 9,407 | $ 6,041 | $ 99,541 | $530,660 |
| 21 | $15,449 | $ 8,868 | $ 6,580 | $ 92,961 | $557,193 |
| 22 | $15,449 | $ 8,282 | $ 7,166 | $ 85,795 | $585,052 |
| 23 | $15,449 | $ 7,644 | $ 7,805 | $ 77,989 | $614,305 |
| 24 | $15,449 | $ 6,948 | $ 8,500 | $ 69,489 | $645,020 |
| 25 | $15,449 | $ 6,191 | $ 9,257 | $ 60,231 | $677,271 |
| 26 | $15,449 | $ 5,366 | $10,082 | $ 50,149 | $711,135 |
| 27 | $15,449 | $ 4,468 | $10,980 | $ 39,168 | $746,691 |
| 28 | $15,449 | $ 3,490 | $11,959 | $ 27,209 | $784,026 |
| 29 | $15,449 | $ 2,424 | $13,024 | $ 14,184 | $823,227 |
| 30 | $15,449 | $ 1,264 | $14,185 | $ 0 | $864,388 |

Table 10 outlines the account balances for a conservative investor who uses the HOME Account™ mortgage instead of a conventional mortgage. Table 11 sets forth the mortgage amortization schedule for such investor. In year 30, the nominal value of this prototypical borrower's total net worth is $5,945,152, with the greatest amounts being held in the SEP ($1,687,772) and annuity ($3,750,065) accounts. The home is valued at $823,227, with a mortgage of $691,511, which is 80% of the total value of the home. No amortization payments are made. Total taxes paid in year 30 were $42,976, on earned income of $246,968 and interest income of $410,610. Cumulative taxes paid over 30 years were $651,616.

The use of the HOME Account™ system has increased the nominal value of this same prototypical consumer's net worth by a total of $5,883,848 over a thirty year time period.

TABLE 10

| YEAR | 1 | 10 | 20 | 30 |
|---|---|---|---|---|
| CURRENT INCOME POSITION | | | | |
| Gross earned income | $ 60,000 | $ 93,080 | $ 151,617 | $ 246,968 |
| Interest income | $ 349 | $ 16,804 | $ 93,944 | $ 410,610 |
| Total income | $ 60,349 | $109,884 | $ 245,561 | $ 657,578 |
| Net after tax income | $ 48,472 | $ 94,650 | $ 222,607 | $ 614,602 |
| Disposable income ex-model | $ 20,000 | $ 36,769 | $ 72,331 | $ 142,285 |
| OPENING NET WORTH POSITION | $ 50,000 | $277,905 | $1,259,187 | $5,171,147 |
| Assets | $221,304 | $574,699 | $1,858,465 | $6,562,504 |
| Financial Assets | $ 11,304 | $248,920 | $1,327,807 | $5,739,276 |
| Checking Account | $ 5,000 | $ 5,000 | $ 5,000 | $ 5,000 |
| MMDA | $ 4,224 | $ 13,054 | $ 30,166 | $ 60,810 |
| CD | $ 0 | $ 0 | $ 0 | $ 0 |
| IRA | $ 2,080 | $ 30,132 | $ 95,085 | $ 235,629 |
| SEP | $ 0 | $125,259 | $ 572,411 | $1,687,772 |
| Annuity | $ 0 | $ 75,475 | $ 625,045 | $3,750,065 |
| Corporate bond | $ 0 | $ 0 | $ 0 | $ 0 |
| Mixed stock & bond fund | $ 0 | $ 0 | $ 0 | $ 0 |
| Tangible Assets | $210,000 | $325,779 | $ 530,660 | $ 864,388 |
| Home value | $210,000 | $325,779 | $ 530,660 | $ 864,388 |
| Liabilities | $160,000 | $248,213 | $ 404,312 | $ 658,582 |
| Credit Card | $ 0 | $ 0 | $ 0 | $ 0 |
| Personal line of credit | $ 0 | $ 0 | $ 0 | $ 0 |
| HELOC | $ 0 | $ 0 | $ 0 | $ 0 |
| Home Mortgage | $160,000 | $248,213 | $ 404,312 | $ 691,511 |
| ENDING NET WORTH POSITION | $ 61,304 | $326,487 | $1,454,153 | $5,945,152 |
| NET CHANGE IN POSITION | $ 11,304 | $ 48,581 | $ 194,966 | $ 773,935 |

| SUMMARY INFORMATION | | | | | | |
|---|---|---|---|---|---|---|
| YEAR | 1 | 10 | 20 | 30 | CUM | NPV |
| Net after-tax income | $48,472 | $ 94,650 | $ 222,607 | $ 614,602 | $6,233,359 | $1,998,735 |
| Taxes paid | $11,876 | $ 15,234 | $ 22,954 | $ 42,976 | $ 651,616 | $ 208,942 |
| Net Worth | $61,304 | $326,487 | $1,454,153 | $5,945,152 | | $1,893,101 |
| Retirement savings | $ 6,304 | | | | | |

TABLE 11

MORTGAGE AMORTIZATION SCHEDULE - HOME ® MORTGAGE

| YEAR END | TOTAL PAYMENT | INTEREST | PRINCIPAL | MORTGAGE BALANCE | HOME VALUE |
|---|---|---|---|---|---|
| 0 | | | | $160,000 | $200,000 |
| 1 | $14,255 | $14,255 | $0 | $168,000 | $210,000 |
| 2 | $14,975 | $14,915 | $0 | $176,400 | $220,500 |
| 3 | $15,731 | $15,731 | $0 | $185,220 | $231,525 |
| 4 | $16,525 | $16,525 | $0 | $194,481 | $243,101 |
| 5 | $17,358 | $17,358 | $0 | $204,205 | $255,256 |
| 6 | $18,233 | $18,233 | $0 | $214,415 | $268,019 |
| 7 | $19,142 | $19,142 | $0 | $225,136 | $281,420 |
| 8 | $20,117 | $20,117 | $0 | $236,393 | $295,491 |
| 9 | $21,130 | $21,130 | $0 | $248,213 | $310,266 |
| 10 | $22,194 | $22,194 | $0 | $260,623 | $325,779 |
| 11 | $23,311 | $23,311 | $0 | $273,654 | $342,068 |
| 12 | $24,484 | $24,484 | $0 | $287,337 | $359,171 |
| 13 | $25,715 | $25,715 | $0 | $301,704 | $377,130 |
| 14 | $27,008 | $27,008 | $0 | $316,789 | $395,986 |
| 15 | $28,366 | $28,366 | $0 | $332,629 | $415,786 |
| 16 | $29,791 | $29,791 | $0 | $349,260 | $436,575 |
| 17 | $31,288 | $31,288 | $0 | $366,723 | $458,404 |

TABLE 11-continued

MORTGAGE AMORTIZATION SCHEDULE - HOME ® MORTGAGE

| YEAR END | TOTAL PAYMENT | INTEREST | PRINCIPAL | MORTGAGE BALANCE | HOME VALUE |
|---|---|---|---|---|---|
| 18 | $32,860 | $32,860 | $0 | $385,059 | $481,224 |
| 19 | $34,510 | $34,510 | $0 | $404,312 | $505,390 |
| 20 | $36,243 | $36,243 | $0 | $424,528 | $530,660 |
| 21 | $38,062 | $38,062 | $0 | $445,754 | $557,193 |
| 22 | $39,973 | $39,973 | $0 | $468,042 | $585,052 |
| 23 | $41,979 | $41,979 | $0 | $491,444 | $614,305 |
| 24 | $44,085 | $44,085 | $0 | $516,016 | $645,020 |
| 25 | $46,296 | $46,296 | $0 | $541,817 | $677,271 |
| 26 | $48,618 | $48,618 | $0 | $568,908 | $711,135 |
| 27 | $51,057 | $51,057 | $0 | $597,353 | $746,691 |
| 28 | $53,617 | $53,617 | $0 | $627,221 | $784,026 |
| 29 | $56,305 | $56,305 | $0 | $658,582 | $823,227 |
| 30 | $59,127 | $59,127 | $0 | $691,511 | $864,388 |

As shown in Table 12, the conventional mortgage results for the prototypical, capital growth-oriented borrower are the same as for the conservative borrower. However, the benefits of using the HOME Account™ system are more dramatic for the growth-oriented borrower. As shown in Table 13, total net worth in year 30 is $11,227,294.

TABLE 12

| YEAR | 1 | 10 | 20 | 30 |
|---|---|---|---|---|
| CURRENT INCOME POSITION | | | | |
| Gross earned income | $ 60,000 | $ 93,098 | $151,617 | $ 246,968 |
| Interest income | $ 307 | $ 3,898 | $ 16,691 | $ 48,478 |
| Total income | $ 60,307 | $ 96,977 | $168,308 | $ 295,446 |
| Net after tax income | $ 48,442 | $ 75,406 | $127,853 | $ 221,295 |
| Disposable income ex-model | $ 20,000 | $ 36,769 | $ 72,331 | $ 142,285 |
| OPENING NET WORTH POSITION | $ 50,000 | $223,237 | $650,640 | $1,598,099 |
| Assets | $219,868 | $394,131 | $814,949 | $1,698,951 |
| Financial Assets | $ 9,868 | $ 68,352 | $284,290 | $ 875,723 |
| Checking account | $ 5,000 | $ 5,000 | $ 5,000 | $ 5,000 |
| MMDA | $ 27,888 | $ 33,220 | $ 79,723 | $ 142,772 |
| CD | $ 0 | $ 0 | $104,382 | $ 492,332 |
| IRA | $ 2,080 | $ 30,132 | $ 95,185 | $ 235,629 |
| SEP | $ 0 | $ 0 | $ 0 | $ 0 |
| Annuity | $ 0 | $ 0 | $ 0 | $ 0 |
| Corporate bond | $ 0 | $ 0 | $ 0 | $ 0 |
| Mixed stock & bond fund | $ 0 | $ 0 | $ 0 | $ 0 |
| Tangible Assets | $210,000 | $325,779 | $530,660 | $ 823,228 |
| Home value | $210,000 | $325,779 | $530,660 | $ 823,228 |
| Liabilities | $158,806 | $141,940 | $ 99,541 | $ 0 |
| Credit Card | $ 0 | $ 0 | $ 0 | $ 0 |
| Personal line of credit | $ 0 | $ 0 | $ 0 | $ 0 |
| HELOC | $ 0 | $ 0 | $ 0 | $ 0 |
| Home mortgage | $158,806 | $141,940 | $ 99,541 | $ 0 |
| ENDING NET WORTH POSITION | $ 61,062 | $252,191 | $715,408 | $1,698,951 |
| NET CHANGE IN POSITION | $ 11,062 | $ 28,953 | $ 64,768 | $ 100,854 |

SUMMARY INFORMATION

| YEAR | 1 | 10 | 20 | 30 | CUM | NPV |
|---|---|---|---|---|---|---|
| Net after-tax income | $48,442 | $ 75,406 | $128,717 | $ 227,340 | $3,408,502 | $1,092,941 |
| Taxes paid | $11,865 | $ 21,572 | $ 40,774 | $ 76,385 | $1,060,392 | $ 355,998 |
| Net worth | $61,062 | $252,191 | $715,408 | $1,698,952 | | $ 520,945 |
| Retirement savings | $ 4,868 | $ 63,352 | $273,359 | $ 796,416 | | $ 255,372 |

TABLE 13

| YEAR | 1 | 10 | 20 | 30 |
|---|---|---|---|---|
| CURRENT INCOME POSITION | | | | |
| Gross earned income | $ 60,000 | $ 93,080 | $ 151,617 | $ 246,968 |
| Interest income | $ 349 | $ 21,725 | $ 167,601 | $ 1,147,025 |
| Total income | $ 60,349 | $114,805 | $ 319,218 | $ 1,393,993 |
| Net after tax income | $ 48,472 | $ 96,935 | $ 246,907 | $ 1,081,395 |
| Disposable income ex-model | $ 20,000 | $ 36,769 | $ 72,331 | $ 142,285 |
| OPENING NET WORTH POSITION | $ 50,000 | $290,521 | $1,604,576 | $ 9,386,725 |
| Assets | $221,304 | $593,813 | $2,310,764 | $11,885,876 |
| Financial Assets | $ 11,304 | $268,034 | $1,780,105 | $11,062,648 |
| Checking account | $ 5,000 | $ 5,000 | $ 5,000 | $ 5,000 |
| MMDA | $ 4,224 | $ 13,054 | $ 30,166 | $ 60,810 |
| CD | $ 0 | $ 0 | $ 0 | $ 0 |
| IRA | $ 2,080 | $ 30,132 | $ 95,185 | $ 235,629 |
| SEP | $ 0 | $125,986 | $ 591,746 | $ 1,729,515 |
| Annuity | $ 0 | $ 0 | $ 0 | $ 0 |
| Corporatebond | $ 0 | $ 0 | $ 0 | $ 0 |
| Mixed stock & bond fund | $ 0 | $ 93,862 | $1,058,008 | $ 9,031,694 |
| Tangible Assets | $210,000 | $325,779 | $ 530,660 | $ 823,227 |
| Home value | $210,000 | $325,779 | $ 530,660 | $ 823,227 |
| Liabilities | $160,000 | $248,213 | $ 404,312 | $ 658,582 |
| Credit Card | $ 0 | $ 0 | $ 0 | $ 0 |
| Personal line of credit | $ 0 | $ 0 | $ 0 | $ 0 |
| HELOC | $ 0 | $ 0 | $ 0 | $ 0 |
| Home mortgage | $160,000 | $248,213 | $ 404,312 | $ 658,582 |
| ENDING NET WORTH POSITION | $ 61,304 | $345,601 | $1,906,452 | $11,227,294 |
| NET CHANGE IN POSITION | $ 11,304 | $ 55,080 | $ 301,876 | $ 1,840,569 |

SUMMARY INFORMATION

| YEAR | 1 | 10 | 20 | 30 | CUM | NPV |
|---|---|---|---|---|---|---|
| Net after-tax income | $48,472 | $ 96,935 | $ 264,907 | $ 1,081,395 | $8,434,793 | $2,704,628 |
| Taxes paid | $11,576 | $ 17,870 | $ 54,311 | $ 312,598 | $2,038,913 | $ 653,780 |
| Net Worth | $61,304 | $345,601 | $1,906,452 | $11,227,294 | | $3,600,048 |
| Retirement savings | $ 6,304 | $263,035 | $1,775,104 | $11,057,649 | | $3,545,651 |

While the examples given here are for individuals earning $60,000 per annum in year 1, the benefits of using the HOME Account™ system instead of a conventional mortgage are equally dramatic for other income levels. To implement a system capable of producing these useful improvements in the planning and management of personal financial assets and credit facilities requires considerable change in the present methods for originating, administering, and servicing financial accounts. The present invention details these changes which provide consumers the ability to improve the returns from their personal financial resources while also providing appropriate security for the financial institution.

The HOME Account™ system

Table 14 illustrates the type of asset accounts that an individual may utilize within the system. Some of these may be used as collateral as additional security for the HOME Account™ mortgage. Funds that might ordinarily be used to amortize a conventional mortgage may be invested in these asset accounts pursuant to the terms of the HOME Account™ system. The asset accounts include insurance and annuities, pension and deferred compensation accounts, banking accounts, mutual funds, brokerage accounts and other asset accounts. Specific forms of each of these types of assets are enumerated in Table 14.

TABLE 14

HOME ACCOUNT ™ ASSET ACCOUNTS

| Insurance and Annuities | Pension and Deferred Compensation | Banking Accounts | Mutual Funds | Brokerage Accounts | Other Assets |
|---|---|---|---|---|---|
| Life | IRA | checking | Money Market | Stock | Trusts |
| Health | 401(K) | Savings | Equity | Bonds and Fixed Income | Other real Property |
| Accident Casualty | SEP | NOW Account | Fixed Income | Options | Art and Antiques |
| Annuities | Keough | Money Market | International | Private Commodity Futures | Equity Holdings |
| Other | ESOP | Other | Options | Other | Derivative Securities |
| | Other | | Other | | Other |

Table 15 lists several types of liabilities and credit facilities available through the HOME Account™ system which include, but are not limited to, margin account borrowing, credit and debit cards, equity access loans and credit facilities, insurance and annuity policy loans, as well as other forms of liabilities and credit facilities. Specific forms of these liabilities and credit facilities are also set forth in Table 15.

TABLE 15

HOME ACCOUNT ™ LIABILITIES AND CREDIT FACILITIES

| Account Borrowing | Credit and Debit Cards | Equity Access Loans and Credit Facilities | Insurance and Annuity Policy Loans | Other |
|---|---|---|---|---|
| Against Equity Securities | Visa ® | Equity Access Loans and Home Equity Line of Credit | Insurance and Annuity Policy Facilities Loans | Student Loans/ Automobile Loans |
| Against Fixed Income Securities | MasterCard ® Diners Club ® | Second Mortgage | Against Insurance Policies | Pre- Existing Debt |
| N.A.V. of Options Account | American Express ® | HOME Account ™ Loan secured by NET | Against Annuities | Home Acquisition Loans |
| Other | Discover ® | HOME Account ™ Loan Secured by Account or Other Assets | Other | Home Rehabilitation Loans |
|  | Automatic Teller Machine (ATM) card | Other Mortgage Loans |  | Cash Advance Derivative Liabilities |
|  | Other | Other |  | Other |

The HOME Account™ system provides the individual the flexibility to maximize her financial performance and realize her financial objectives. Through the system of the invention, goods and services may be exchanged, and financial services and products can be automatically received and dispensed with. For example, withdrawals, deposits and transfers may be made; securities, commodities and debt instruments may be purchased, sold and transferred in and out of the account; a wide variety of different types of credit facilities and loans may be advanced to individuals using the HOME Account™ system; financial agreements such as insurance and annuity contracts and policies may be purchased or sold within the framework of the HOME Account™ system; the agreements, contracts and policies purchased may be transferred to safekeeping accounts monitored within the HOME Account™ system; and proceeds from credit facilities and loans received outside the framework of the HOME Account™ system may be transferred to the account for use in the acquisition of other assets.

Further, the HOME Account™ system provides a priority allocation feature which allocates funds from any source such as mortgage payments and additional cash flow. Additional cash flow may result from earned income and interest and dividend revenue on the asset accounts and capital appreciation. The funds are generally placed in an asset account recommended by the system and designated by the individual (e.g., an account having the highest interest rate or potential for capital appreciation). Alternatively, the funds can be utilized to pay off a liability account designated by the individual (e.g., an account charging the highest interest rate). Thus, the allocation feature provides the individual with an additional revenue earning feature that maximizes interest earnings and capital appreciation and/or minimizes interest charges.

The system of the present invention can provide the individual a periodic account activity report that clearly displays the details with regard to each transaction conducted within the account during a relevant time period. Such transactions include purchase and sale of goods and services or securities, withdrawal or deposit of cash, acquisition of annuities and insurance policies, and access to one or more types of credit facilities. The individual's earnings can be categorized and summarized according to such categories as interest, dividends, asset disposition, or wages. Every transaction executed on a debit or credit card, through an ATM, a telephone or facsimile based system, a voice recognition system or an automated interactive computer system can be entered in the HOME Account™ mortgage monthly statement. In this way, an accurate, on-going list of expenses and the type of expenses can be presented to the individual automatically at the end of every month, and a detailed summary can be presented at year end for assistance in preparing personal tax returns. Through the use of SmartCards™, credit or debit cards containing personal information and financial and credit history, an individual can, for example, establish and receive the full benefits of using the HOME Account™ system at an ATM or over the phone. Moreover, the cards used in the HOME Account™ system may be programmed to pay for charges incurred from debts secured against one or more of the asset accounts.

The system of the invention also provides an individual with a variety of standard accounting information which has been used in a business environment but has seldom been appropriately applied to personal financial reporting. For example, the system may provide an individual with statements concerning sources and uses of funds, personal balance sheets indicating the market value of assets and liabilities in each category and illustrating the individual's net worth, a profit and loss report indicating net income for the period and year to date, and an income and expense report comparing actual results to budgeted amounts. Data visualization, animation and multimedia computer hardware and software may be used to demonstrate the effects of an anticipated or an executed transaction upon an individual's financial status.

Through the system of the invention, the individual can also access a host of ancillary investment news, information, advice, and counseling. In particular, a individual can access a current news and information data base such as Reuters, Telekurs, Telerate, Dow Jones News Retrieval, "The Source" and Compuserve or other news and data services. For information retrieval, the data base can be accessed directly by the individual in a manner consistent with the appropriate security procedures, by structured query language (SQL), or by means of an expert system that interprets and filters text to retrieve news and other data.

Individual users of the HOME Account™ system can also receive personal financial planning and analysis assistance by means of an interactive expert computer system and direct consultation with financial planners. In the preferred embodiment of the invention, an expert system provides integrated financial advice consistent with the individual's specific investment objectives and budgetary and risk-related constraints. Recent advances in rule, case and fuzzy logic and model based expert systems in combination with advances in pattern recognition technologies such as neural networks, classifier systems incorporating genetic learning techniques and adductive reasoning tools offer financial institutions the ability to provide intelligent financial advice at a reduced cost and an enhanced level of reliability.

Knowledge based systems also offer a convenient and cost effective means of providing integrated planning and analysis services. Such systems are consistent with and utilize techniques derived from modern portfolio theory, capital asset pricing models, and operations research methodologies to help the customer realize her financial objectives. In cases where multiple problem solving techniques are required, an expert system such as a blackboard which incorporates cooperative and competitive expert agents can be used. In this way, each problem solving technique is applied to the appropriate aspect of the problem, and a form of machine learning is utilized. Both stochastic and fuzzy techniques for dynamic multi-objective decision making under uncertainty provide asset/liability and portfolio optimization tools that explicitly integrate considerations of risk and uncertainty in the planning process. The optimization techniques may be coupled with stochastic or other forms of scenario generation models and simulation techniques so that consumers can quickly and easily see the results of alternative asset and liability allocations and sources and uses of funds.

Moreover, expert systems offer full interactive explanatory capabilities so that individuals can understand both the advice given and the rationale and reasoning that generated the advice. The interactive nature of the system heightens all potential utilization through interactive television (ITV), Kiosk, and enhanced automated teller machines (ATM).

The system may also provide accounting and tax preparation assistance through an interactive computer system with on-line expert computer software assistance of certified public accountants. The individual may also receive tax, estate and legal counseling advice through an interactive expert system with full access to data bases such as LEXIS® (including all applicable tax code rules and regulations, ERISA regulations and applicable case law, etc.).

The MyNet™ and HOME Account™ Computer System and Data Structure

Depending upon the number of accounts in the HOME Account™ system and the complexity and size of each account, the system may be implemented on a network of one or more of the following: personal digital assistants, microcomputers, minicomputers, workstations, file servers, computer servers, data base management system servers, mainframe computers, super computers, or massively parallel processing computers. In a preferred embodiment of the invention, the financial institution or a data processing firm providing computing services to the financial institution would maintain a computer system that integrated different types of computer hardware into an open network computing environment.

In this type of massively distributed architecture with multiple processors, a single task may employ many resources such as data, processors, and memory transparently throughout the system. All aspects of the parallel distributed processing system may communicate with one another in a variety of forms (e.g., voice, data, multimedia, etc.). Users may utilize multiple processors in such a distributed computing environment. Further, key hardware components of the system are fault-tolerant. The operating system provides for real-time on-line transaction processing and offers a secure environment for multiple users conducting multitasking. Computer intensive activities such as use of expert systems, optimization, imaging and multimedia applications may be performed by separate processors or computer servers.

All aspects of the system including hardware and software applications may transparently communicate and share information with each other. In this way, financial institutions may provide convenient access to a full range of financial and information services to both customers and financial institution personnel. Computerized voice recognition techniques allow customers and personnel of financial institutions which enter transactions to have their identity confirmed for security purposes. The system advantageously incorporates recent advances in object oriented design in its operating system, communication protocols, and software design. Workstations by AT&T, NCR, SUN (Sparc Station 2), IBM (RS6000) and others incorporate the advances. These same companies produce file servers of various processing capacities. Parallel processing DBMS servers from Teradata and open system parallel processing servers from NCR (such as the System 3600) offer scalable parallel processing system capacity for expert system support and OLTP. Top End from NCR and Tuxedo/T from AT&T are illustrative transaction processing monitors that may be incorporated into the system.

Figure 2:
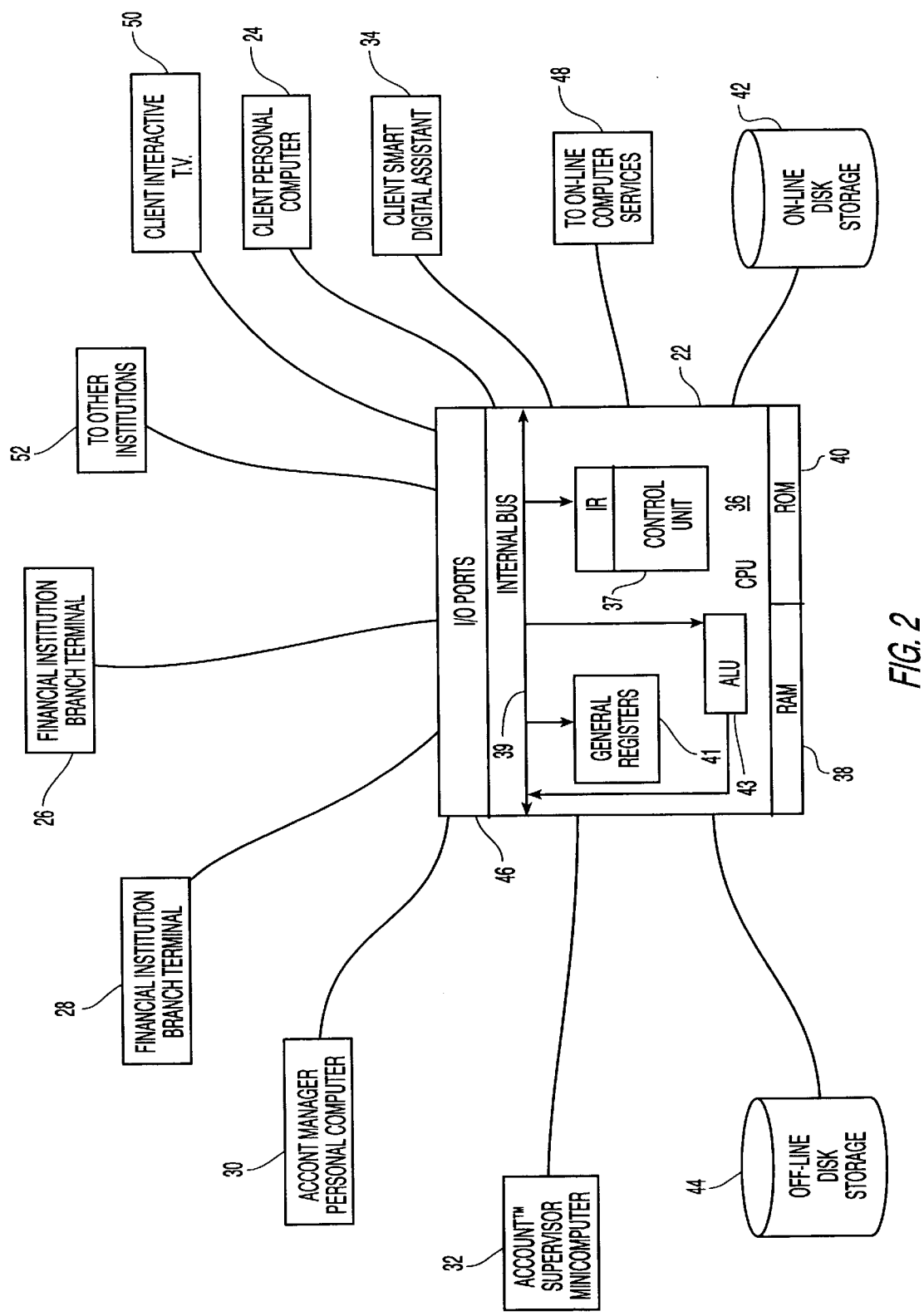
FIG. 2 illustrates the basic structure of the computer system to be used for the method and system of the present invention.

Referring to FIG. 2, the HOME Account™ system illustratively comprises a central computer 22, which may include a server, a minicomputer or mainframe connected to a plurality of terminal workstations, personal computers, personal digital assistants (PDAs) such as the MyNet™, SmartWallet™, SmartPurse™, or SmartCard™ devices described below, interactive video terminals such as the MyNet™ SmartBox™ terminal, or minicomputers 24, 26, 28, 30, 32. The central computer 22 stores the HOME Account™ mortgage information, and processes and updates the HOME Account™ mortgage components. In this type of ubiquitous computing environment, the wide area network of personal workstations, computers or low end minicomputers may be located at branch offices 26, 28 of the financial institution, at the desk of the HOME Account™ manager 30, HOME Account™ supervisor 32 and at the home of the individual 24. Alternatively, it may be carried by the individual in the form of portable computers or PDAs 34. These computers may act as terminals to one or more central computers or any one of the servers. They can communicate with and share data and applications with all other aspects of the system so as to record and store reports issued by the system during processing. Further, they may perform local processing of information particular to the user of the personal computer workstation. For example, the HOME Account™ manager may have a workstation PC at her desk through which she can communicate with all other aspects of the system, receive individual reports from the central computer and perform types of personal financial planning and analysis on the HOME Account™ system that need not be performed on the central computer.

The computer system 22 comprises a Central Processing Unit (CPU) 36, Random Access Memory (RAM) 38, Read Only Memory (ROM) 40, on-line disk storage 42, off-line disk storage 44 and communication and input/output (I/O) ports 46. CPU 36 illustratively comprises a control unit 37 responsive to programming commands provided by programs stored in computer memories such as RAM 38 and ROM 40, a bus network 39 connecting the computer memories, storage 42, 44 and I/O ports 46 to several registers 41, an arithmetic logic unit (ALU) 43 for processing data temporarily stored in the registers and for returning results to the registers or the network. In response to control signals from the control unit, data retrieved from memories 38, 40 storage 42, 44 and/or I/O ports 46, is operated on by the ALU and the results of the operation are provided to registers 41, memories 38, 40, storage 42, 44 and/or I/O ports 46.

The I/O ports 46 provide the means for communication with the individual, networks and other financial systems and services. For example, the system may connect to a network to access on-line computer services 48 such as news or financial information such as stock prices, or communicate with a brokerage firm for the processing of a transaction. The individual may communicate with the system to inquire about the status of her account, check news or financial information, or initiate a transaction. This may be accomplished through a terminal at the financial institution's office 26, 28, or through a personal computer with a modem or an interactive video terminal located in the individual's home 50. Such devices include a MyNet™ SmartBox™ device, a portable computer, a point of sale terminal linked to the network such as MyNet™ SmarTerminal™ device or an intelligent telecommunication device such as a PDA (e.g., MyNet™ SmartWallet™, SmartPurse™ or SmartCard™ devices). Other banks, financial service institutions and insurance companies 52 may communicate with the HOME Account™ system, for example, to transfer or verify asset and liability holdings.

The individual account information is stored in a database on the distributed multiprocessing computer system. Although the system is not limited in the types of databases that can be utilized, relational databases such as those offered by Synbase, Informix, Oracle, IBM (DB2), and Focus and object oriented data base management systems (OODBMS) may be implemented. Access to the databases may be made through direct SQL calls or through remote or stored procedure calls.

The system of the present invention includes a number of hardware and software features incorporated in devices such as the MyNet™ SmartWallet™, SmartPurse™, SmarTerminal™, SmartBox™ and SmartCard™ devices. The MyNet™ system uses a novel, unique combination of these features for the purpose of exchange, investment, and borrowing which provides great value and convenience to consumers and providers of financial services. Key design features of each MyNet™ instrument in the embodiment of the MyNet™ System are described, but not limited, as follows.

The preferred embodiment of the present invention contains one or more microprocessors such as the AT&T Hobbit, the Motorola Dragon, the ARM risc chip or the Intel/VLSI Polar which, for example, includes a RAM cache, graphics bus, power management controller, PCMCIA controller, integrated process controller, write back cache, and a video controller. Other application specific integrated circuits (ASICs) may be added to each of the MyNet™ instruments. In order to make the present invention mobile in the preferred embodiment of the invention, the MyNet™ System may be wireless. Accordingly, in the preferred embodiment of the present invention each of the MyNet™ instruments is equipped with wireless send and receive capability in and between the instrument itself and corresponding hardware (e.g., printers, interactive TV, desktop computers, etc.) to form LAN, WAN, and effectuate electronic funds transfers. Advantageously, the wireless capability is achieved using either radio or infrared communication technology.

With the use of PCMCIA and AT-IDE Slots to accommodate flash memory solid state mass storage systems, individual application specific cards with execute in place capability can enhance the individual user's access to other MyNet™ System compatible software. To simplify use of the MyNet™ instruments, the individual may use touch or pen based active matrix flat screens and multifunction pen with write, erase, cursor, light beam, and infrared capabilities. An individual may also effectuate a charge and receive confirmation of the authorization to further simplify use of the MyNet™ instruments.

The preferred embodiment of the invention contains Phone/Fax/Modem capability and a digital video camera and screen with a send and receive terminal. This allows the individual to use the SmartWallet™ and SmartPurse™ devices as wireless or wired communication devices to send and receive voice, data, video, documents, live financial quotations, and the like. A printer may be used to print checks, script or even, with the requisite regulatory approval, currency in amounts above preauthorized limits, after authorization through the MyNet™ System.

The preferred embodiment also incorporates a cellular antenna to link with digital cellular mobile telephone systems and a conventional radio antenna to receive and send radio signals such as those broadcast through RAM Mobile Data broadcast service and Ardis wireless packet data networks. These may be linked to McCaw Cellular Corp's or other cellular networks. Communication links of this nature allow users of the MyNet™ System to gain the cumulative geographic coverage of the interconnected networks.

Various security features may be used in the preferred embodiment of the invention to ensure security for both individuals and financial institutions. These include the on-line verification of a MyNet™ user's voice print, video prints, and periodic required use of a thumb print. For data transmission one may use public/private key encryption techniques, RSA Data Encryption, Open Collaboration Environment CT2 CAI, and/or Fast Ellipital Encryption. These security features can be repeatedly employed (before every transaction or at the time of each request for information) and at preset intermittent intervals in order to prevent unauthorized use of the MyNet™ instruments.

Handwriting recognition, voice recognition, fingerprint recognition, and optical character recognition may also be incorporated in the MyNet™ instruments and used as a security measure to insure the protection of the individual. The security features of the MyNet™ System instruments are of particular importance due to their transparent ease of use coupled with the robust nature of the protection offered. In 1987, more than 330 billion financial transactions were conducted without counting the number of requests for financial information. Accordingly, it is essential that the MyNet™ identity confirmation be simultaneously more secure and easier to effectuate than current means. In this way, no one but the authorized user may operate the MyNet™ instrument. Consumers may also pre-specify certain transaction limits which would require the authorization of one or more specified individuals if exceeded. Alternatively, individuals may limit the amount of purchases or transfers that may be done for one account within or during a specified time period.

For added convenience to the individual, the system may use a door opener and a silent key to open cars and doors. Further, it may incorporate standard TV, stereo and VCR remote control. Wired or wireless interfaces may be used by the individual when using headphone goggles or glasses like Visortron and Virtual Vision. Additional conveniences include a full sized keyboard, SCSI devices, printers and other peripheral devices. Other options include a bar code scanner with read/write capability, enhanced data storage capability, crystal jukebox holographic memory, and audio input and output capability.

While the invention will reduce the number of paper transactions and attendant record keeping burdens and errors, a "Cash Catcher" may be incorporated in the Smart-Wallet™ device to secure currency or checks for use in appropriate circumstances.

As they become available in commercial quantities, rechargeable Lithium-polymer batteries with AT&T's vanadium-oxide composite cathodes may be used. In the interim, conventional rechargeable nickel cadmium, rechargeable nickel metal hydride or rechargeable lithium ion batteries may be used. The MyNet™ instruments can also use solar energy to supply power.

Operating System

The MyNet™ SmartWallet™ and SmartPurse™ devices may incorporate one or more of the industry standard operating systems in the preferred embodiment, such as Microsoft's Win Pad (together with Mobile Windows and Windows Open Services Application "WOSA" API), and GO Corporation's PenPoint 2.0 that includes the GO Message Center and GO FAX or General Magics' Magic Communication Application Platform (CAP) and Telescript.

Specific applications may be embodied in iconified expert advisors including the MyNet™ SmartWallet™ Advisors (Experts built in) comprising financial advisors for financial analysis, planning and management. DigiLibrarian for search, retrieval and display of desired documentation or date; Super Shopper for analysis of comparative prices, values, negotiation and execution of financial transactions; Communicator for sending and receiving voice, data, fax, video, and photos; Scheduler for maintaining appointments and records; Concierge for analyzing and scheduling reservations at restaurants and arranging transportation, entertainment, etc.; and Producer, Writer, and Presentation Director for desk top publishing and others.

The preferred embodiment of the invention may use the Magic Communication Application Platform (General Magic) and its Telescript. It will be able to receive Live Quotes and allow its owner to play games interactively and access Hypertext Librarian (Text, Sound, and Video). In order to maximize RAM and ROM capacity for the individual, compression and decompression capabilities may be incorporated.

Other functional capabilities of the preferred embodiment of the MyNet™ system include global link capabilities that may utilize the GIS Global Positioning System (GIS/GPS) from Socket Communications Inc. (available in a PCMCIA form). The MyNet™ system may be used to track income, expenses, assets, liabilities, portfolio positions, frequent flyer miles and frequent flyer bonuses, rebates and refunds, compare prices and rates and negotiate and transact exchange, investment and borrowing. It incorporates interactive video, check writing and imaging and pre-approval for currency. This will allow the individual access to a broad base of instant information. For example, the individual can use her SmartPurse™ device to get all balances and transactions (pre-authorized) which the system of the present invention will consolidate for her. To further advance transactions, an interactive television "HOME Account™ Network" or HOMENet may be used to aggregate, compile, display and report monetary and non-monetary data (e.g., Frequent Flyer Miles, discounts, refunds, rebates, actual net price) which the individual may access by using an interactive SmartPurse™ device.

The system includes widely distributed interactive agents capable of negotiating, cooperating and transacting various forms of exchange, investment and borrowing. The MyNet™ SmarTerminal™ Point of Sale (POS) terminal functions may include credit authorization; transaction confirmation; check recognition and authorization; receive and send charge information from conventional magnetic strip card or infrared SmartWallet™, SmartPurse™, or SmartCard™ devices.

The system is consistent with industry standards such as industry standard hardware parts and standard operating systems. Further standards include IEEE 802.11 and DATA-PCS. Communications capability is available for use through RJ-11 telephone jacks for wired communication. Ultrathin LCD screens may, in the preferred embodiment, allow for extremely thin screens, and the MyNet™ instruments provide interfaces to keyboards and PCs.

The MyNet™ instruments further provide interactive displays and visualization of the results of processing different investment, spending and borrowing decisions to demonstrate the effect of such decisions. Share Vision™ may be used in the preferred embodiment of the invention for real time video, data, voice and company document conferencing. Share View™ may also include video mail distributed on LANs, WANs and MANs. Communications used in the preferred embodiment of the invention include wireless communication through infrared, microwave, cellular, and mobile radio. The use of MyNet™ instruments that have two-way wireless communication will allow convenience and portability for the individual.

Motorola's "Newstream", "News Card" and "Advanced Information Retrievers" may be employed with receive only modems. The EMBARC (Electronic Mail Broadcast Roam Computer) and "Alarm Clock" may also be used. Metriplex's Datapulse software which enables receipt of real time financial data and quotes may also be incorporated into the preferred form of the invention. The Cellular Digital Packet Data (CDPD) from McCaw Cellular and other firms may be used, as may Packet Switched Radio Communication Initiative, and RAM Mobile Data Mobiltex (RAM, BellSouth, Ericsson, GE, Intel, Ardis, IBM, Motorola and Celluplan II).

Figure 3:
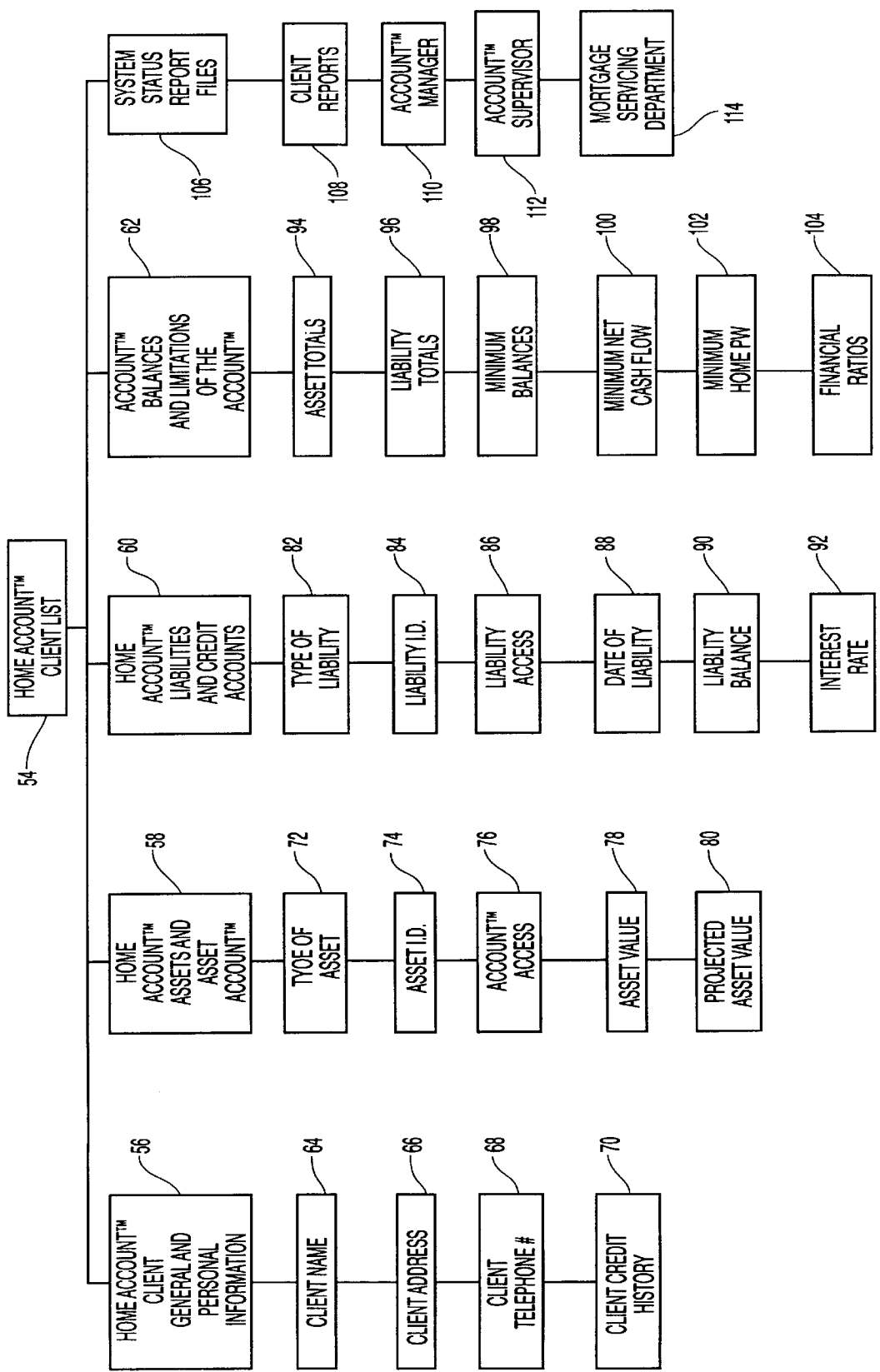
FIG. 3 illustrates the basic data structure of the present invention.

Referring to FIG. 3, the individual data illustratively are organized in the database into four areas (or files) indexed according to HOME Account™ client list 54: general and personal information of the individual 56, HOME Account™ asset information 58, HOME Account™ liability and credit account information 60, HOME Account™ balances and limitations of the account 62.

The HOME Account™ general and personal information file 56 contains personal and financial information on each individual, such as client name 64, home and work address 66, home and work telephone number 68 and past credit history 70. The HOME Account™ asset information file 58 contains all the data regarding each individual asset and asset account which is part of the HOME Account™ system. Each asset is described according to a variety of data including the type of asset 72, asset identifying information 74 (e.g., policy numbers, bank and bank account number), how it can be accessed 76 (e.g., bank or financial institution routing and transit numbers), the current value of the asset 78 and the projected future value of the asset 80.

The HOME Account™ liability and credit account file 60 contains information similar to the account asset file including the type of liability 82, identifying information on the liability 84, liability access 86, date of origination of the liability 88, the liability balance 90 and the interest rate 92 on the liability.

The HOME Account™ balance and account limitations files 62 contains HOME Account™ balance information relating to current sources and uses of funds (which will hereafter be referred to as a "budget") such as asset totals 94, liability totals 96, and account limitations such as agreed budget minimum imposed balances 98, minimum imposed net cash flow 100, minimum HOME Account™ borrowing power (MIM) 102 and financial ratios 104.

The HOME Account™ system can perform periodic screening of what may be referred to as the customer information file or the individual data files for the purpose of accessing information about the individual or marketing additional financial products to the individuals. Further, the account automatically reviews the individual databases for specific information including the individual's assets, liabilities, credit history, cash flow, age, etc. The account then matches the individual's particular personal and financial situation to either new financial products being offered or financial products that the individual is not presently using which would improve her financial well-being. If a match is found, the individual is notified of her eligibility to utilize the financial product(s) and apprised of the potential benefits and advised of any risks associated with the product (s). In this way, the individual receives the advantages of a marketing effort for a financial product that is suited to her circumstances; and the financial institution offering the product receives the advantages of a relatively low cost marketing effort and, possibly, additional revenue from fees collected on the product.

The HOME Account™ system also performs screening of the individual's account files to detect any irregularities in account transactions which might be an indication of fraudulent tampering by an outside source. For example, if there is a significant increase in the number of charges placed on a credit card in a short time period, or if multiple transactions are originating from a region other than the individuals home region, the account's screening process will automatically detect the irregularities, alert the account manager and then alert the individual. The screening process is accomplished in various ways. It may be performed by reviewing all recent transactions within a prespecified amount of time and comparing these transactions with past account transactions. This screening process can be used to support agreements between the individual and a financial institution which require screening performed continuously, prior to and/or immediately after transactions or in predetermined periodic intervals.

The HOME Account™ database also contains information on property appraisals, loan payments, and if necessary, foreclosed property. Through the integration of image processing and multimedia technologies, visual, verbal and animated video records of property condition, account transactions and documents can be monitored and controlled.

The data structure allocates files for storing system status reports 106 that are issued to the individual and the financial institution's departments and personnel during processing. This information is stored for access and reference by the party to whom the information is reported. For example, a file is provided to each individual to store client reports 108 issued to that individual. The reports are then accessible only by that particular individual. The HOME Account™ manager 110 and supervisor 112 also may have files allocated to them and the various departments of the institution such as the mortgage servicing department 114 in the financial institution. These files, in a fully distributed system, may be located on any of the system processors or data storage devices.

Although the HOME Account™ system is described herein as comprising four main areas or files organized according to the HOME Account™ client list, many other data structures may be realized within the scope of the present invention. For example, the data may be further distributed into a multiplicity of sub-files indexed according to predetermined data such as individual number and type of asset or, alternatively, a less distributed data structure.

As noted previously, the central element of the HOME Account™ system is the HOME Account™ mortgage. Referring to Table 16, the HOME Account™ mortgage can be described by elemental categories including: forms of collateral, legal documentation and financial terms and conditions.

TABLE 16

HOME ACCOUNT ™ MORTGAGE ELEMENTS

| Potential Forms of Collateral | Legal Documentation | Terms for Conditions |
| --- | --- | --- |
| Home(s) | HOME Account ™ mortgage Master Agreement | Minimum Principal Outstanding Balance |
| Insurance and Annuities | Individual Secured Collateral Agreements | Required Interest Payments |
| Pension and Deferred Compensation Plans | Cross-collateral- ization Agreements Alternative Individual Asset Account Agreements | Amortization Payrnents or Investments |

TABLE 16-continued

HOME ACCOUNT ™ MORTGAGE ELEMENTS

| Potential Forms of Collateral | Legal Documentation | Terms for Conditions |
|---|---|---|
| Banking Accounts | Other | Fees & Expenses |
| Mutual Funds | Term of Mortgage | |
| Forecast Future Income or Cash Flow | Other | |
| Other Assets | | |

Some acceptable forms of collateral include: one or more homes that would be valued for purposes of collateralization at a percentage of their appraised fair market value, insurance and annuity policies that may be valued for purposes of collateralization at their net fair market or cash redemption value, various forms of pension and deferred compensation plans and accounts that may be valued for purposes of collateralization at their net fair market value, bank accounts including checking and savings accounts to be valued for purposes of collateralization at their net account balances, mutual funds that may be valued for purposes of collateralization at the net fair market redemption value and other forms of alternate collateral.

The required legal documentation for the HOME Account™ mortgage may include, but is not limited to, a HOME Account™ mortgage agreement, individual security agreements for each of the various assets used as collateral, cross- collateralization agreements that allow the value of various asset accounts to be used as further collateral and individual asset account agreements including those which establish and set forth the operations of the asset accounts.

The complicated nature of derivative financial service products may require additional documentation to implement the contractual agreements between the financial institution and the customer. Moreover, the specifications of the agreements may be altered during the term of the financial service product to reflect any alterations in the nature of the collateral or other component parts of the product. For example, the documents for the derivative version of the system offered to current mortgage holders may differ from those documents offered to new home owners.

Some financial terms and conditions of the HOME Account™ mortgage which are substantially new and different from those of conventional financial service products such as mortgages include: a continuous real time determination of the permissible outstanding balance of the mortgage which takes into consideration the value of all assets used to collateralize the mortgage; interest payments which can be either fixed rate, floating rate, or a combination of both as determined by the individual and lending institution; variable amortization payments, if any, which may, in the preferred embodiment of the invention, constitute zero amortization payments in exchange for the individual making alternative investments in asset accounts of her choice, or paying off or reducing liability accounts of her choice; prioritization of the allocation of funds to asset accounts and liability accounts utilized to maximize the individual's financial position during the term or life of the mortgage which would, in many instances, be of a term of 10 to more than 30 years but could be different dependent upon agreements reached by the lending institution and the individual; required fees and expenses for the initiation and continuation of the HOME Account™ mortgage including origination fees, servicing fees, closing costs and prepayment penalties; and other terms and conditions as may be required.

Mortgage Origination and Servicing Overview

Figure 4:
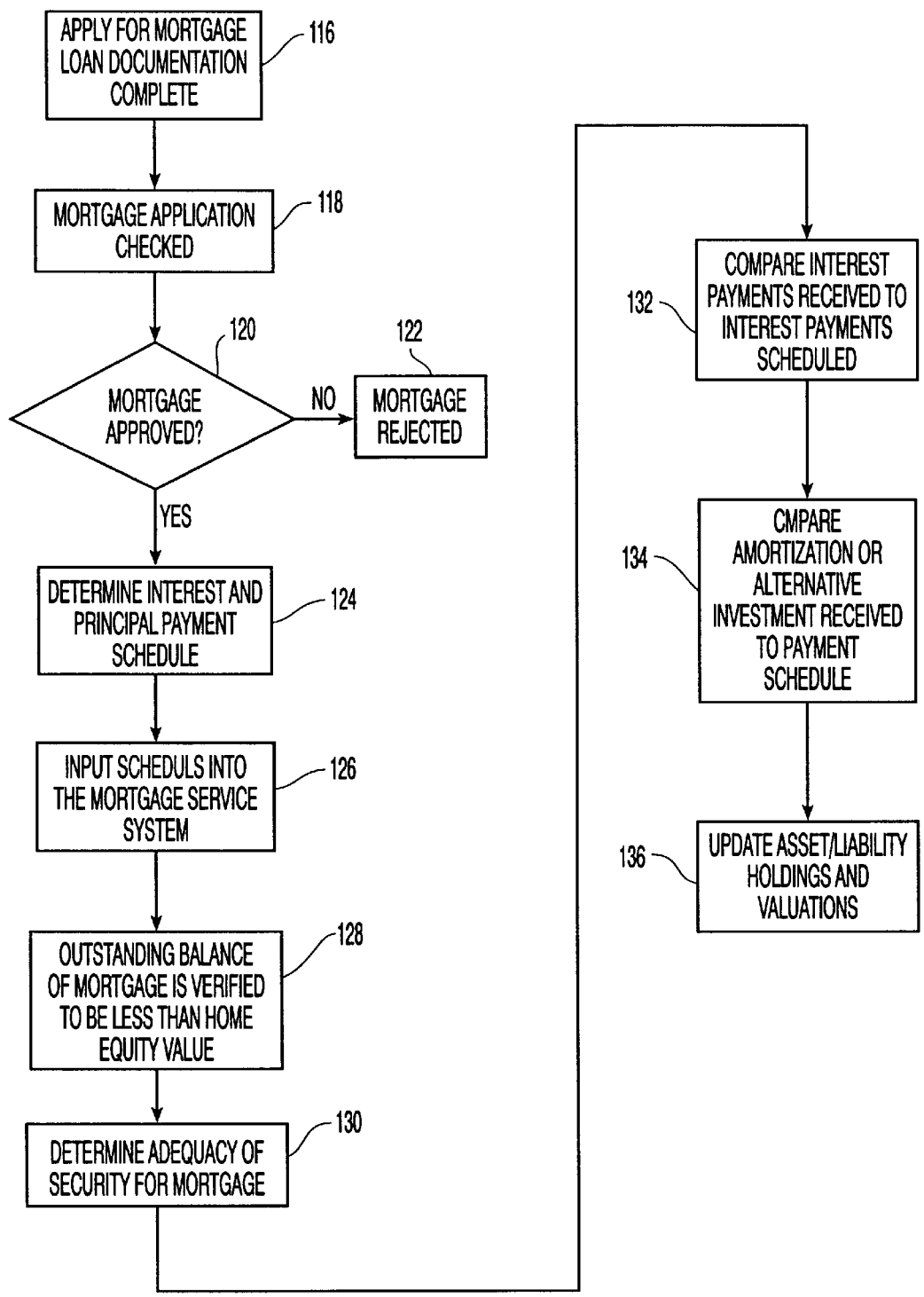
FIG. 4 generally depicts the primary elements of the mortgage process.

Referring to FIG. 4, once the financial service customer completes the loan documentation 116, the loan origination documentation is checked 118 and the HOME Account™ mortgage is approved or rejected by the financial institution 120, 122. If the mortgage is approved, the scheduled interest and principal payments are determined 124 and then input into the mortgage service system 126 so that continuous real time verification and cross-verification can be performed to detect any irregularities or delinquencies in payments. The payments can comprise fixed or variable amortization.

In servicing the HOME Account™ mortgage, the outstanding balances of the HOME Account™ mortgage are processed in real time and verified to be less than the total value of the home owners mortgageable equity (hereinafter called "HOMEquity") 128. HOMEquity equals NET plus the net fair market appraisal value for purposes of collateralization of the individual's home(s). The adequacy or inadequacy of security for the HOME Account™ mortgage must be determined 130. The required interest payments received are then compared to payments scheduled when the mortgage is originated 132. The required principal amortization payments or additional alternative investment is compared to the amounts received 134. Updated documentation on asset and liability holdings and valuations must be generated 136. In addition, other calculations may be made and verified to satisfy applicable regulatory authorities and to prevent unauthorized transfers or creation of debit balances in excess of applicable credit limits.

Internal regulatory and individual reporting is an integral part of the system of the present invention. Internally these reports must be updated on a real time basis although the individual and regulatory authorities may only receive a report on a periodic basis and when there is a discrepancy or delinquency. Advantageously, the system of the present invention incorporates the use of data visualization and virtual reality techniques in its reporting and document preparation and presentation. Documents incorporating sound and video are automatically generated at the end of reporting periods and transmitted to individuals though any one of several selected media.

Figure 5:
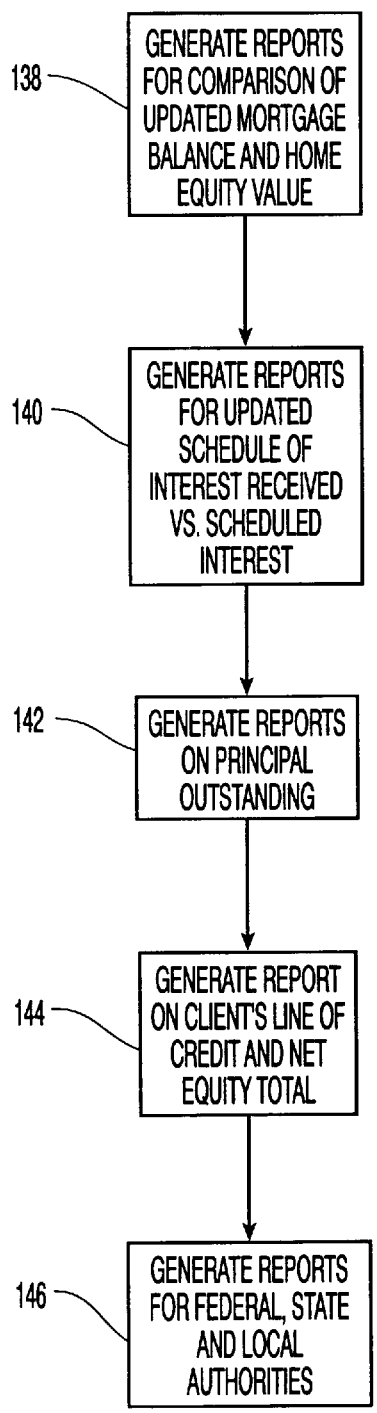
FIG. 5 depicts the mortgage reporting process.

As illustrated in FIG. 5, reports are generated concerning updated HOME Account™ mortgage balances which are calculated daily and compared to the HOMEquity value 138. Likewise, updated schedules of interest received versus interest payments scheduled must be reported 140. Also, updated reports of the amount of principal outstanding must be reported 142. The individual's line of credit and NET must be calculated and reported 144. Reports are also generated for the applicable federal, state and local authorities in compliance with banking, insurance, ERISA and securities laws 146.

Mortgage origination

Figure 6:
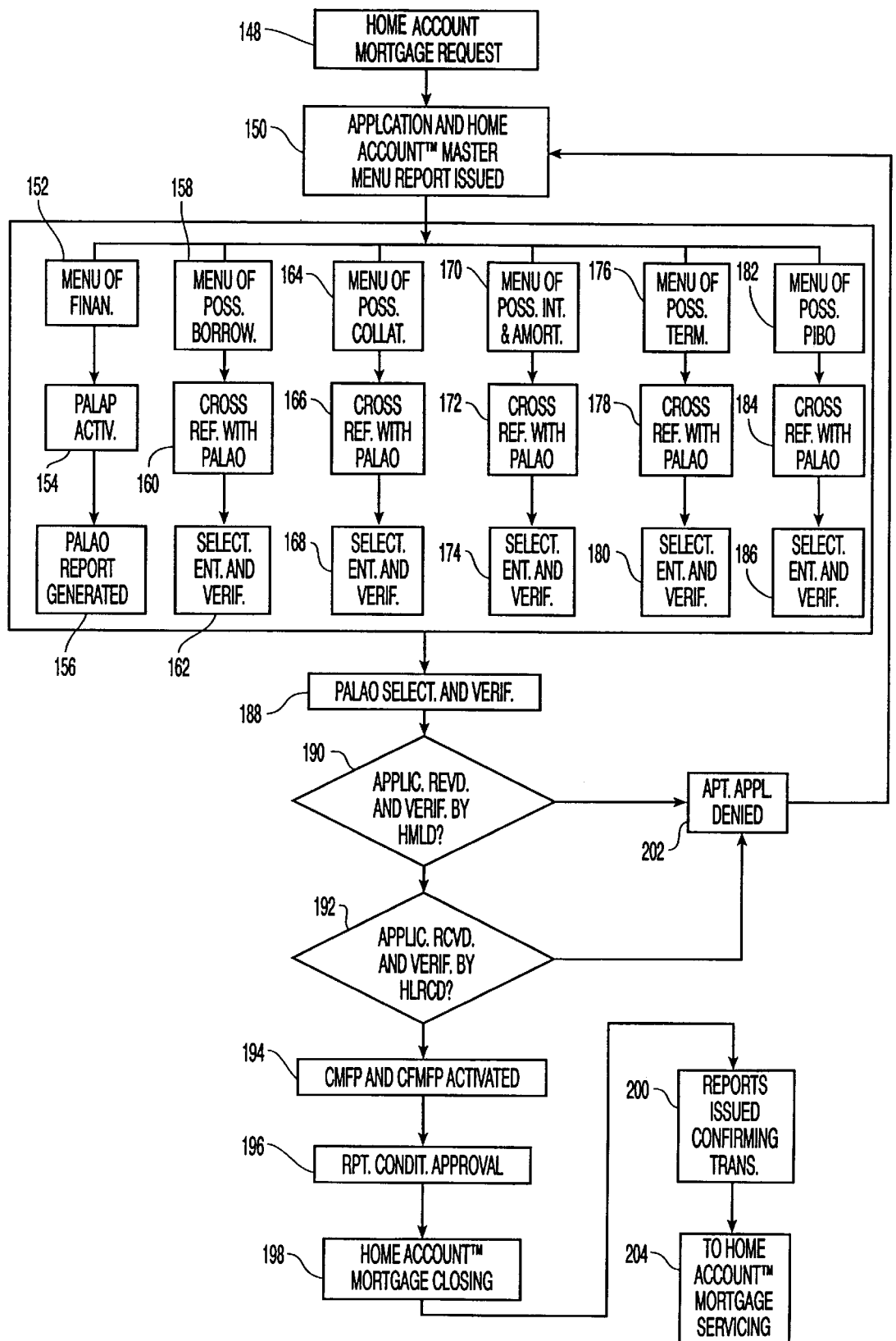
FIG. 6 depicts the mortgage origination process.

FIG. 6 depicts in greater detail the HOME Accounts™ mortgage origination process of FIG. 4 which is initiated when the client requests a HOME Account™ mortgage 148. The illustrated mortgage application process assumes that the individual already has an account in the HOME Account™ system and has access to the central computer through a computer terminal or terminal-emulating computer. A HOME Account™ mortgage application menu and the HOME mortgage master menu are presented to the individual 150. These two menus include a number of chapters or sub-menus which closely resemble information that must be completed to originate a standard mortgage and others that are uniquely attributable to the HOME Account™ mortgage.

The individual uses the menu of financial information to report her qualifications including financial and employment background, assets owned, anticipated income, and the like 152. This information is standard to almost all mortgage applications. Much of this data may be automatically input from the system data structure into her application insofar as the HOME Account™ data files already have this information as part of her account in the HOME Account™ system.

The Priority Asset and Liability Allocation Process (PALAP) is then initiated 154. As will be explained in more detail in conjunction with FIG. 15, PALAP utilizes a programming function to perform personal financial planning, analysis and management and establish a system of priorities for the allocation of sources and uses of funds to client asset and liability accounts. Through PALAP, the system generates for the individual a suggested Priority Asset and Liability Allocation Order (PALAO) 156 which can be either an improved or an optimal PALAO for the individual. Typically, the PALAO is designed to earn the most revenue for the individual over a defined time period. Accounts are often prioritized on the basis of economic factors such as interest rates, dividends, forecast returns, or commissions or through a robust stochastic process that prioritizes over a wide range of scenarios.

The individual may select alternative financial objectives such as maximizing net worth at retirement. The individual may also request that the accounts be prioritized based on intangibles such as a desire to maintain a certain level of liquidity or simply sentimental value. Financial statements based on the recommended PALAO are provided to the individual to illustrate the effect of the proposed financial plan. These statements may incorporate data visualization techniques and an expert system with interactive explanatory features. An individual's PALAO provides the guidelines by which the financial institution governs, regulates and monitors the individual account. Updated PALAOs together with financial projections based upon those updated PALAOs may be made available to the individual for her review and subsequent selection during the remainder of the mortgage application process.

The individual is then presented a menu from which the individual may select (1) her desired level of borrowing which will be secured by her home or homes and one or more other assets 158 and (2) other complementary financial service products. This level of borrowing may be of a declining amount over a period of time (i.e., with a certain amount of amortization), it may be for a fixed amount (i.e., nonamortizing), it may be of an increasing amount provided that the individual will be able to increase the amount of collateral in the account. This is possible through appreciation of assets currently held or by adding additional assets or income to her HOME Account™ mortgage over time. Finally, the level of borrowing may vary over time according to the customer's best economic interest and consistent with the financial institution's credit standards. The level of borrowing as well as the other financial service products selected may be subject to satisfaction of certain conditions, (e.g., income levels, levels of appreciation or depreciation of capital assets, etc.). The available borrowing alternatives are presented and cross-referenced with PALAO alternatives 160 so that the individual can observe how the different levels of borrowing affect her financial planning. Once the individual selects the level of borrowing, the selection must be entered into the central computer and verified 162.

The individual is then shown various proposed collateral selections from a submenu featuring those items 164. In addition to the home or homes that the applicant desires to use as collateral, she may name a number of other asset accounts by cross-referencing to PALAO alternatives 166. In addition to selecting the asset accounts to be used as collateral, the individual must indicate and verify the proposed priority of collateralization of those assets. For example, after the home(s) is used to collateralize the borrowing, the individual may wish to use the money market account balances or bank account balances since they have a high loan to value ratio and do not offer low interest cost borrowing, as loans against single premium whole life insurance policies and annuities do. The individual selects the assets to be used as collateral and the priority of collateralization, enters the selections into the central computer and verifies the selections 168.

A individual is also presented a menu of potential interest and amortization schedules 170 which includes the priority of funding amortization payments and interest expenses on the proposed mortgage. The individual may cross reference to the PALAO alternatives and the level of borrowing selected 172 to see the financial impact the various selections have. Alternatively, the integrated expert system may do this for the individual automatically. By cross referencing to the PALAO alternatives a variety of options are presented, and the individual selects one of the options and then verifies the interest and amortization schedules and the priority of funding amortization payments and interest expenses 174.

The individual is also presented with a menu of potential term structures of the HOME Account™ mortgage 176. The effects on the account of the different structures may be seen by cross referencing to the PALAO alternatives 178. The individual enters the term structure selected and verifies her selection 180.

The individual is then presented a menu of potential Priority Investment and Borrowing Orders (PIBO) 182 that are integrally interrelated to the PALAO presented in block 156. These alternatives may also be cross referenced to PALAO 184 to see the overall effect the different PIBO selections have on the individual's account. Once the PIBO is entered and verified 186, the individual selects, enters and verifies the PALAO 188. It should be noted that once the PIBO has been selected, the PALAO may be determined approximately because the PIBO and PALAO selected should be mutually compatible.

In practice, the individual switches back and forth among the various menu screens and cross references the alternative PALAOs suggested in order to select a financial package that best meets her needs and objectives. Alternatively, this may be performed by an expert system. Cross-referencing may be assisted through the use of an expert system with data visualization and multimedia tools that help the individual see the results of selecting different options. Over time, the above referenced steps for determining the appropriate PALAO and PIBO and for originating a HOME Account™ mortgage may be periodically redone to best help the individual realize her financial objectives given changing economic and financial circumstances.

Completion of the preceding steps finalizes the application process and the completed application is submitted to the HOME Account™ Mortgage Loan Department (HMLD) for review and verification 190. If the application is approved by the loan department, the necessary documents are submitted for review and verification by the HOME Account™ Legal and Regulatory Compliance Department (HLRCD) 192. An integrated loan evaluator is used as a decision support tool to assist with this task.

Upon approval, the Cash Flow and Collateral Monitoring and Forecasting Processes (CFMFP and CMFP) are activated 194 so that any interim changes in either the value of the proposed collateral or the projected cash flow of the individual can be determined prior to the time of closing of the mortgage.

Conditional approval of the mortgage is then reported to the individual, the individual's account manager, the mortgage loan origination department and the mortgage servicing department 196. A report documenting the approval is also issued to the HOME Account™ history file. If no adverse change is indicated by the cash flow monitoring and forecasting processes prior to closing, the HOME Account™ mortgage will be closed 198 and reports of its closing will be issued 200.

If the mortgage application is rejected either by the loan department or the legal and regulatory compliance department, then approval is denied 202 and a report is issued stating the reason for denial. The individual is then given the opportunity to make an alternate mortgage application at a later date if desired 150 and to acquire one or more other financial service products.

Once the mortgage is originated and its terms and conditions are set, the primary responsibility for monitoring and servicing the HOME Account™ mortgage belongs to the HOME Account™ Mortgage Servicing Department (HMSD) 204. Over time, any variations in any terms or conditions are reported to the HMSD.

Mortgage servicing

Figure 7:
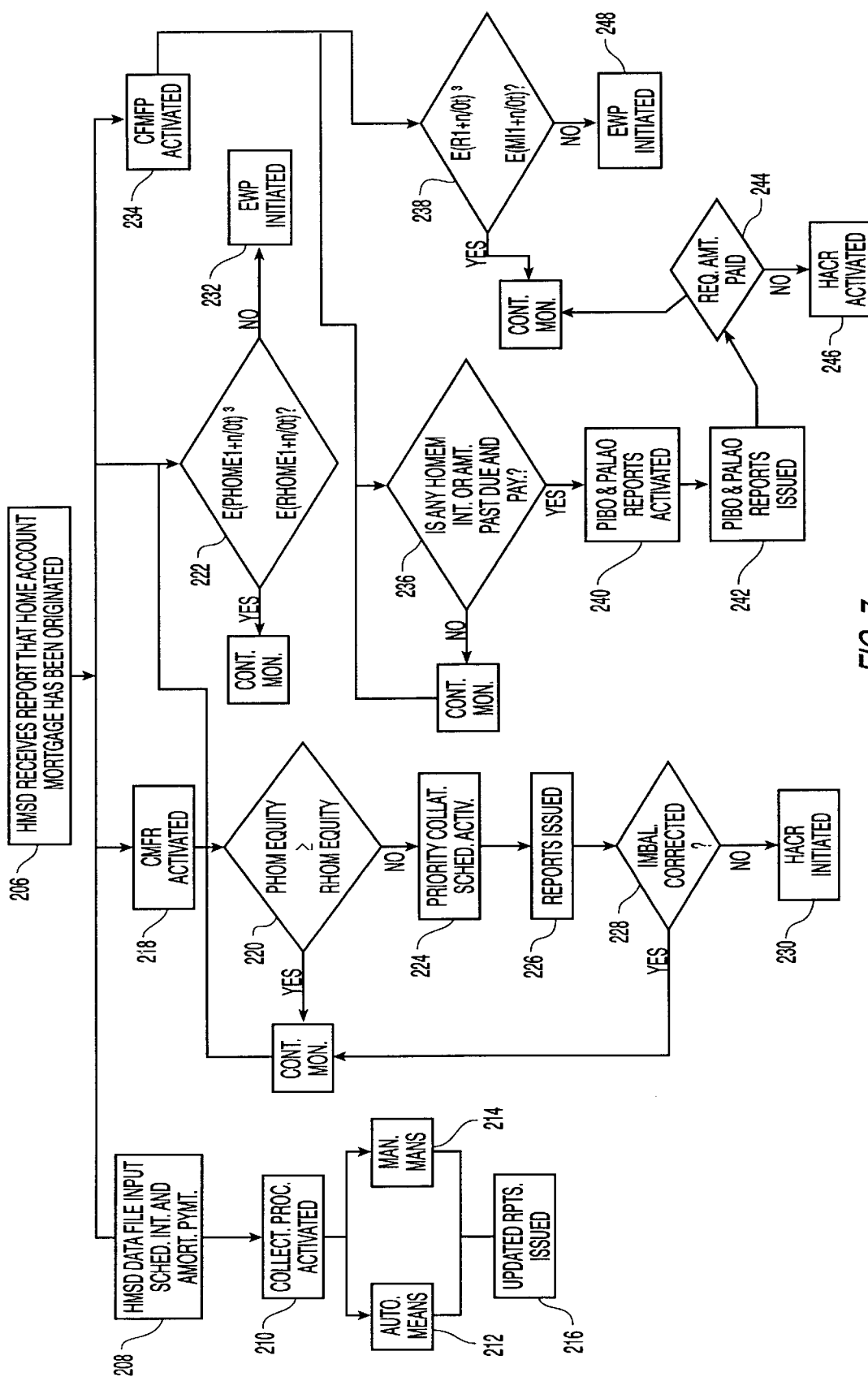
FIG. 7 depicts the mortgage servicing process.

Referring to FIG. 7, the HOME Account™ mortgage servicing process is initiated as soon as a report is issued to the mortgage servicing department indicating that a mortgage has been originated 206. One aspect of the HOME Account™ mortgage servicing process which is virtually identical to the standard mortgage servicing process is the collection activity which has some slight variation due to certain unique attributes of the HOME Account™ mortgage. First, an interest and amortization schedule for the mortgage is input into the mortgage servicing department's data file 208. Once completed, a collection procedure is activated 210 and the schedule is used to monitor all collection activities which may be done either by automatic or manual means 212, 214.

Most mortgage collection activities are currently executed manually, typically by sending a letter to the mortgagee advising her or him of the amount of payment due or recording receipt of a check for the amount of the payment. If the mortgage payment is not received on a timely basis, collection activities are initiated.

Mortgage payments may be made in cash, by check or by various means of electronic funds transfer. Because of the structure of the HOME Account™ mortgage, the individual may elect to order transactions to be executed through automatic means of payment, for example, the individual's payroll may be debited for the amount of interest and/or amortization payments. The individual may also elect to order transactions to be executed through a machine interface such as an automatic teller machine (ATM), an interactive television, a telephone, a personal computer in cooperation with a modem or other means. All of these methods allow transactions to be executed on the individual's account and all subaccounts through a remote delivery process which does not require direct contact with personnel from the financial institution. The expert system can also institute payment from any asset account or credit facility automatically or with verification by the individual. Upon the collection or failure to receive the required funds, updated reports are issued to the individual data file, the mortgage servicing department's data file and the master history file 216.

The unique aspects of the HOME Account™ mortgage servicing process accommodate the wide variety of options available to the individual and to the financial institution. Specifically, a variety of planning, coordinating, and supervisory activities are used to ensure that the individual remains in compliance with the terms and conditions of the mortgage in a constantly changing financial environment. With respect to compliance, the system provides an early warning process in the event that it is forecast that there will be a future imbalance. The early warning process is discussed below.

Prior to the funding of the mortgage or any other form of financing or loan, the collateral monitoring and forecasting process is activated 218. Two tests are performed on the individual's net total assets or HOMEquity. First, the amount of pledged HOMEquity (PHOMEquity) must be greater than or equal to the minimum required HOMEquity (RHOMEquity) 220. Second, the amount of expected future pledged HOMEquity at time t+n ($E(PHOME_{t+n})$) based upon the information currently available at time t must be greater than or equal to the expected value of the minimum required future HOMEquity at time t+n ($E(RHOME_{t+n})$) given the information base currently available at time t ($E(PHOMEquity_{t+n}/\Theta_t)/(E(RHOMEquity_{t+n}/\Theta_t)$222. The variable "t" represents the current time period, "E" is the expected value operator, "$\Theta_t$" is the information set assumed to be fully available at time t and "n" represents the incremental value of the future time period determined by the financial institution to be the relevant time horizon.

If both of these conditions are satisfied, the system merely continues to monitor these values and no further action is taken. However, if in the current period the HOMEquity is insufficient, the priority collateralization schedule completed during the mortgage application process is activated and used to select other assets from the account that must be collateralized in order to correct the imbalance 224. A report is then issued 226 to the mortgage servicing department data file, the account individual file, the account master history file and the account manager stating that the account was out of balance. If, however, the imbalance cannot be corrected with the priority collateralization schedule 228, the HOME Account™ Compliance Routine (HACR) is initiated 230, details of which are provided below. If the expected future value of HOMEquity is less than the required amount, an Early Warning Process (EWP) is initiated 232, details of which are provided in conjunction with FIG. 11.

Another means of account supervision and coordination in the HOME Account™ servicing process is the Cash Flow Monitoring and Forecasting Process (CFMFP) 234. This process monitors the flows of financial assets and liabilities as opposed to the collateral monitoring process which monitors the quantity of financial assets and liabilities. Two tests are conducted. First, is any mortgage interest or amortization payment past due and payable 236; and second, is the expected future total return to be received by the HOME Account™ client greater than or equal to the expected future amount of mortgage interest and amortization payable at time t 238 given the set of current information: $(E(R_{t+n}/\Theta_t))$ /$(E(MI_{t+n}/\Theta_t))$. "R" represents the return to be received by the individual and "MI" represents the mortgage interest and amortization payable.

If currently no mortgage interest or amortization payments are past due and payable and no shortfalls are expected, the conditions are satisfied and the system continues to monitor these valves and no further action is taken. However, if there are interest or amortization payments past due, the Priority Interest and Borrowing Order (PIBO) previously selected by the individual is activated and used to determine how to fund those payments 240. Reports are issued to the individual and the account servicing department data file stating the amount past due and period of the deficiency 242. If the required amount plus any penalties are paid 244, the system returns to its monitoring state. If the amount due cannot be fully funded in the manner according to the PIBO selected, HACR is initiated 246.

If the interest and amortization payments are not past due but the expected future total returns of the individual are not greater than or equal to the expected HOME Account™ mortgage interest and amortization payments, the early warning process is initiated 248.

As will be explained later, because of the variety, flexibility and complexity of the account, other tests may be performed to insure that the account and the components within the account meet the minimum requirements specified by the financial institution and regulatory authorities. In particular, the Home Owner's Mortgageable Equity Borrowing Power (HOMEPW) as defined below must be greater than the minimum value of HOMEPW specified by the financial institution (MIM).

It is preferred that these "checks" are done on a continual basis. However, many of the computer systems actually used by financial institutions cannot manage the processing load imposed by a real time continuous monitoring process for a large number of accounts. The frequency of the checks may be periodic or limited to correspond to transaction requests or orders. As will be described in more detail below, the value or status of every component of the HOME Account™ mortgage is tied to the account balances, inter-component relationships, and future financial projections of the account. Thus, before an order is executed, a "what if" analysis is performed wherein the HOME Account™ components are changed to reflect the proposed transaction, and account balances and ratios are checked against the required minimums described above.

In a preferred embodiment of the invention, a "what's best" analysis is also performed to determine if there is an alternate transaction or series of transactions that could improve the individual's financial well-being given the previously designated financial objectives and the financial institution's credit restrictions. The alternative transaction may be demonstrated to the individual by means of data visualization techniques. The "what's best" analysis may be performed in a deterministic manner by incorporating an explicit forecast of future economic variables, or it may be performed in with stochastic or robust stochastic techniques in which an optimization bound on a number of sensible scenarios is performed.

If the account, taking into consideration the proposed transaction, meets all minimum requirements, the desired order is executed and the account is updated to reflect the transaction. If the account does not meet the minimum requirements, the individual is contacted and either the order or some other account component(s) is modified, or the transaction order is canceled such that the minimum requirements of the account are maintained.

In addition to performing "checks" prior to the execution of a transaction order, checks are performed periodically to reflect any changes in the account components not related to a transaction, such as a change in the value of an asset or liability. Although the frequency of the check is determined by the financial institution, by the individual, or by both, the character of the account is an indicator as to how frequently the "checks" should be done. If the account is considered "inactive", i.e., the account has very few transactions and is composed of assets with relatively stable values, the account may only be checked prior to issuing a monthly statement to the individual. However, if the individual has a portion of her capital in an asset which changes value rapidly such as commodities futures or options, the status of the account will be checked more frequently. The expert system integrated into the system of the present invention considers the various factors and checks the requisite balances at the appropriate sequences.

Figure 8A:
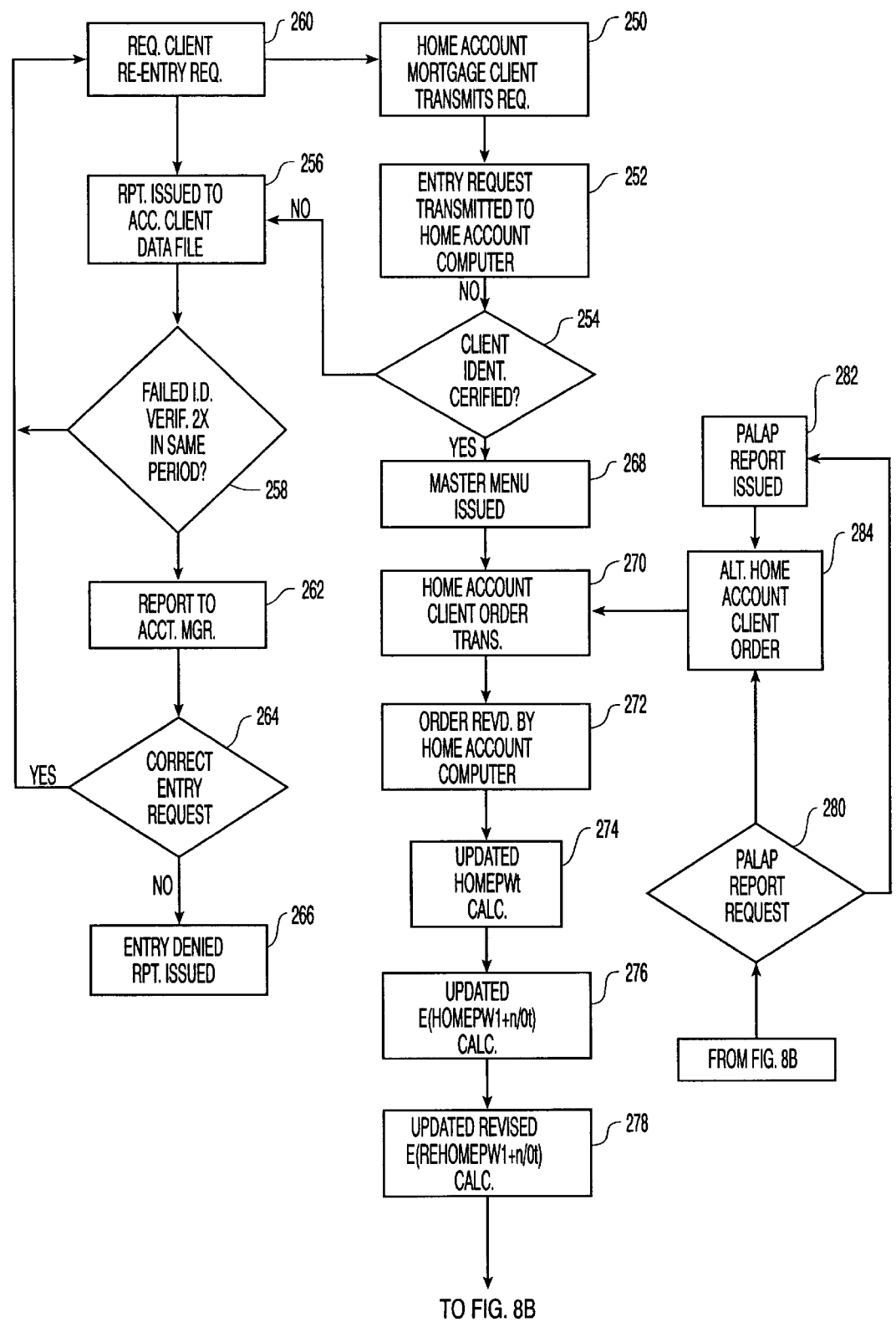
FIGS. 8A, 8B and 8C illustrate the processing of a transaction request in a HOME Account™ system.
Figure 8B:
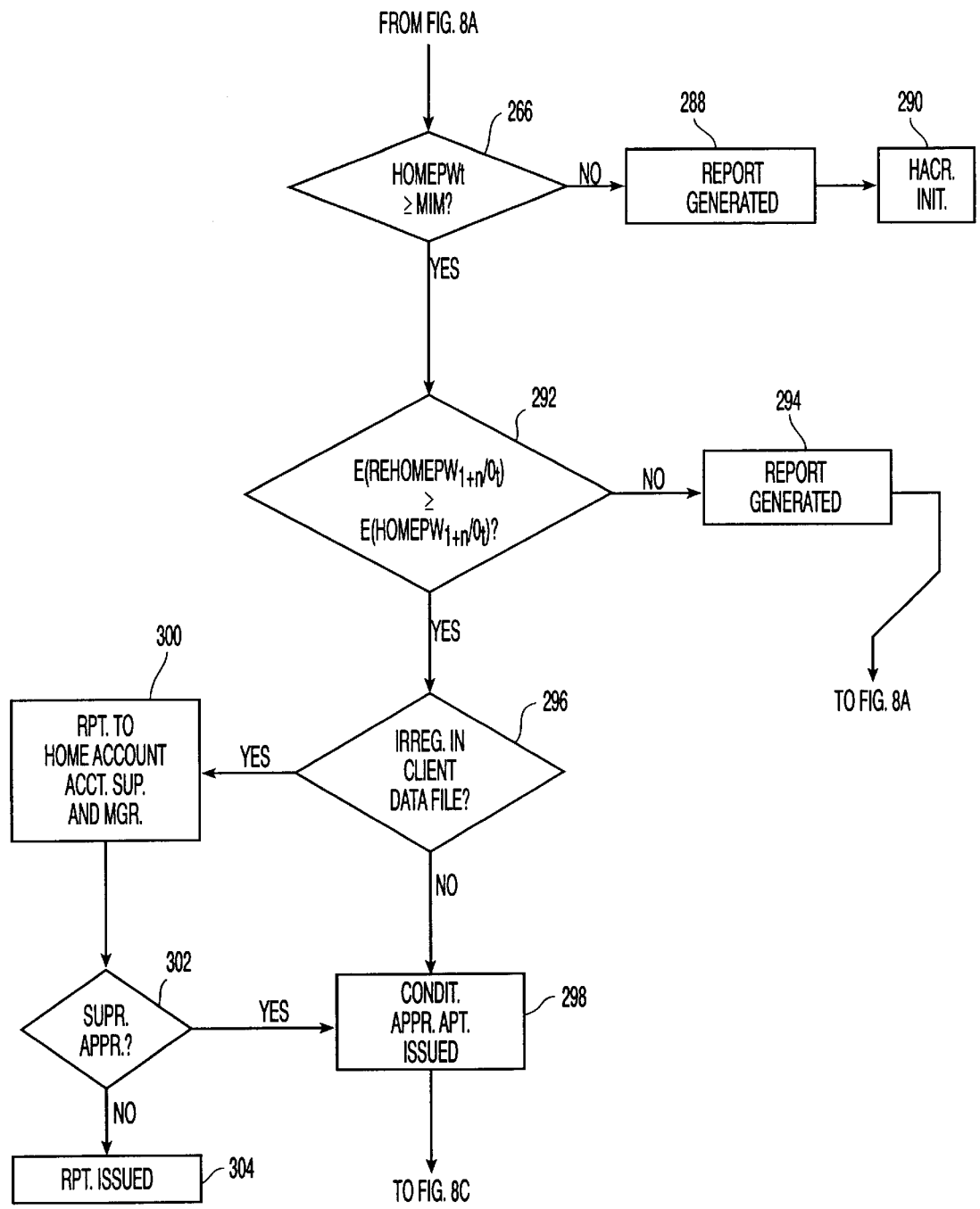
Figure 8C:
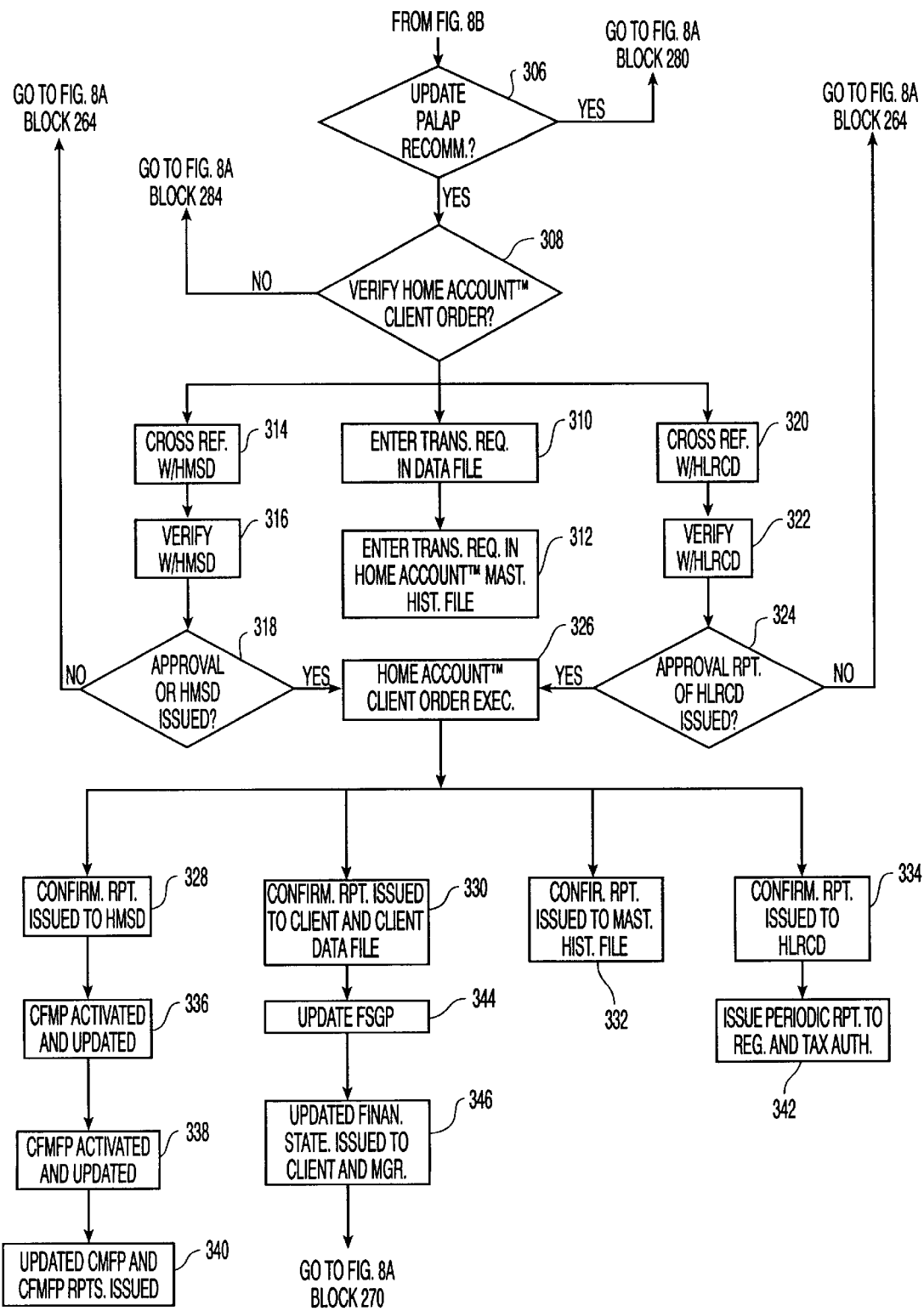

Processing, Reporting, and Communication of Transaction Orders and Financial Information FIGS. 8a, 8b, 8c illustrate the process to effect an individual's transaction order. From FIG. 8a, the individual first transmits a request to be allowed access to the system 250. This request may be made by the individual in person, over the telephone, via a machine interface (described earlier) or over any of the MyNet™ services. The access request would, in turn, be transmitted to a HOME Account™ central computer system 252 which may be only one of many distributed servers in the MyNet™ wide area network.

Before the individual's request is processed, the central computer must verify the individual's identity 254 by any one of the identification techniques known in the art. For example, the individual's identity may be verified by entry of the individual's secret identification number. In another example, a HOME Account™ customer uses a MyNet™ instrument which verifies her identity through one or more authorization procedures that may be established by the customer or the customer and the financial institution. This identification technique is detailed in the discussion of FIG. 14B.

In the event that the individual identity is not verified, a report is issued to the HOME Account™ individual file 256, and the file is cross referenced to determine whether there have been more than two failures to verify the individual's identity within a predetermined time period 258. If that is not the case, the individual is permitted another attempt to verify the individual's identity 260. If there have been two or more failed verification attempts within the predetermined time period, a report is issued to the account manager 262. The account manager examines the report and tries to correct the problem 264, typically through communication with the individual. If the problem is solved, the individual is requested to reenter her request 260. If the problem is not solved, the request is denied and a report is issued denying the purported individual access to the system 266. Records of all attempts are entered into the customer information file, and this and other data are periodically analyzed by the expert system of the present invention.

If the individual's identity is verified, the HOME Account™ master menu is presented to the individual for her review and selection of the transaction desired 268. The individual transmits the transaction order to the HOME Account™ master central computer 270, where the order is received 272 and processed.

If the requested transaction complies with system requirements, then the MyNet™ instrument calculates the updated values of the Home Owner's Mortgageable Equity Borrowing Power at the present time t (HOMEPW$_t$) 274; an updated forecast of the individual's expected HOMEPW throughout the future based upon current information and the individual's current and expected future asset/liability configuration (E(HOMEPW$_{t+n}$/Θ$_t$)) 276; and an updated revised expected HOMEPW throughout the future based upon current information and the individual's requested transaction (E(ReHOMEPW$_{t+n}$/Θ$_t$)) 278. "Re" represents a revised variable based on a potential transaction.

Once these variables have been calculated, the central computer determines whether HOMEPW$_t$ is greater than the Management Imposed Minimum HOMEPW (MIM), and whether the revised estimated future HOME Account™ Borrowing Power (Revised E(HOMEPwt+n/Θ$_t$)) is greater than what the HOME Account™ Borrowing Power would be if the transaction is not entered into (E(HOMEPWt/Θ$_t$)). Forecasters of the value of future variables may be done in a deterministic manner or by use of a robust stochastic scenario generation techniques or other means.

Alternatively, the client may request that PALAP be initiated 280 to generate a report 282 recommending reallocation of assets and liabilities to increase future HOME Account™ Borrowing Power such that the revised expected future HOME Account™ Borrowing Power is greater than or equal-to the expected future HOME Account™ Borrowing Power. The individual may then select one or more of these recommendations to be transmitted to the system as an order request 284 to increase the future HOME Account™ Borrowing Power. Note that an individual will not be prohibited from entering an order if the revised expected HOMEPW$_t$, is greater than the expected MIM at time t+n.

Referring to FIG. 8b, if HOMEPW is below the MIM 286, a report is issued to the individual and the account manager 288 and the HOME Account™ Compliance Routine is initiated 290. If HOMEPWt is equal to or above the MIM, E(ReHOMEPW$_{t+n}$/Θ$_t$)) is then compared to E(HOMEPW$_{t+n}$/Θ$_t$) 292. If the revised expected future HOME Account™ Borrowing Power is less than the expected future HOME Account™ Borrowing Power, a report is issued to the individual and account manager 294. The individual may then request a PALAP report 280 and enter an alternate order that will increase the expected future HOME Account™ Borrowing Power 284 (FIG. 8A).

If HOMEPW$_t$≧MIM 286 and E(ReHOMEPW$_{t+n}$/Θ$_t$)≧E (HOMEPW$_{t+n}$/Θ$_t$) 292, the transaction request or order is cross-referenced with the individual history data file to ensure there are no past irregularities concerning the individual's account 296 such as an excessive number of large cash transfers, repeated overdrafts, or past due interest payable. If no irregularities are found in the individual's account history, the individual is issued a conditional approval report 298. A copy of that same report is also issued to the account manager.

If the expert system detects irregularities, a report is immediately issued to the account supervisor and the account manager 300. The account supervisor reviews the report 302 and determines whether to deny the order or to approve it despite the past irregularities. If the supervisor approves the order, a conditional approval report is issued to the individual and the account manager 298. If the supervisor does not approve the order 304, he may recommend that the individual consider other transaction order alternatives or make an alternate order. If the supervisor denies the order, a report is issued to the individual, master history data file and account manager 304. The activities of the account supervisor may be assisted or performed by a decision support or expert system.

Referring to FIG. 8C, the individual is asked whether he desires to have PALAP updated so that he may understand how to better reallocate his assets and liabilities, update his financial plan and/or optimize the net return from his investment and borrowing transactions 306. If the individual does not desire another PALAP recommendation, he verifies the transaction 308 and the mortgage servicing department and the legal and regulatory compliance departments are notified of the order. The transaction order data is entered in the individual data file 310 and the account master history file 312. If the order is not verified by the HOME Account™ client because of, for example, incorrect data transmission, the system returns to the process sequence wherein the client may modify the order.

The HOME Account™ Mortgage Servicing Department (HMSD), upon receiving notification of the order, cross references the order with its mortgage account files 314, verifies the effect of the proposed transaction 316, and either approves or disapproves the order 318. Similarly, the HOME Account™ Legal and Regulatory Compliance Department (HLRCD) cross references the proposed transaction order with legal and regulatory guidelines 320 to verify the effect of the proposed transaction on applicable statutes 322 and issues an approval or rejection 324.

If the order is approved by both departments, the transaction order is executed 326 and copies of confirmation reports are issued to the mortgage servicing department 328, the individual and individual data file 330, the customer information file 332, and the legal and regulatory compliance department 334.

Upon receipt of the confirmation report by the mortgage servicing department, the collateral and the cash flow monitoring and forecasting processes are activated 336, 338. Reports reflecting the updated collateral and cash flow values are issued to the individual data file, the account master history file and the legal regulatory and compliance file 340.

The legal and regulatory compliance department stores the confirmation order for use in generating periodic reports to the appropriate legal, regulatory and tax authorities as required by applicable law or regulatory statute 342.

Once the individual's customer information file has received confirmation of the executed order 330, the individual's financial statements (balance sheet, profit and loss statement, sources and uses of funds statement and actual vs. budgeted income and expense statement) are updated 344. Updated financial statements and confirmations are issued to both the individual and the account manager 346.

Calculation of HOMEPW

Figure 9:
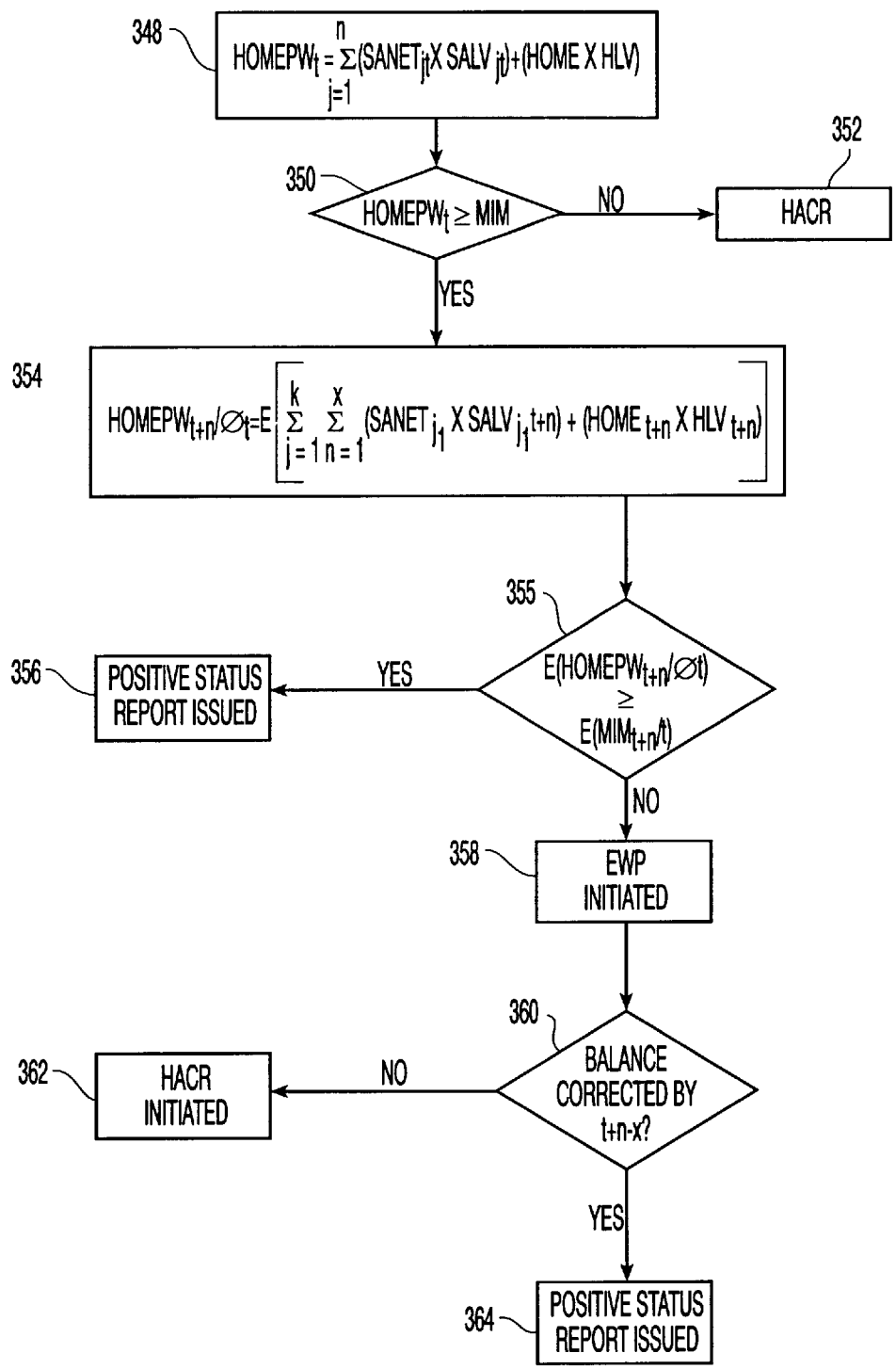
FIG. 9 illustrates a process for updating and verifying the Home Owner's HOME Account™ Equity Borrowing Power.

As stated earlier, the levels of transaction activity and price volatility of the account dictate how often an account is updated. The individual's account is checked by updating and verifying the present and future Home Owner's Mortgageable Equity Borrowing Power (HOMEPW). FIG. 9 depicts the process for updating and verifying the HOMEPW at time t (HOMEPW$_t$) and the expected future value of HOMEPW$_t$ given the amount of information currently available at time t (E(HOMEPW$_{t+n}$/Θ$_t$)).

HOMEPW$_t$ is equal to the sum of each sub-account asset loan value which is the net asset value or Net Equity Total of each sub-account (SANET$_j$) multiplied by the Sub-Account Loan to Value Ratio (SALV$_{jt}$) added to the product of the assessed value of the individual's home and the home Loan to Value Ratio (HLV) 348. The variable j represents the subaccount number for each type of asset or liability sub-account possessed by the individual.

Once HOMEPW$_t$ has been calculated, it is compared to the minimum HOMEPW$_t$ specified by the financial institution (MIM) 350. MIM will vary depending upon the overall size of the account, its level of activity and the credit record of the individual HOME Account™ individual. If the HOMEPW$_t$ is not greater than or equal to MIM, then the HOME Account™ Compliance Routine is initiated 352.

In the event that the balance is corrected during execution of the account compliance routine or that HOMEPW$_t$ is in excess of or equal to MIM, the expected future HOMEPW based on the set of information available at time t is calculated 354. Such future HOMEPW (E(HOMEPW$_{t+n}$/Θ$_t$) is equal to the product of the expected future value of the product of all subaccounts' Net Equity Total (NET) and their respective expected future loan to value ratios added to the product of the expected future value of the home(s) owned by the HOME Account™ client and the expected future loan to value ratio of the home(s). The forecasted values may be calculated utilizing an econometric analysis technique which is based, at least partially, on historical data or alternately a different technique such as scenario generation using stochastic or, for example, robust stochastic techniques, to generate a distribution of possible future values. The time period under consideration will vary from t+1 (i.e., the next period) through t+n.

After the expected future value of HOMEPW$_t$ is calculated, the value is compared to the expected future MIM value (E(MIM$_{t+n}$/Θ$_t$)) 355 which is based on the current set of information available. MIM may be forecast to vary over time if management elects to either strengthen their credit standards or reduce their credit restrictions on HOME Account™ individuals based on past performance or anticipated market conditions. If the expected future HOMEPW$_t$ is greater than or equal to the expected future MIM, a positive status report is issued 356 indicating that the account is in good standing. In the event that the expected HOMEPW$_t$ is not adequate, the early warning process is initiated 358 to notify the financial institution and the individual of the possible future imbalance. Unless the balance is corrected within a permissible time frame 360, e.g., the time period immediately prior to the time period in which a deficiency is forecast to exist, the HOME Account™ Compliance Routine is initiated 362. If the balance is corrected within the appropriate time frame, a positive status report is issued 364.

Management may require that assets and liabilities be immediately reallocated if a forecast future imbalance is detected. In most instances, however, this will not be necessary unless the forecast imbalance is substantial. Alternatively, the expert system of the present invention may automatically reallocate assets and liabilities so as to best serve the financial interests of the individual and satisfy the credit related requirements of the financial institution.

Priority Asset and Liability Allocation Process (PALAP)

Figure 10A:
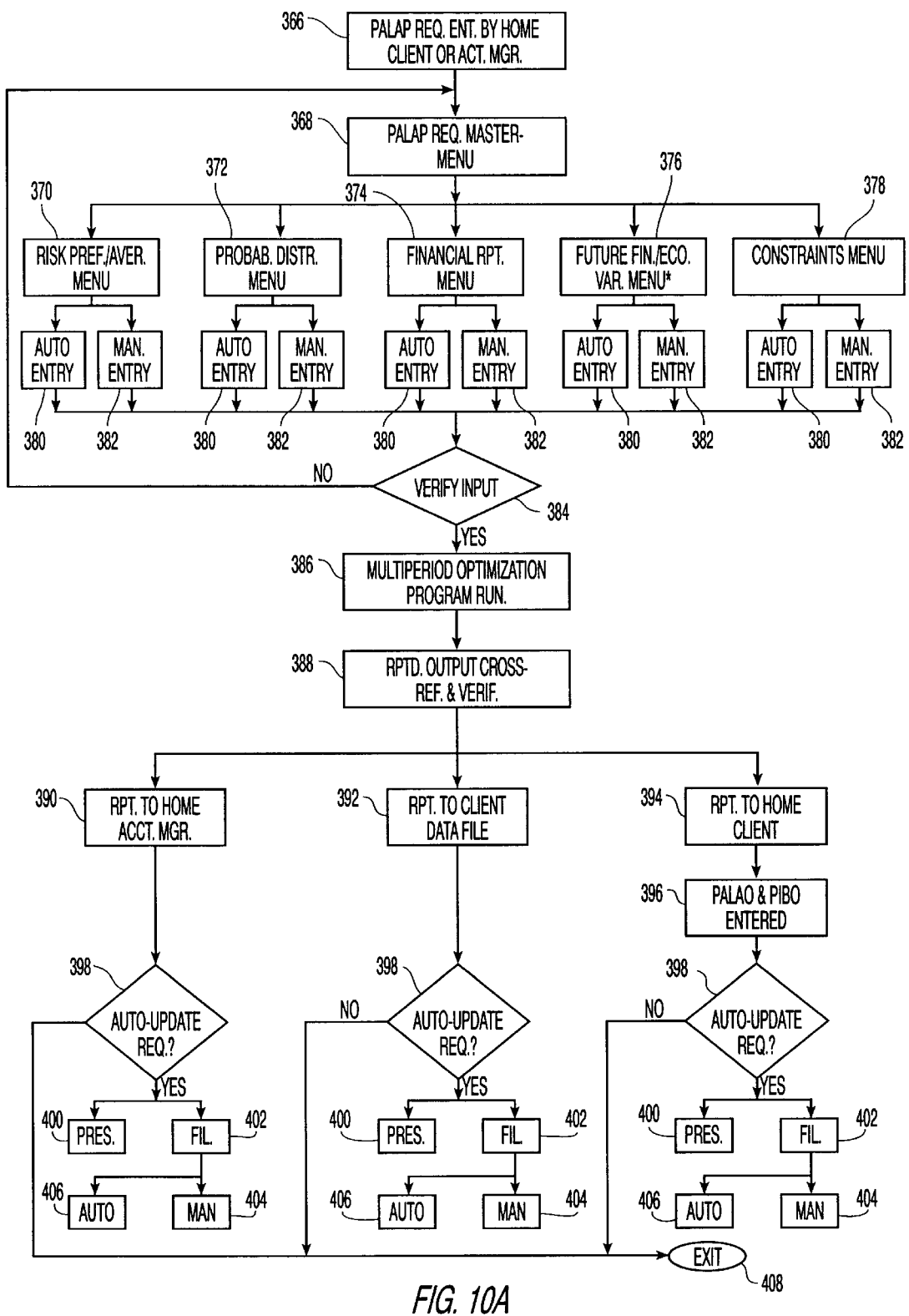
FIGS. 10A and 10B illustrate a means of performing the HOME Account™ Priority Asset and Liability Allocation Process (PALAP)
Figure 10B:
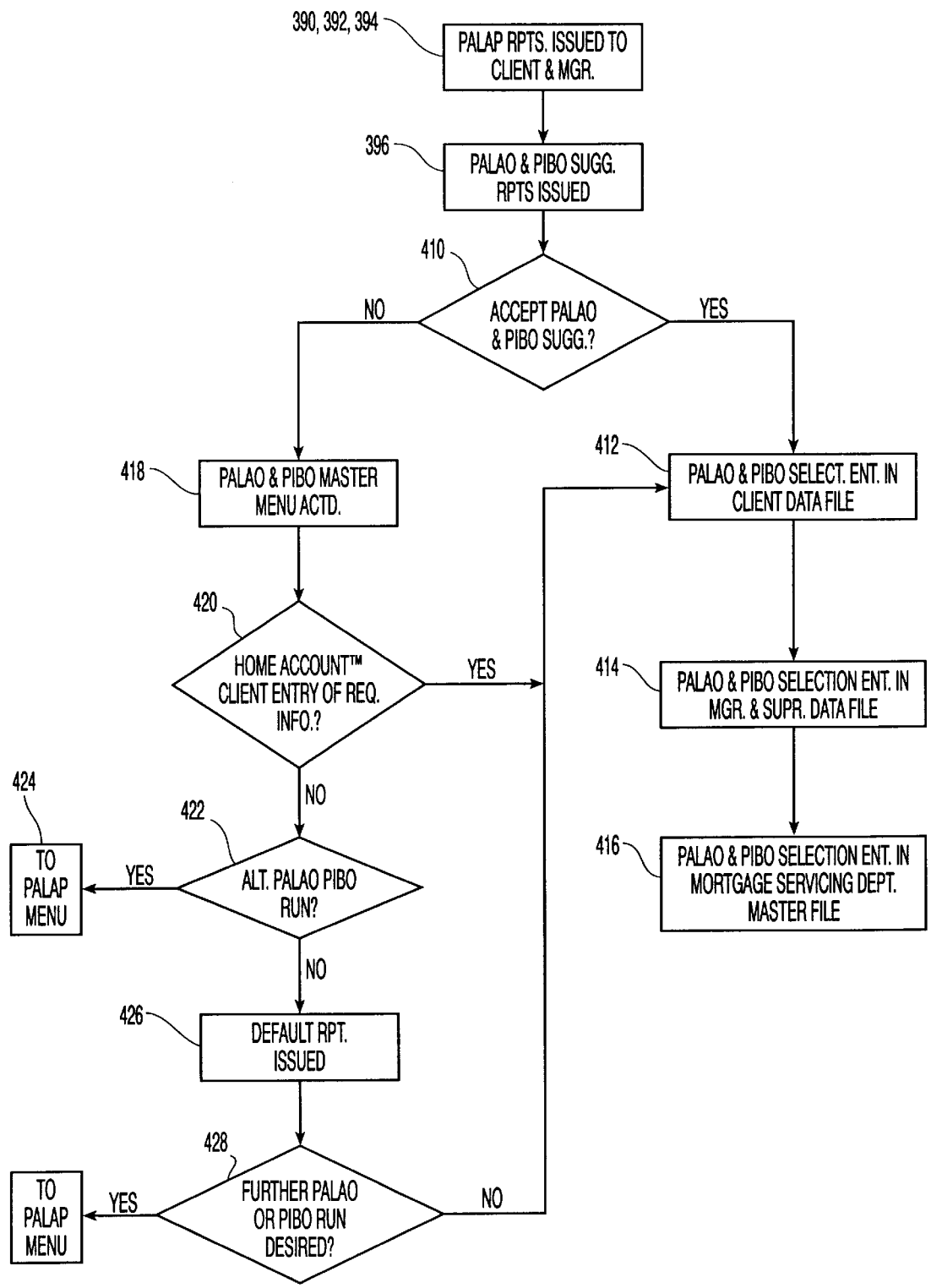

FIGS. 10A and 10B depict the Priority Asset and Liability Allocation Process (PALAP). Operations research techniques such as stochastic, dynamic, dynamic control, linear, nonlinear, integer, goal, and a multiobjective programming function, or a combination of these functions may be used to establish a priority for the allocation of account funds. Further, optimization or sub-optimization methods, expert or decision support systems, modern portfolio theory findings, and capital asset pricing models can be utilized with these operations research techniques.

Advantageously, the diagonal quadratic approximation (DQA) algorithm may be utilized to optimize the allocation of customer funds. DQA is an augmented Lagrangian method which solves large stochastic optimization problems in a distributed environment. The algorithm decomposes the original optimization problem into subproblems, sending one subproblem to each processor in its initialization phase. Each processor then works on its own subproblem almost independently, exchanging small amounts of information, until a solution to the original problem is found. Since many processors may be used and there are no communication bottlenecks, DQA has the potential to solve problems with hundreds of thousands of variables in less than an hour.

In this invention, DQA has been extended to handle convex objective functions. In the financial setting, this allows the maximization of expected utility, instead of mere expected value or mean variance objectives. The new convex optimization is accomplished via a quadratic approximation to the convex objective at every interior point iteration, employing an interior point optimizer, and updating the approximation at every new interior point iterate. The individual investor financial optimization problems solved with convex DQA on Thinking Machines CM-5 supercomputer are some of the largest nonlinear programs ever solved.

This method would allow the use of a direct solver, such as the LOQO interior point code, to solve problems handled currently by DQA or convex DQA. In general, direct solvers are more desirable than decomposition methods since decomposition involves approximations and requires more iterations to achieve optimality. The new method would take the matrix factorization routine, where most of the processing time in LOQO occurs, and distribute the work involved across all processors on the machine. Eventually, this could be combined with DQA. For example, if three large parallel processing machines were available, DQA could decompose the original problem into three subproblems and send each subproblem to one of the parallel machines. Each machine could then use LOQO with the parallel factorization to solve its subproblem.

Some classes of investment strategies, such as fixed-mix and lifecycle-mix, lead to nonconvex optimization problems. Standard linear and nonlinear programming solvers only guarantee finding a local optimum, which can be inferior to the global solution. Thus, employing a global optimization procedure can yield better solutions to the non-convex asset/liability management problem.

In this invention, optimization is achieved via a Priority Asset and Liability Allocation Order (PALAO) and a Priority Investment and Borrowing Order (PIBO) for the individual's account. PALAO and PIBO are generated by PALAP and are of great value to HOME Account™ customers because they show the individual the optimal allocation of assets, liabilities, consumption expenditures or sales, cash flows and borrowing requirements. PALAO and PIBO are guidelines through which the provider of the HOME Account™ system can implement, supervise and regulate the actions of a multiplicity of individuals. Such individuals potentially have an infinite number of exchange, savings, investment, and borrowing opportunities available to them. Thus, the financial institution is provided a defined means of satisfying MIM in the event that there is an imbalance in the account.

PALAO regulates the level of asset and liability holdings, while PIBO regulates the flow of cash into and from durable, non-durable and financial assets and liabilities. By executing PALAP, the system generates a preferred allocation of assets and liabilities based on system default variables and client input comprising variables specified by the individual which may be implemented through the HOME Account™ or MyNet™ systems of automated allocations or account sweeps.

The priority asset and liability allocation process is requested by a client or account manager 366 when an individual applies to open an account on a HOME Account™ system, applies for a HOME Account™ mortgage or other form of financial service. However, the system may also be activated at any other time at the individual's, the account manager's or the account supervisor's request. When the process is initiated, the central computer may issue a PALAP master menu to the account individual 368.

The master menu may illustratively contain five options of sub-menus: an investment risk preference/risk aversion menu 370, a probability distribution menu 372, a financial report menu 374, a forecasted or scenario based future economic variables menu 376, and a constraints menu 378. The individual selects the menus one at a time so that the information contained therein may be added to or modified. The information contained in each menu may be displayed graphically utilizing enhanced data visualization techniques.

The investment risk preference/risk aversion menu 370 contains information regarding the degree of risk the individual is willing to accept with her investments and borrowing. For example, the individual may be willing to accept substantial risks by investing in the commodities futures market or by borrowing heavily. The probability distribution menu 372 contains information regarding the level of certainty and/or uncertainty concerning future events. Stochastic techniques may be incorporated to deal with the issue of decision making under uncertainty. The financial report menu 374 includes information concerning an individual's current balance sheet, income statement and sources and uses of funds. The future economic variables menu 376 contains information concerning predicted future values of economic variables to be used in financial calculations such as the future HOME Account™ Borrowing Power. The menu of financial and budgetary constraints 378 contains information and account restrictions which may be specified by the individual, by the financial institution or by regulatory authorities.

The data for each menu may be displayed numerically or graphically so as to enhance the customer's understanding of the data input under the stochastic programming version of the HOME Account™ mortgage, the system may utilize stochastic techniques to generate scenarios other than deterministic forecasts of future economic variables.

Each of the menus can be completed by either automatic entry means 380 (default mode) or by manual entry means 382. For example, if an individual does not wish to complete the risk preference/aversion menu 370, she may simply specify certain personal financial data that may be automatically inputted by the system from data generated for existing HOME Account™ customers. In this way, assumptions concerning risk preference/aversion will be automatically entered. Likewise, the probability/distribution menu 372 may be completed automatically through default variables by assuming a normal distribution of the forecast financial variables. The financial report 374 may be completed automatically for individuals already having an account on the HOME Account™ system by using the balance sheet, sources and uses of funds and income statements in the individual's data file. Information concerning future income and expense items are also contained within the individual data file, particularly information related to future salary income and yields on securities held within the HOME Account™ system. The forecast of future financial and economic variables 376 utilized by the financial institution can be entered automatically by incorporating an economic forecast derived from published governmental forecasts, historical data or from internal economic reports generated by the financial institution. The menu of constraints 378 may automatically incorporate a default set of constraints stored in the central computer. However, budgetary, liquidity and other financial constraints are typically subject to individual preference. Thus, an individual will typically choose to manually input this information.

After all of the menus have been completed or modified, the input is verified by the individual 384. If there is an error in input, the process returns to the master menu 368, through which the individual may choose to alter various menu items. Once the menus have been corrected and verified, the expert system determines the appropriate prioritization or, possibly, multiperiod optimization function to be utilized 386. A series of reports is generated which present a prioritized or an optimum combination of asset and liability holdings given a set of constraints and a defined time horizon to realize the individual's financial objectives. These programming functions perform constrained or unconstrained (i.e., global) optimization or prioritization. In constructed optimization, the process endeavors to solve a problem where constraints are defined as limits. Many types of programming functions may be used. For example, the expert system of the present invention may utilize one or more problem solving techniques that provide a recommended prioritization to realize the individual's objectives.

Because the nature of financial markets and the behavior of individuals seeking to maximize returns is dynamic, personal financial planning should take into consideration the change in variables over time as well as the rate of change of variables over time. Accordingly, a form of multi-period or dynamic programming may often be recommended as one type of programming function that may be used in a preferred embodiment of the invention. In such function, transaction costs and applicable taxes are taken into consideration, and a surplus optimization model is utilized that explicitly analyzes the excess value of assets over liabilities under different economic scenarios. In so far as many individuals have multiple objectives, goal programming and multiple criteria techniques may be implemented.

The entries specified through the constraint menu 378 present constraints that must be considered in achieving a favorable financial solution for the individual. Thus, the PALAO and PIBO generated through this process allow the individual to realize her financial objectives specified in the menu selections. The results of the PALAP may be reported in a variety of forms from full financial statements to simple budgets and suggested annual savings rates.

Once the optimization program has been run, the reported output is cross-referenced to the individual account files and verified 388. Reports are then issued to the account manager 390, individual account data file 392 and the individual 394. The reports include a HOME Account™ individual balance sheet covering a defined period of time, a sources and uses of funds statement for the designated time period that may be a personal financial plan and may include a budget statement, an income, profit and loss statement for the time period considered, and a recommended PALAO and PIBO.

The outputs can be used to establish a system of expert sweeps or fund transfers that will either automatically or upon client approval sweeps funds from a HOME Account™ sub-account in order to implement the PALAO, PIBO and the individual's personal budget.

As will be readily apparent to those skilled in the art, the PALAO and PIBO recommended by the system represent one or more financial service products. These may be decomposed into a series of current and forecast future cash flows, and asset and liability account balances over time having inherent levels of risk and uncertainty from each of the forecast future values. Alternatively, the PALAO and PIBO can represent a series of exchange, savings, investment, borrowing, and funds transfer orders that can be implemented automatically or upon client input through the HOME Account™ and the MyNet™ systems. The output of the PALAO and PIBO may describe an allocation of pre-existing types of assets and liabilities that comprise part of the individual's set of asset and liability accounts. Alternatively, they may refer to the creation of one or more derivative financial service products that accommodate the desired future cash flows, asset and liability account balances and risk levels. The output may suggest a customized type of mutual fund or participation in a variety of different mutual funds which have the appropriate investment characteristics.

Returning to the example set forth in Tables 1–3, the PALAO and PIBO may further recommend to the individual a HOME Account™ mortgage and a pension related investment and an insurance related investment that may be automatically implemented. Alternatively, the system may recommend a derivative financial investment which may accomplish the same goals. This derivative financial investment may take the form of a contractual agreement between the financial institution and the individual whereby the parties agree to a schedule of cash flows, guaranteed account values and security interests between and among the parties. For example, the derivative instrument might rely on one or more contractual agreements wherein the financial institution agrees to advance $100,000 to the customer on the signing of the contract; the customer agrees to make periodic payments of interest to the financial institution according to an agreed schedule and periodic allocations of cash to the institution to be invested in a manner similar to what, under the HOME Account™ mortgage example, would have been invested in pension and insurance accounts; the customer grants to the institution security interests of, for example, various account balances of an agreed amount; and at the conclusion of the term of the agreement, the customer agrees to pay $100,000 to the financial institution and the financial institution agrees to release all of its secured interests and deliver a cash equivalent of the proceeds to the customer in a lump sum or in periodic payments. Various contingencies can be engineered into the derivative product that will permit greater flexibility to each party. Additionally, various add-on features such as credit enhancement or third party insurance may also be seamlessly integrated into the derivative.

The utilization of the PALAO and PIBO to recommend derivative forms of financial instruments can also easily accommodate situations in which the customer has pre-existing financial instruments with other financial institutions that either cannot be easily transferred to the HOME Account™ system or where cost or other considerations make transfer impracticable. For example, consider the circumstance in which a prospective customer desires to receive the numerous benefits of the HOME Account™ mortgage but he has a well-seasoned 6% fixed rate mortgage. In this case, a PALAP is initiated 366; the PALAP master menu is issued to the account individual 368; the individual selects the PALAP submenus 370, 372, 374, 376, 378 and completes the menus by either manual 382 or automatic entry means 380; and verifies the input 384. One of the factors entered into the system is the current extremely beneficial pre-existing 6% fixed interest rate mortgage. When the PALAP prioritization function is run 386, the PALAO and PIBO reports generated will reflect a prioritized allocation of assets and liabilities that may offer the individual the benefit of the HOME Account™ mortgage but recommend that she not change her preexisting mortgage arrangement. The PIBO and PALAO may consequently recommend a derivative financial instrument that is comprised of a series of loans secured by the individual's home and one or more other asset accounts. Specifically, loan payments made to the individual may coincide with when payments are due on the pre-existing mortgage. Such loans may be in amounts which equal at least the amortization portion of the due payments on the pre-existing mortgage. In this way, the individual will be given enough cash to continue making payments on the pre-existing mortgage, but advantageously have sufficient additional funds to invest in savings, insurance and pension-related accounts so as to maximize returns.

Another example of a derivative financial instrument is as follows. An individual would establish an asset account and a credit line which is secured by a lien on at least one home at a first financial institution. Additionally, the individual would take out a loan at a second financial institution. The individual can perform these activities concurrently or separately. For example, the individual may establish the asset account and credit line at the first financial institution at the same time that she takes out the loan in the second financial institution. Alternatively, the individual may already have an outstanding loan at the second financial institution when she decides to establish the asset account and credit line at the first financial institution. In either case, when all accounts are established, the individual will make periodic payments to the loan at the second financial institution. As the periodic loan payments are made, the credit line will be debited and the asset account will be credited with the loan payment. The financial instrument can be maintained so that the principal of the loan at the second institution plus the credit extended by the first institution equals the principal of the loan when the credit line is first debited. The individual can make the periodic loan payments to either the first financial institution or the second financial institution. If she pays the first financial institution, that institution can make the periodic payments to the second institution.

Returning to FIG. 10A, after the output of the optimization function has been cross-referenced, verified and reported 390, 392, 394, the HOME Account™ client will be requested to verify or modify the suggested sources and uses of funds statement (which may take the form of one or more budgets and will be referred to hereafter as a "budget"). Once verified, the PALAO and PIBO are entered into the system 396. An automatic update of the reports may be requested by either the manager or the client 398 either in full presentation form 400 or alternatively, in a filtered form 402 which highlights only the modified or variance variables. If an update is requested, the client data file issues an update 398. The filtered variables may be manually selected 404 or automatically selected 406 according to a system default set of variables. The filtered presentation may beneficially focus some customers on important information.

For example, an individual may only be interested in receiving an updated report if a change in an economic variable is going to affect her retirement income or an individual may be indifferent to changes in economic variables that insignificantly affect her portfolio holdings.

After the reports are issued, the individual and the account manager have the option to either exit PALAP 408 or run PALAP again by repeating the process 366. The latter may be advantageous because the individual may wish to update key financial variables such as changes in consumption, income, interest rates on borrowing costs, dividend yields on common stock prices, and returns offered on various types of annuities. In this way, the ultimate PALAP may be more tied to the individual's goals.

Referring to FIG. 10B, after the HOME Account™ system issues PALAP reports to both client and manager 390, 392, 394 and suggests a PALAO and PIBO 396, the customer selects a recommended budget 410, PALAO and PIBO, a record of this is entered into her individual file 412, the manager and supervisor's history file 414 and the mortgage servicing department master file 416. If the individual chooses not to follow the system's recommendations, the individual is given the opportunity to designate an alternate budget, PIBO and PALAO. To accomplish this, the PALAO and PIBO master menu is reactivated 418. Once the HOME Account™ customer completes the master menu 420, her selections are entered in the system files 412, 414, 416. Based upon the selected PALAO, PIBO, and personal budget, the system may implement a continuum of automatic or customer approved real and financial transactions and transfers such as purchases and sales of goods and services, savings, investments, and borrowing transactions and transfers.

If the customer rejects the automatically generated budget, PALAO and PIBO and she does not designate one herself, the customer is offered the opportunity to generate an alternate budget, PALAOs and PIBOs 422. If the customer desires an alternate budget, PIBO and PALAO, the process returns to the PALAP main menu 424 where the individual is given the option to change her responses to the PALAP menu previously completed. If the customer does not want to change what was previously specified or she does not specify an alternate budget, PALAO and PIBO, then she is notified that the budget, PALAO and PIBO first recommended to her will be applied automatically to her account and will be used for allocating her future net cash flows and borrowing requirements 426. After notification, the customer is offered another opportunity to designate an alternate budget, PALAO and PIBO and rerun PALAP 428. If the customer does not desire to run PALAP again, the system recommended budget, PALAO and PIBO and the default PALAP is entered and reported to the appropriate data files 412, 414, 416. As will be clear to anyone skilled in the art, the budget, PIBO and PALAO constitutes an array of asset accounts, liability accounts and flows of funds that when viewed as a whole may constitute one derivative or synthetic financial service product and the origination or sale of a defined set of goods and services over a defined time frame. This product may be decomposed into a set of interrelated derivative or synthetic financial service products or transactions and transfers.

Early warning Process

Figure 11:
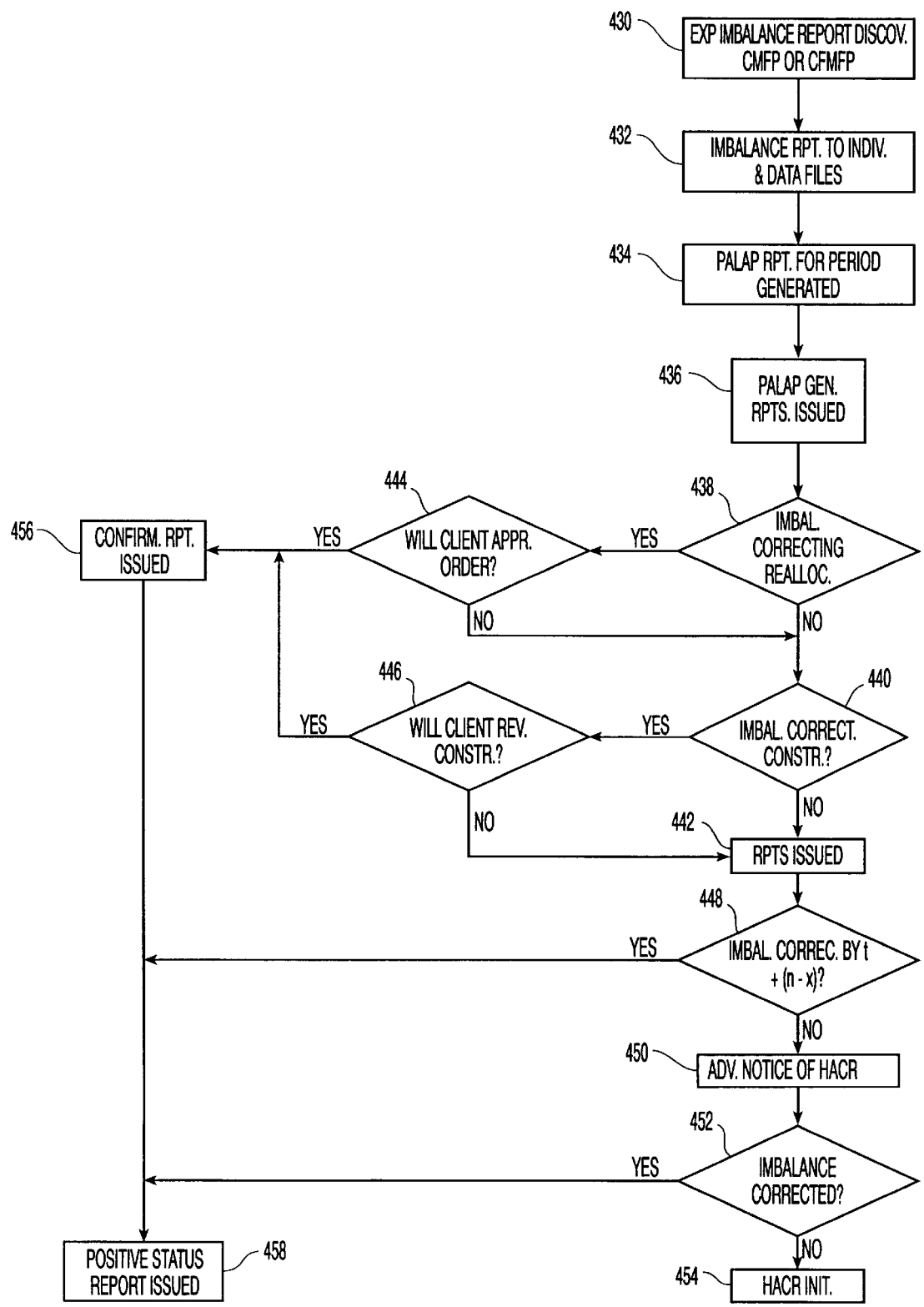
FIG. 11 illustrates an the HOME Account™ Early Warning Process (EWP)

Referring to FIG. 11, the Early Warning Process (EWP) alerts both the internal management of the financial institution and the customer of forecasted future imbalances. If the system reports a future imbalance expected at time t+n 430, notice of the expected imbalance is immediately reported to the customer, the account manager and the mortgage servicing department 432. PALAP reports are issued to the HOME Account™ customer and the HOME Account™ manager concerning the relevant time period of the imbalance 434 and PALAP is run in order to generate an updated budget, PALAO and PIBO having potential solutions to the imbalance 436.

The financial reports generated by PALAP are then sent to the customer and the account manager. The financial report will indicate if the imbalance can be corrected by the reallocation of assets and liabilities among different accounts, sub-accounts or sources and uses of funds either prior to or at the time of the anticipated imbalance 438. If the reallocation of assets and liabilities is not sufficient to correct the anticipated future imbalance, the system will indicate whether or not modification of some of the specified constraints on the system (e.g., levels of consumption spending) will be sufficient to correct the imbalance 440.

If the imbalance cannot be corrected, a report is issued to the account supervisor, the account manager, the mortgage servicing department and the individual 442. Similarly, if the imbalance can be corrected but the client will either not approve the reallocation 444 or the revised constraints 446, reports will be issued as appropriate 442. If the imbalance is forecast to exist at time t+n, and if at time t+(n−x) the imbalance has not been corrected 448, an advance notice of the implementation of the HOME Account™ Compliance Routine (HACR) 450, is issued to the customer, the account manager, the account supervisor and the mortgage servicing department. "x" is defined by the financial institution as a value equal to the number of time periods prior to the anticipated occurrence of the imbalance by which time the imbalance must be corrected. If, after notice, the imbalance is still not corrected 452, then the account compliance routine is initiated 454.

Even if a customer will not reallocate her assets or liabilities or modify the constraints on the PALAP, it is still possible that the forecasted imbalance will not occur at time t+(n−x) if certain investments have created higher than expected returns. For example, the returns on the customer's stock portfolio may be greater than expected or the customer may contribute additional assets to her HOME Account™ mortgage at some time prior to the date of the anticipated balance.

If the forecasted imbalance does not occur or if the customer revises her constraints and/or reallocates her assets and liabilities to avoid the imbalance, confirmation reports are issued 456 indicating the change in status, and a positive status report is issued to all those parties previously notified of the imbalance 458.

HOME Account™ Compliance Routine

Figure 12:
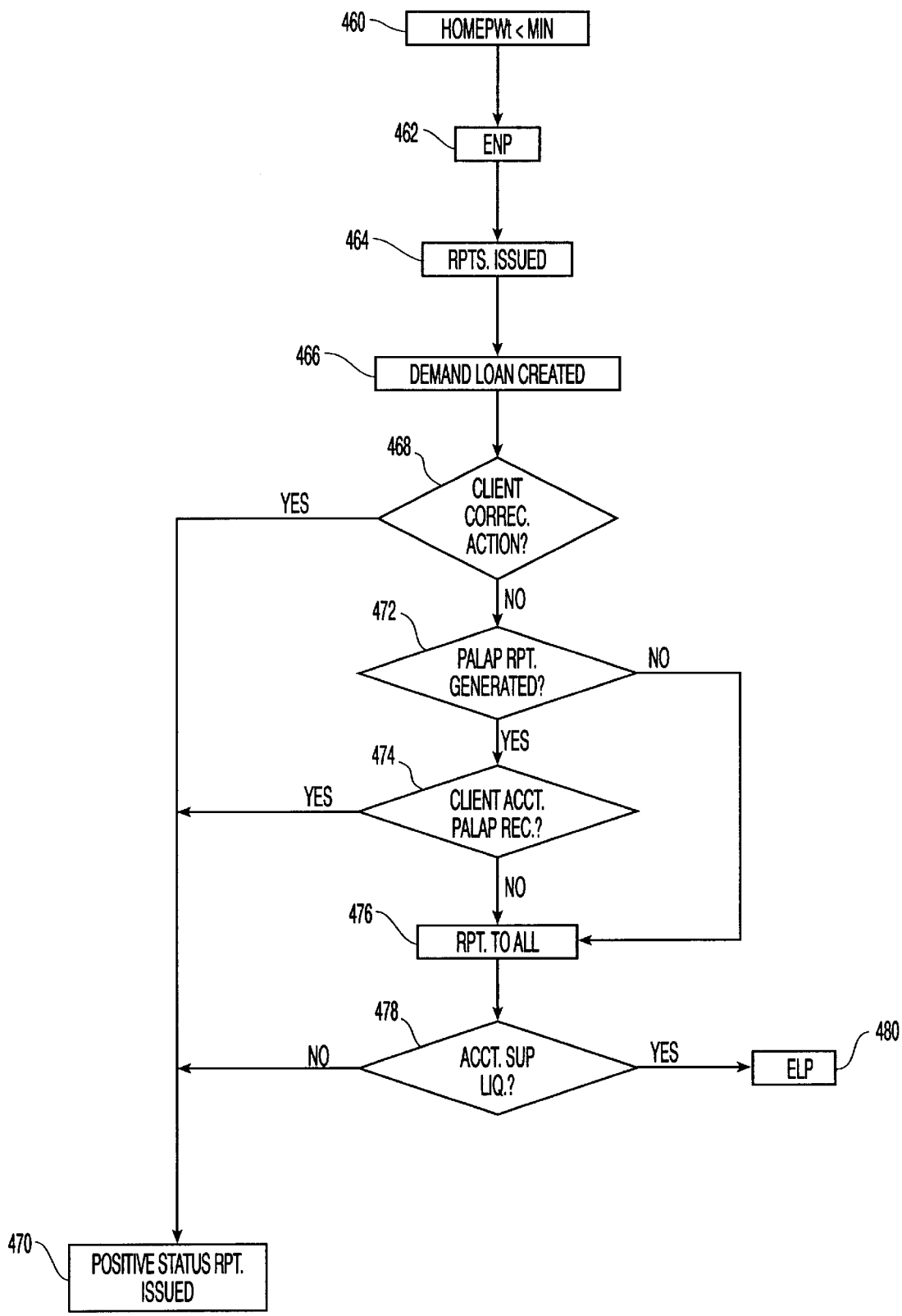
FIG. 12 illustrates the HOME Account™ Compliance Routine (HACR)

FIG. 12 illustrates the HOME Account™ Compliance Routine (HACR) which includes the Emergency Notification Procedure (ENP). If an account imbalance occurs wherein $HOMEPW_t$ is less than MIM 460, ENP 462 is initiated to notify the customer and the financial institution of the account imbalance. Unless the account imbalance is corrected, the Emergency Liquidation Procedure (ELP) is ultimately activated.

When an imbalance is determined, ENP issues reports citing the imbalance to the account supervisor, the account manager, the customer, the customer data file, the mortgage servicing department data file and the account history file 464. Simultaneously, a demand loan is created 466 secured by the general obligation of the customer, an increased amount of collateral up to the totality of assets in the account and bearing a previously agreed upon interest rate. The loan will continue to exist until the imbalance cited is corrected and all interest charges are paid in full.

Once the appropriate authorities are apprised of the imbalance and the demand loan is created, one of several events may occur. First, the customer may direct that specific corrective action be taken that resolves the account imbalance 468. If the customer suggests a corrective action, the system will modify the account to comply with the customer's suggestions and if the imbalance is corrected, the system will issue a positive status report 470.

If the customer does not direct that corrective action be taken, a system recommendation report comprising a revised budget, PALAO and PIBO is generated using the system default variables instead of variables input by the customer 472. The principal objective of such a report is to provide the optimum method to satisfy MIM. Provided that corrective action satisfies MIM, the system will then attempt to maximize the individual's objectives subject to her constraints.

If a positive recommendation for corrective action is presented, the customer is offered the opportunity to either accept or reject the system recommendations 474. If the customer accepts, the account is modified to comply with the recommendations and a positive status report is issued 470. If the customer does not accept, a report noting this fact is issued to all appropriate parties 476. Upon receipt of the report, the account supervisor determines whether to initiate the emergency liquidation procedure or to consult with the customer in the hope of encouraging her to either accept the system recommendations or take further action on her own behalf to correct the imbalance 478.

If positive recommendations that completely resolve the imbalance cannot be issued, a report is issued and the account supervisor is given the choice of activating the emergency liquidation procedure 480 or working with the customer to correct the imbalance. The likely result is that the account supervisor will be compelled to immediately activate the liquidation procedure 480 since no reformulation of the asset and liability configuration is capable of bringing HOMEPW within specified constraints. At this point, the assets will have to be liquidated, loans repaid on a priority basis and further recollection actions taken to collect the deficiency.

Emergency Liquidation Procedure

Figure 13:
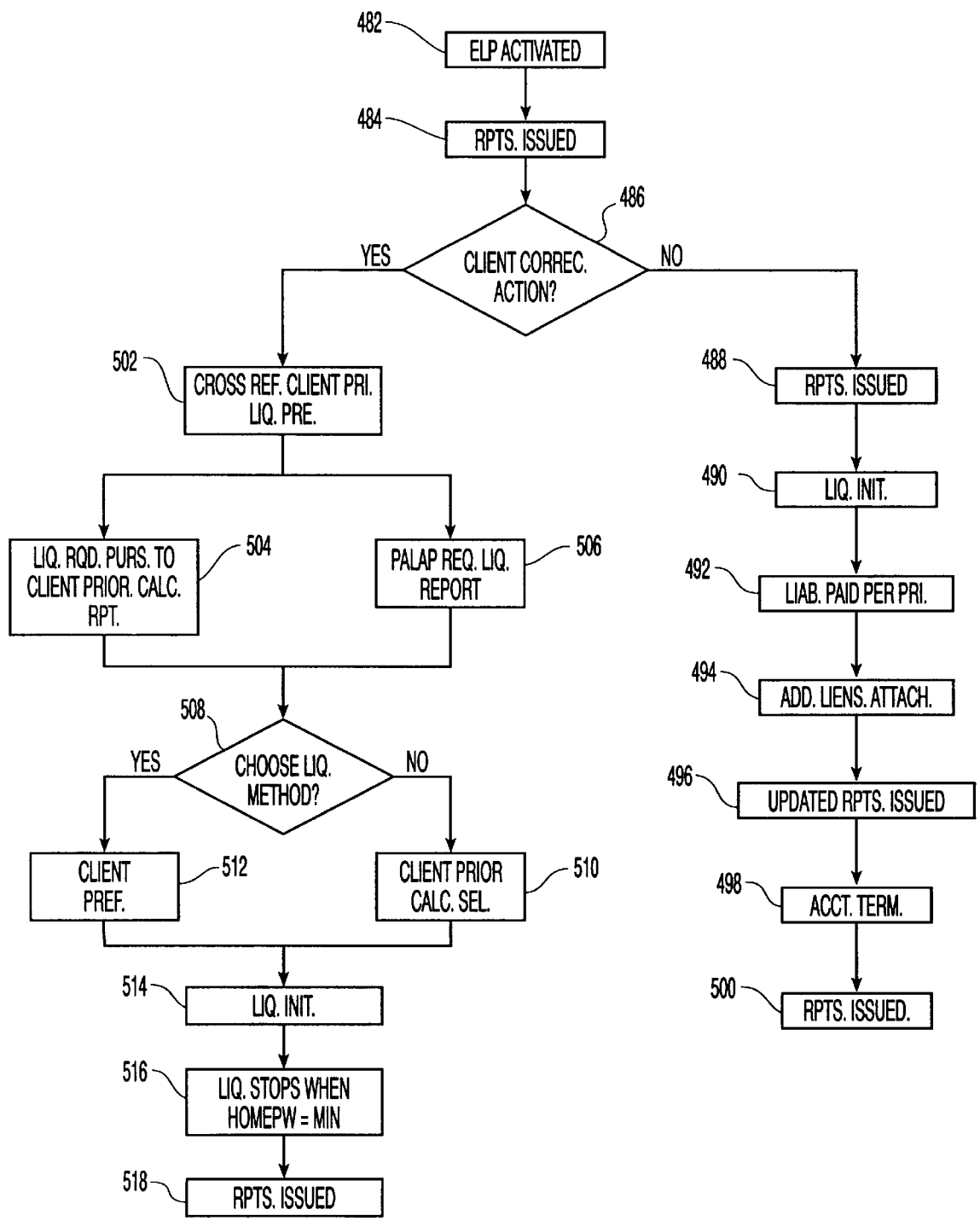
FIG. 13 illustrates an Emergency Liquidation Procedure.

FIG. 13 illustrates the Emergency Liquidation Procedure (ELP). ELP is initiated when the assets in the account are no longer sufficient to meet the financial institution's minimum standards (MIM). When ELP is initiated 482, reports are immediately issued to the customer, the account supervisor, the legal and regulatory compliance department, and the corresponding data files 484. These reports detail that the HOME Account™ Mortgage is about to be liquidated because of an imbalance in the account and violation of the HOME Account™ mortgage borrowing agreements.

It is then determined if the client can correct the imbalance 486. In the event that she cannot and no potential configuration of the asset and liability holdings of the account is sufficient to satisfy MIM, reports are issued indicating that a complete liquidation is about to be commenced 488. Thereafter, the account's assets are liquidated 490. As assets are liquidated, liabilities are repaid on a priority basis previously established by the financial institution 492. Such priority takes into account factors such as the loan-to-value ratio and the liquidity of the asset. To the extent all liabilities cannot be satisfied through the liquidation of asset accounts, liens are established on the customer's other assets 494. Periodic update reports are issued to the appropriate parties to advise them of the progress in the liquidation and termination of the account 496. When all of the liabilities have been satisfied, the account is terminated 498, and reports are issued 500.

If the client removes the imbalance by being willing to accept the recommendations presented or to make alternative recommendations to satisfy MIM, then the customer priority asset/liability liquidation preference is cross referenced 502. The information in the preference was input into the customer data file when the account was opened and PALAP initiated.

Two reports are then prepared to be presented to the parties and the pertinent data files. The first report is a calculation of the required liquidation amount pursuant to the customer's previously established liquidation preference 504. The second is the system liquidation report 506. The customer is then asked to indicate which liquidation schedule is preferred within a limited time period 508. If she does not select the system liquidation schedule within the time limit, the HOME Account™ Mortgage will be liquidated pursuant to the customer's previously established priority liquidation schedule 510. If she does select a system liquidation schedule, the assets will be liquidated accordingly 512.

Once the liquidation method is selected, the liquidation procedure is initiated 514. The liquidation will only proceed until the HOMEPW is equal to MIM. At that point, liquidation will terminate and the account will be maintained 516. At that point, the financial institution's report is issued to the customer, the manager, the supervisor, the mortgage servicing department and the legal and regulatory department, the customer file and the master history file 518 indicating the liquidation transactions that took place and the final result of those transactions.

A MyNet™ SmartWallet™, SmartPurse™ or Smartcard™ Transaction

Figure 20:
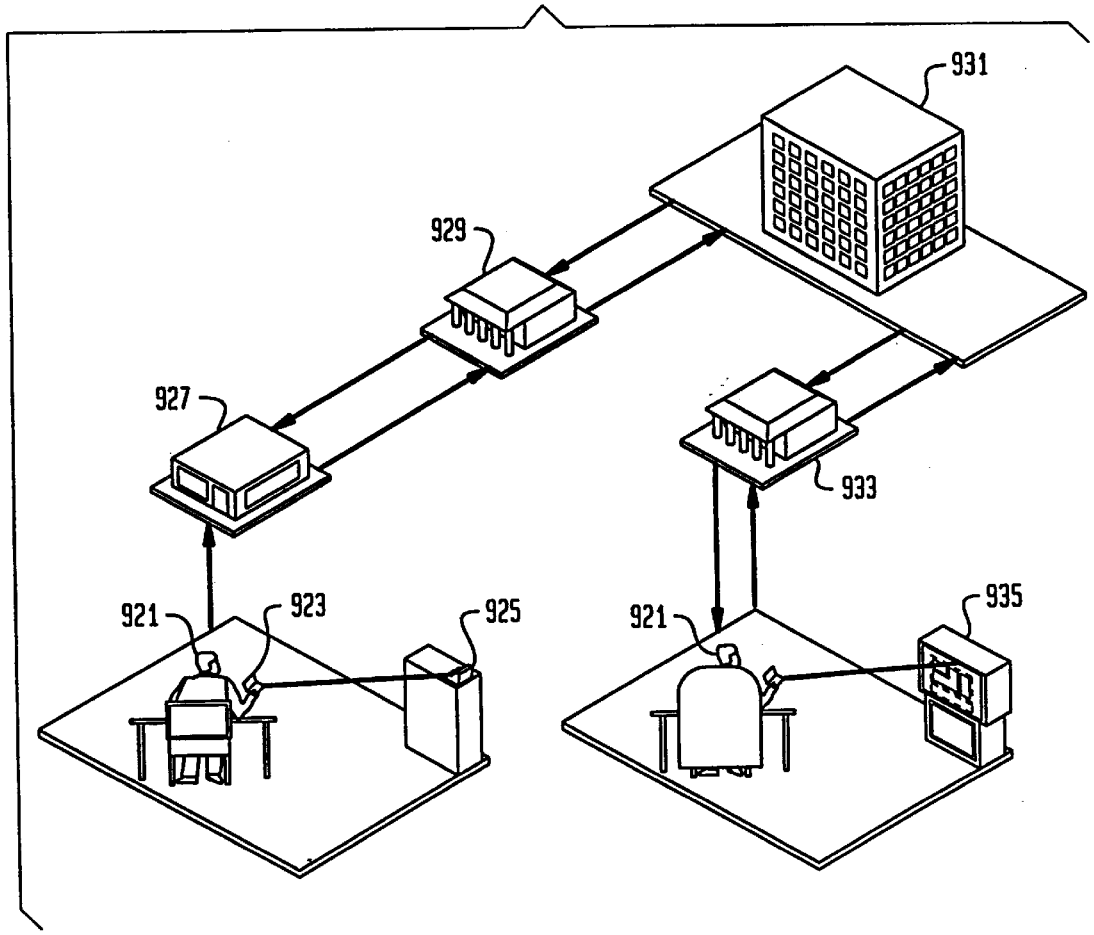
FIG. 20 illustrates the combined use of the MyNet™ SmartWallet™, SmartPurse™ or SmartCard™, SmarTerminal™ and SmartBox™ devices.

In FIG. 20, a consumer's use of the MyNet™ device is depicted. A consumer 921 at a restaurant receives and signs the credit card receipt screen on his or her SmartWallet™ device and sends the written authorization to the SmarTerminal™ device 925. Security is insured by a voice print, handwriting verification or fingerprint. The send and receive messages are encrypted.

The customer charges the actual cost of purchase on a credit card, for example $70, and the merchant 927 submits the charge to the merchant's bank 929. The Bank subtracts an average fee of 1.9% and pays the merchant the rest. The merchant receives $68.67 from the merchant's bank, $1.33 less than if the consumer had paid in cash. The merchant's bank submits the charge to the credit card company 931, which then submits it to the bank that issued the credit card 933. The merchant's bank receives $69.09 from the issuing bank and keeps 42 cents for itself. The credit card issuing bank subtracts an average interchange fee of 1.3% of the original amount and pays the rest to the credit card company, which, in turn, pays the merchant's bank. Both banks then pay small fees to the credit card company. The credit card company gets 11 cents of which 6 cents comes from the merchant's bank and 5 cents comes from the issuer. The card issuing bank sends a bill to the consumer for the original amount.

The consumer 921 receives his or her statement of charges, reviews the statement and authorizes a debit from his or her bank account by double clicking on "Approve to Pay" on the home interactive TV set 935. The consumer can review his consumption, savings, investments and borrowing, compare them to budgeted amounts, optimize the customer's portfolio of assets and liabilities and reallocate funds. The issuer gets $70, or more if the customer pays over time with interest, and keeps 91 cents plus any interest.

Home Account™ s Transaction Procedures

Figure 14A:
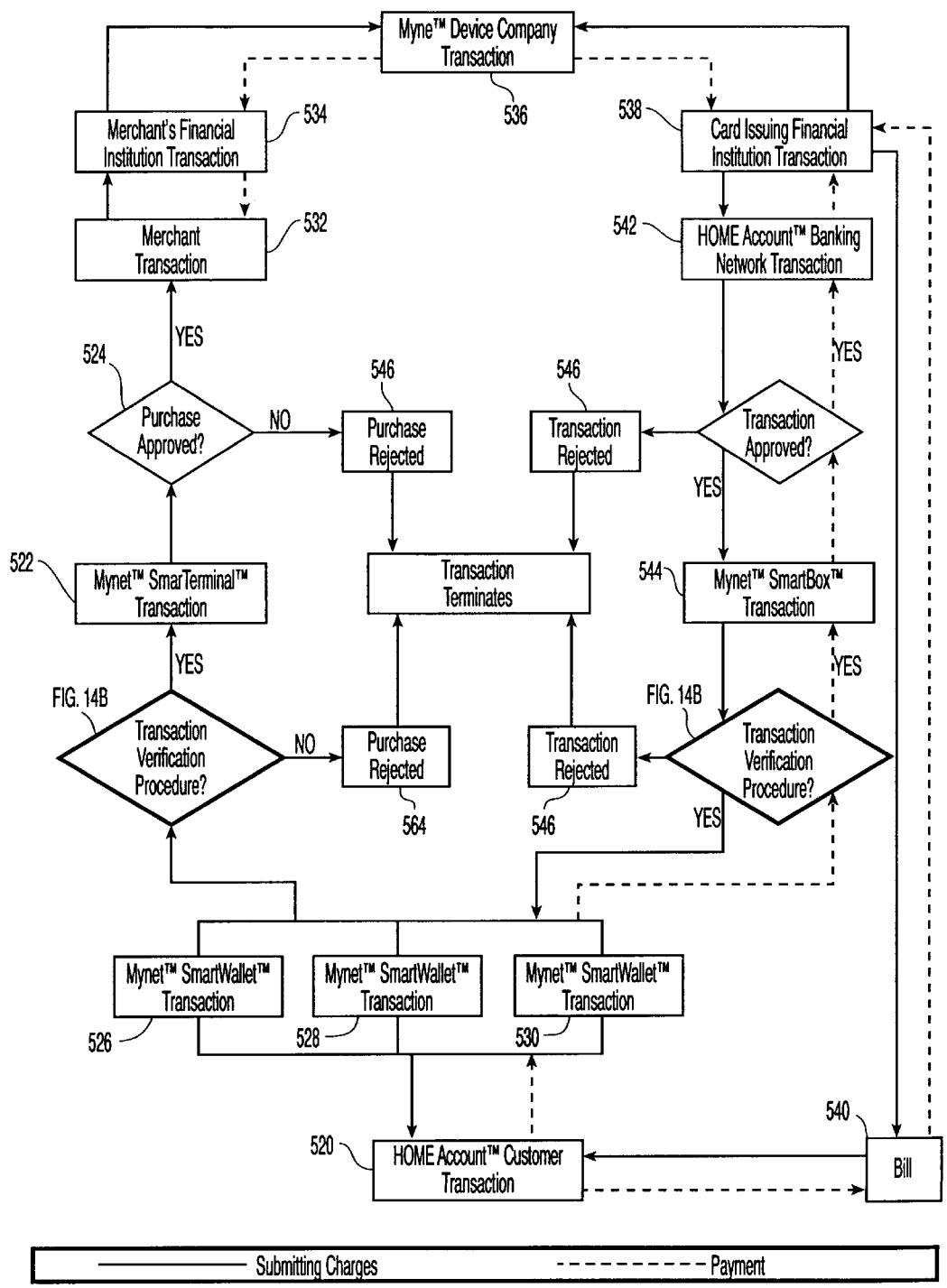
FIG. 14A illustrates the HOME Account™ Purchase/Payment Procedure.

FIG. 14A is a block diagram of the Home Account™ purchase/payment procedure which results from a customer transaction with a merchant. Such procedure allows the merchant to be paid ultimately for the transaction, and works as follows. The customer authorizes the transaction 520 through the Mynet™ SmartWallet™, SmartPurse™ or SmartCard™ device. The transaction is verified (see FIG. 14B) and the written authorization is sent via electronic or infrared means to the MyNet™ SmarTerminal™ device 522 belonging to the merchant. All send and receive messages may be encrypted through use of any of the techniques referred to earlier.

If the purchase is approved 524, the purchase/payment procedure is initiated. A merchant who has conducted a transaction 532 submits the charge to the merchant's financial institution 534. The financial institution subtracts an average fee of say 1.9% and pays the merchant the rest. The merchant's financial institution submits the charge to the firm that issues the MyNet™ device 536, which submits it to the financial institution that issued the card 538. The card issuing financial institution subtracts an average interchange fee of approximately 1.3% of the original amount and pays the rest to the MyNet™ device issuing firm. This firm then pays the merchant's financial institution 534. As described, both financial institutions 534, 538 then pay small fees to the MyNet™ device issuing firm 536. The card issuing financial institution 538 sends a bill 540 for the original amount to the original consumer and the consumer pays.

Alternatively, the card issuing financial institution 538 bills the original amount to the HOME Account™ Banking Network 542. If the transaction is approved, the bill is sent to the MyNet™ SmartBox™ device in the consumer's home 544. At this time, the consumer receives a statement of charges on the MyNet™ device, reviews the statement and uses her MyNet™ Smart Wallet™, SmartPurse™ or SmartCard™ device to initiate a debit of her account if the transaction is verified. Such debit is utilized to pay the HOME Account™ Banking Network which, in turn, pays the institutions involved previously. If at any time in this process the transaction is not verified or approved by either the customer or any financial institution involved 546, the transaction is terminated 548.

Figure 14B:
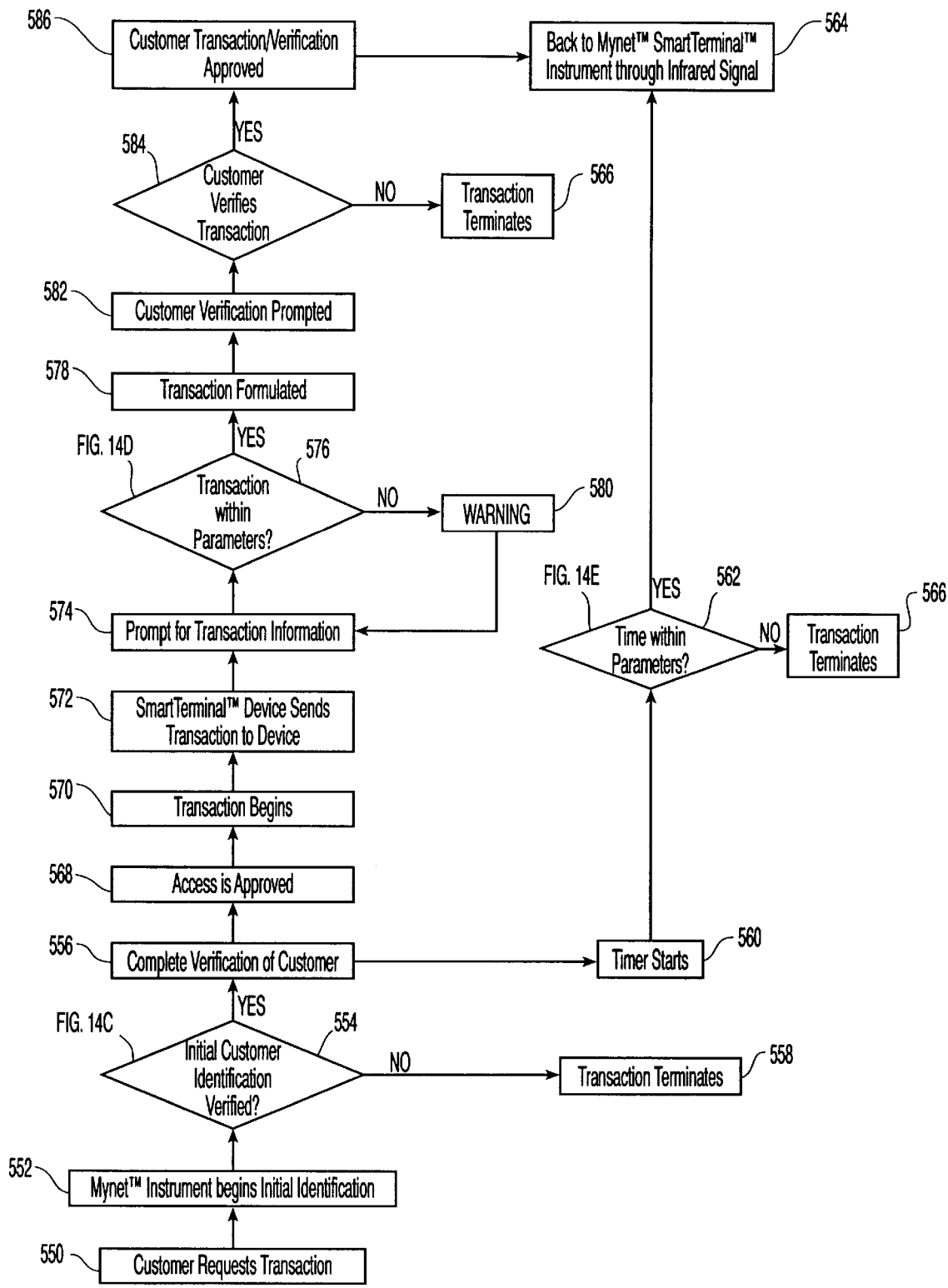
FIG. 14B illustrates the HOME Account™ Transaction Verification Procedure.

FIG. 14B illustrates the HOME Account™ transaction verification procedure. A customer requests a transaction 550, and the Mynet™ SmartWallet™, SmartPurse™ or SmartCard™ begins an initial identification 552 (see FIG. 14C). If the initial customer verification is positive 554, then a complete verification of the customer begins 556. If, however, the initial customer verification is negative, the transaction terminates 558.

Figure 14C:
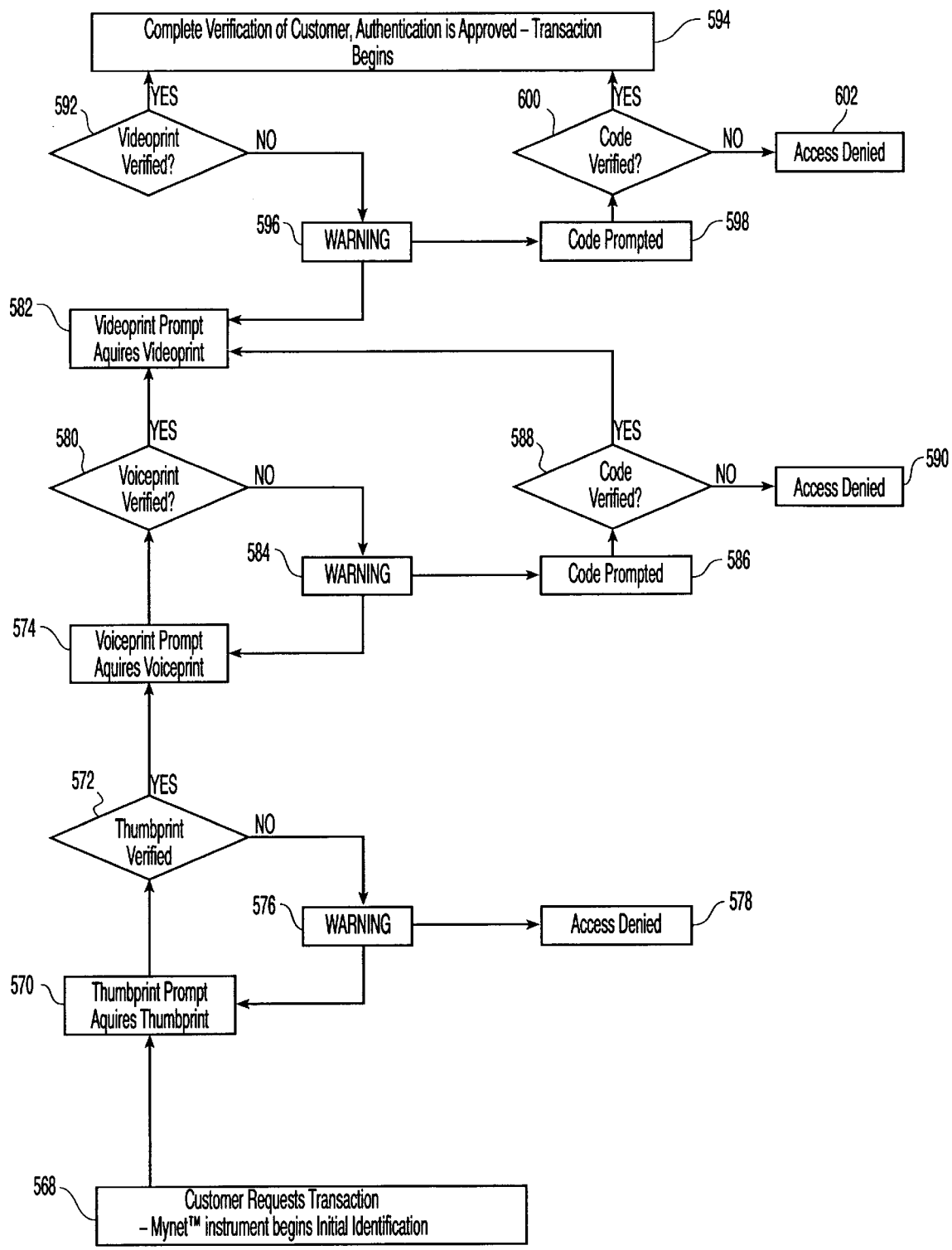
FIG. 14C illustrates the HOME Account™ Initial Customer Identification Procedure.
Figure 14D:
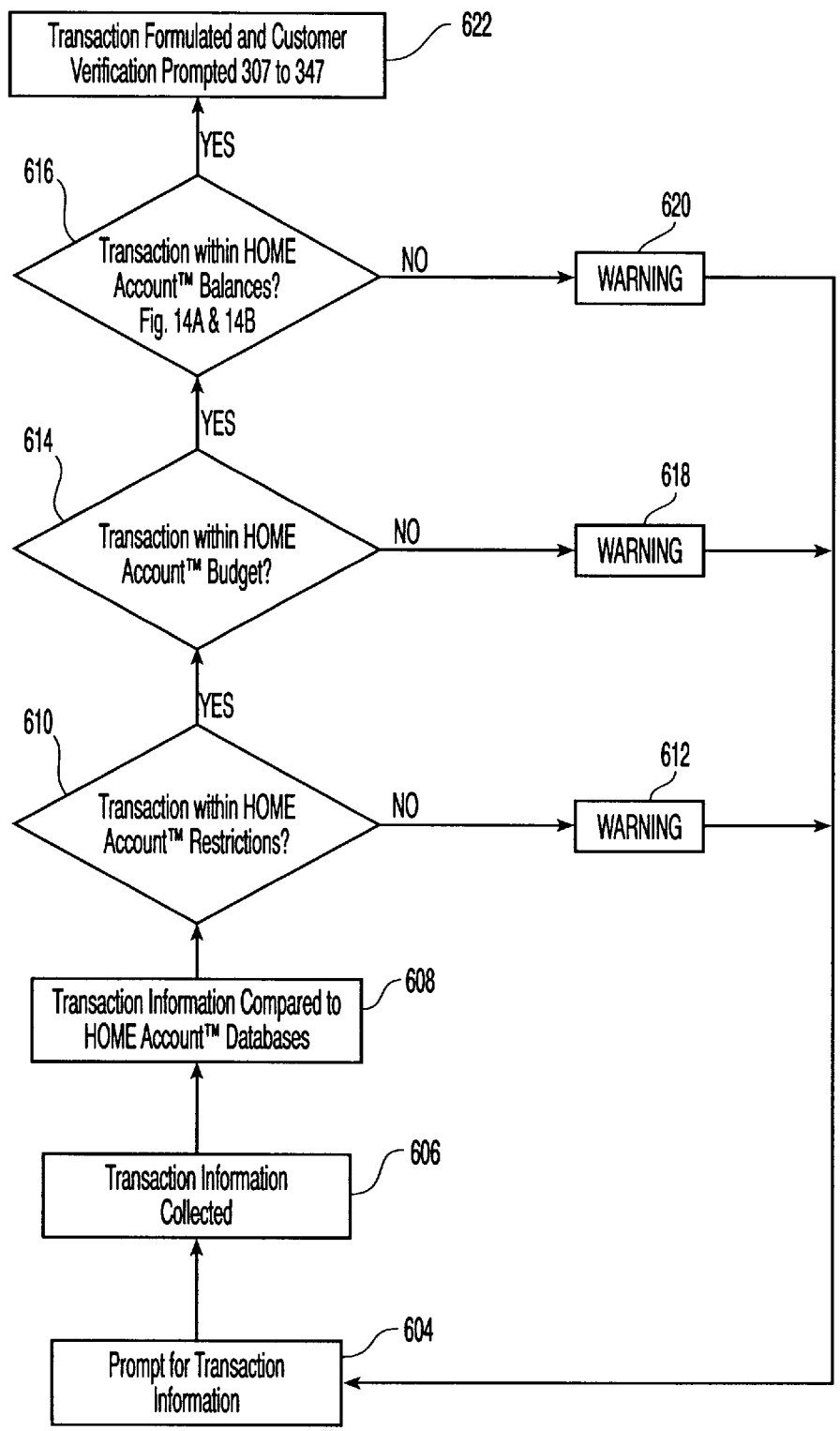
FIG. 14D illustrates the HOME Account™ Transaction Parameters Evaluation Process.
Figure 14E:
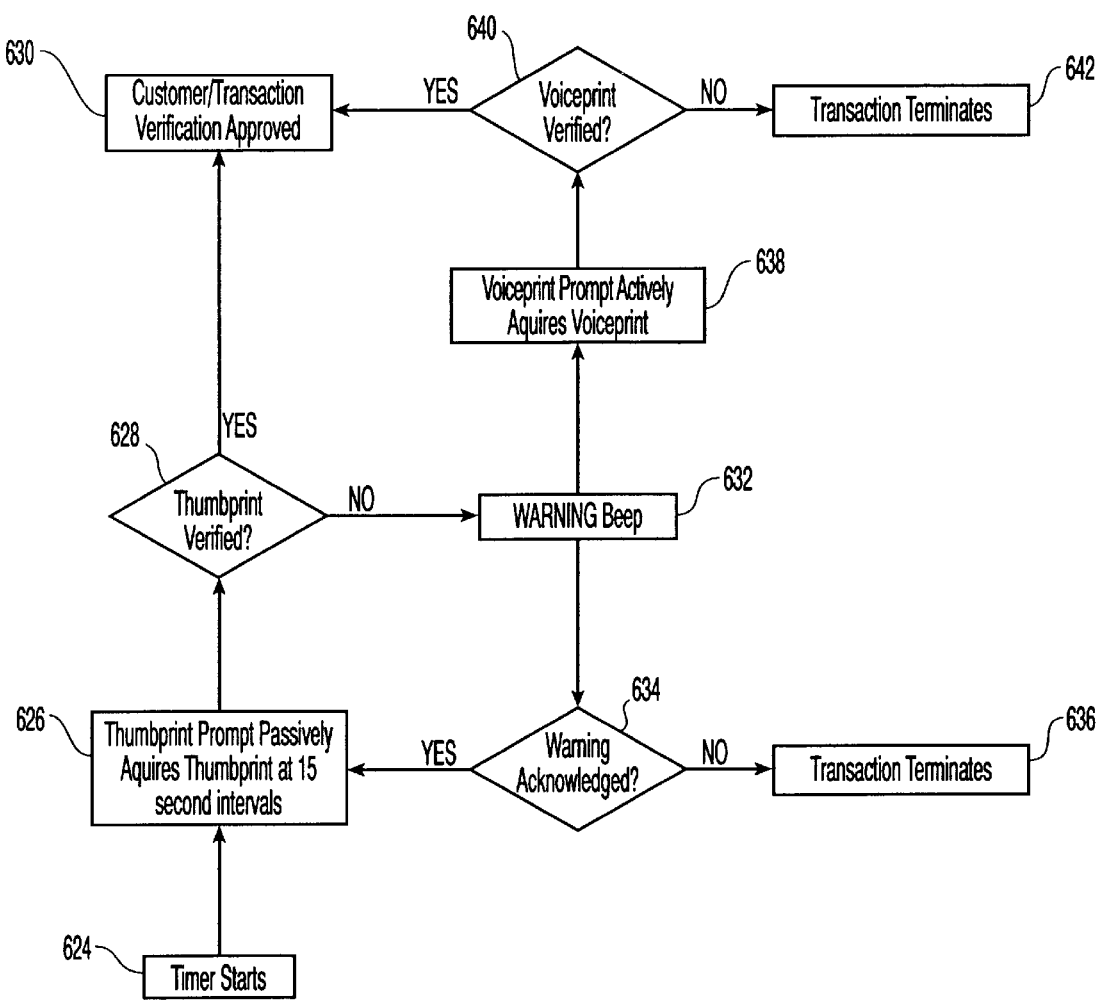
FIG. 14E illustrates the HOME Account™ Transaction Time Parameters Implementation Process.

Once the complete verification process is initiated, a timer starts 560 which times the transaction and prompts the customer for additional identification at predetermined intervals, such as 15 seconds (see FIG. 14E). If the additional identification is provided within the predetermined interval 562, then the connection continues. Otherwise, the transaction terminates 566.

Once the complete verification process is complete, access to the MyNet™ SmartWallet™, SmartPurse™ or SmartCard™ device is approved 568 and the transaction begins 570. The MyNet™ SmarTerminal™ device sends the transaction to the MyNet™ SmartWallet™, SmartPurse™ or SmartCard™ device 572 and the customer is prompted for transaction information 574. If such information is within the HOME Account™ parameters 576 (see FIG. 14D), then the transaction is formulated 578. If the transaction is outside the parameters, a warning sounds 580 and the customer is again prompted for transaction information 574.

Once the transaction is formulated, a prompt is made for customer verification of the transaction 582. If such verification is made 584, the customer transaction is approved 586 and the verification is sent to the MyNet™ SmarTerminal™ device 564. If the customer declines to verify the transaction, the transaction terminates 566.

FIG. 14C illustrates the Home Account™ initial customer verification procedure. Such procedure may be carried out on a MyNet™ instrument through one or more authorization procedures that may be established by the customer or the financial institution 568. In accordance with one such procedure, a thumb print prompt is given and a thumb print is acquired from the customer 570. If the thumb print is verified 572, then the customer identification procedure may be designed to prompt and acquire a voice print 574. If the thumb print cannot be verified by the MyNet™ device, then a warning is issued 576 and the customer can retry her thumbprint. After the customer has been denied and the warning has issued three times, access will be denied 578. If the thumb print is verified 572, a further form of customer verification and authentication is employed such as a voice print. The voice print is prompted and acquired 574 and the identification procedure continues so that the voice print is verified 580. Alternatively, a signature or hand writing verification could be employed. Once verified, the customer may be prompted with a videoprint request 582.

If the voice print cannot be verified, a warning is issued 584 so that another voice print may be prompted and acquired. If after the third denial and warning a verifiable voice print is not received, then a secure predetermined numerical or alphanumerical code, the MyNet™ Access Code, such as a telephone number, PIN number or an address is prompted 586. If the code can be verified by the MyNet™ device 588, the customer identification procedure will prompt the video print 582. If the code cannot be verified, access will be denied 590. The video print can be a print either of the MyNet™ customer or, alternatively, some portion of the MyNet™ customer's body (such as a print of the customer's iris) which can be used for positive identification procedures. The unique geometry of the HOME Account™ customer's hand can also be used. If the video print is verified 592, the identification procedure is approved and the transaction may begin 594. If the video print cannot be verified after the third failure and warning 596, the customer is prompted to enter a second access code 598. If the access code can be verified 600, then the authentication of the customer is approved and the transaction may begin. If the access code cannot be verified, then access is denied 602 and the device goes inactive for a predetermined period.

Additionally, the MyNet™ instrument can evaluate the time to insure that the MyNet™ instrument is being used by the customer, in order to prevent accidental or unauthorized use. A thumb print may be passively taken every 15 seconds. If the thumb print is not verified, a warning beep sounds. Upon three warning beeps, the MyNet™ instrument prompts for a voice print. If the voice print is not verified, the transaction terminates and the MyNet™ instrument goes inactive for a predetermined period. If a transaction is requested, the MyNet™ SmarTerminal™ or MyNet™ SmartBox™ device sends an infrared signal to the MyNet™ SmartWallet™, MyNet™ SmartCard™ or MyNet™ Smart- Purse™ device detailing the description of the desired transaction. In order to confirm the transaction, the customer receives and signs the credit card receipt screen on the MyNet™ SmartWallet™, MyNet™ SmartCard™ or MyNet™ SmartPurse™ device, or indicates approval through a legally binding form of verbal action.

Turning now to FIG. 14D, after there has been a prompt for transactional information from the HOME Account™ customer 604, transaction information is collected 606 in order to determine that the transaction is within the permitted parameters for the customer. The system determines whether the transaction will affect the account balances such that the account status is outside the limits specified by the financial institution and the regulatory authorities. Transaction information is compared to information contained in the HOME Account™ databases for that customer 608 to determine if the requested transaction meets operational restrictions, or if the amount of purchases or transfers designated by the client within a time period specified by the financial institution is within HOME Account™ restrictions 610. If the transaction is not within HOME Account™ permitted restrictions, then a warning is issued to the customer 612.

If the requested transaction is within the permissible range, the transaction verification procedure determines if the transaction is within the HOME Account™ budget permitted for that customer 614. The transaction verification can then proceed to determine whether or not the transaction is within the available HOME Account™ balances 616. Such balances are determined through cash flow and forecasting processes. If the transaction is not within the HOME Account™ customer's budget or available balances then a warning is issued to the customer 618, 620. If the transaction is within the available HOME Account™ balances, then the transaction may be formulated and customer verification is prompted 622.

Turning to FIG. 14E, after verification and authentication of the customer is completed and access is approved, the transaction may be instituted and a timer starts 624. A thumb print prompt passively acquires a thumb print at predetermined periodic intervals 626, for example, every fifteen seconds. Alternatively, any time frame established by each individual customer may be used so long as it precludes the possibility of inappropriate use of her MyNet™ device by any other individual. If the thumb print is verified at the periodic interval 628, then the customer transaction verification is approved 630 and the transaction may proceed. If it is not, however, a warning beep 632 is issued. If the warning is acknowledged 634 and a thumb print is acquired 626, then the transaction time frame requirement is satisfied and the customer verification may proceed as previously described. If the warning is not acknowledged, then the transaction terminates 636. After three warning beeps, a voice print prompt is made and an appropriate voice print should be received 638. If the voice print can be verified by the MyNet™ device 640, then the customer transaction verification is approved 630. If the voice print, however, cannot be verified, then the transaction terminates 642.

Mynet™ Device Functions and Operations

FIG. 15A depicts the operation of the HOME Account™ system through the MyNet™ SmartWallet™, SmartCard™, and SmartPurse™ functions and operation. As an illustration, the MyNet™ SmartWallet™, SmartPurse™ or SmartCard™ devices would be opened by the customer 644 and then the HOME Account™ customer would turn on the power to the MyNet™ instrument 646. Once the MyNet™ instrument is ready, the HOME Account™ customer would select one of several different functions provided by the MyNet™ device 648. These functions include a clock and calendar function 650, calculator function 652, word processor function 654, and application or database function 656. The application or database function could include a spreadsheet or other forms of applications. Also included are an input/output function 658 such as a function used to output information to the printer or receive input from another type of communication, computing or another MyNet™ device. Additionally, the MyNet™ devices are capable of communications functions 660, a range of financial functions 662 and standard power functions 664.

One example of a financial function 662 is verification of whether the transaction will be permitted or denied (described in detail with respect to FIG. 14B). If a HOME Account™ financial transaction is to be made, the consumer is permitted thereafter to reselect an additional function 666.

If a clock calendar function 650 is selected, then a multifunctional clock calendar appears on the screen 668 and the customer, after a display and interaction with the clock or calendar function, may reselect an additional function 666. Alternatively, a calculator function 652 may be selected by the consumer, and after selection a multifunction calculator appears on the screen of the MyNet™ device 670. After use of the calculator the consumer may select an additional function 666.

A word processor function 654 can be selected by the consumer on either the SmartWallet™ or SmartPurse™ devices and a multifunctional word processor application appears on the screen 672. The consumer may reselect additional functions 666 such as other applications or database functions 656. If the consumer does so, a menu for various applications and databases may appear on the screen 674. These applications and databases may either be ones that are in memory means such as disc drives, random access memory or other forms of data storage on the MyNet™ SmartWallet™ or SmartPurse™ devices. Alternatively, they may be on other remote computers within the network of MyNet™ devices. After or during use of applications or databases the consumer may always reselect additional functions. If an input or output function 658 is selected, then the input/output menu appears on the screen 676. After utilizing and making her selection from the input/output menu, the consumer may select an additional function 666.

Input functions 678 may include input of voice, video, fax, image or data from another communications or computer instrument. Output functions 680 include voice, video, image, fax or data to another computer. The consumer can also have output sent to another output device such as one connected by means of a RJ-11 jack 682 over a standard telephone line. Alternatively, the consumer can select an infrared output 684.

The consumer may alternatively choose a communications function 660 which may require use of the Verification Procedure (see FIG. 14B). If there is no verification, the transaction is denied 684 and the MyNet™ instrument becomes inactive 686. If there is verification of the transaction, then a multi-function communication menu appears on the screen 688 and communication may be initiated 690. As always, the consumer can then select an additional function 666.

If the customer selects a financial function 662, they must go through the Verification Procedure (see FIG. 15B). If the transaction is not verified, it is denied 684 and the MyNet™ instrument becomes inactive 686. If the transaction is verified, the transaction is initiated 692. Thereafter a HOME Account™ financial transaction may be implemented and the customer may select an additional function 666.

Finally, the customer may choose a power function 664 from this menu. A "power off" option appears on the screen 694. A "power off" selection is offered 696, and if the customer opts to turn the power off, the MyNet™ instrument becomes inactive 686. If the customer decides not to turn the power off, the customer may select "cancel" and thereafter select an additional function 666.

Referring to FIG. 15B, the HOME Account™ MyNet™ financial functions and operations allow a wide range of financial transactions to be executed by the owner of one of the MyNet™ devices. Most consumers will utilize a SmartWallet™, SmartPurse™ or SmartCard™ device with respect to the system's financial functions. Alternatively, the customer may use a SmartBox™ or SmarTerminal™ device to directly access the MyNet™ System. If the latter is used, the verification process depicted in FIGS. 14A–E and FIG. 15A would be necessary. The following description focuses on the use of a SmartWallet™ device in conjunction with a SmartBox™ device. Such devices may be used interactively with a television, touch screen Kiosk or other interactive means.

If the HOME Account™ transaction is initiated 698 after completion of HOME Account™ verification procedure, a HOME Account™ transaction menu appears 700 and the HOME Account™ customer may select a type of transaction 702. These transactions may range from a "credit card" or "debit card" transaction 704, a "check" transaction 706; a savings account transaction 708, a funds transfer transaction 710, a financial deposit transaction 712, a purchase order transaction 714, a financial payment transaction 716 or the purchase or sale of stocks, bonds, or other financial instruments 718.

The customer, presented with a financial screen determined by the type of transaction selected, is prompted to enter transactional information 720. The MyNet™ system then determines whether the transaction is within the pre-specified parameters for the customer, as described fully in connection with FIG. 14D. If it is not, a warning 722 is issued. If no warning is issued to the customer (meaning the transaction is within the customer's parameters), then the transaction is formulated and the customer verification is prompted 724. The customer may then verify the transaction 726. If he or she does not, the transaction is terminated 728. If the customer verifies the transaction, then the transaction is sent by infrared signal to the MyNet™ SmarTerminal™ or the MyNet™ SmartBox™ device 730.

After the transaction has been successfully sent to the SmarTerminal™ or SmartBox™ device, the customer is prompted for a new transaction 732. If a new transaction is desired, the process is reiterated and a new HOME Account™ transaction menu appears 700. If no new transaction is desired, then the consumer may simply reselect some other function from her MyNet™ device 666.

To operate the HOME Account™ MyNet™ SmarTerminal™ device referred to in FIG. 15C, the merchant turns on the power to the MyNet™ SmarTerminal™ device 734. The merchant may then enter, for example, a sale in the register connected to the MyNet™ SmarTerminal™ 736. Thereafter, the merchant may select a function 738. For example, there may be five functions from which the merchant can choose. The merchant can choose a conventional credit card function 740, which the MyNet™ SmarTerminal™ device may perform in a conventional manner by swiping a conventional credit card through a magnetic stripe reading device 742 and then the merchant can select an additional function 744.

The merchant may choose a function which prompts a MyNet™ SmartCard™ 746, SmartWallet[\T] 748 or SmartPurse™ 750 device to receive an infrared signal output by the MyNet™ SmarTerminal™ device 752. Thereafter, the HOME Account™ customer may complete her transaction in the manner referred to above in FIG. 15A. The HOME Account™ customer transaction, once approved by the customer, can be sent back to the MyNet™ SmarTerminal™ device by infrared signal 754. The MyNet™ SmarTerminal™ device then outputs the transactional data to the HOME Account™ banking network 756 and the merchant can select an additional function 744. The HOME Account™ network may, for example, connect to one or more credit card clearance networks, ATM networks or other electronic funds transfer or clearance networks.

The merchant may choose the power function 758, and a power off option appears on the screen 760. A verification of the power option is offered 762. If the merchant chooses to turn the MyNet™ SmarTerminal™ device off, the MyNet™ instrument becomes inactive 764. If the merchant decides not to turn the power off, the merchant may select an additional function 744.

Referring to FIG. 15D, operation of the HOME Account™ MyNet™ SmartBox™ device begins when the HOME Account™ customer turns on the power to the MyNet™ SmartBox™ device 766. The customer may then select one of several functions 768. There are, for example, eight illustrated functions from which the customer can choose. The customer may choose the home shopping function 770, and then a menu for home shopping appears on the screen 772. When the customer completes the transaction, she may select an additional function 774.

If the customer chooses the television control function 776, a menu for the television control appears on the screen 778. Once the transaction is complete, the customer may select an additional function 774. The financial information function 780 brings up a financial information screen 782. The input and output function 784 prompts the MyNet™ device to bring up an input/output menu 786. The customer may select an input/output function 788. The customer can choose to output voice, video, fax, image or data by infrared signal 790, and then select an additional function 744. The customer may choose to output to a standard RJ-11 telephone jack 792. The customer can opt to output voice, video, image, fax or data to a computer 794. The customer may also choose an input function 796.

The customer may choose a video camera function 798 which causes a video camera menu to appear on the screen 800. The HOME Account™ customer may choose a communication function 802. This transaction must be verified in the manner described in FIG. 14B. If the transaction is not verified, the transaction is denied 804 and the MyNet™ instrument becomes inactive 806. If the transaction is verified, a multi-function communication menu appears on the screen 808, and communication may be initiated 810. If the customer chooses a financial function 812, this transaction must also be verified as described in FIG. 14B. If the transaction is not verified, the transaction is denied 804 and the MyNet™ instrument becomes inactive 806. If the transaction is verified, a transaction may be initiated 814, a HOME Account™ financial transaction may be made and then the customer may select an additional function 774.

The customer may finally choose the power function 816 and a power-off option appears on screen 818. A power-off verification screen appears 820, and if the customer chooses to turn off the power of the MyNet™ instrument, it becomes inactive 806. If the customer does not turn the power off, she may select an additional function 744.

MyNet™ SmartPurse™ and SmartWallet™ Devices

Figure 16:
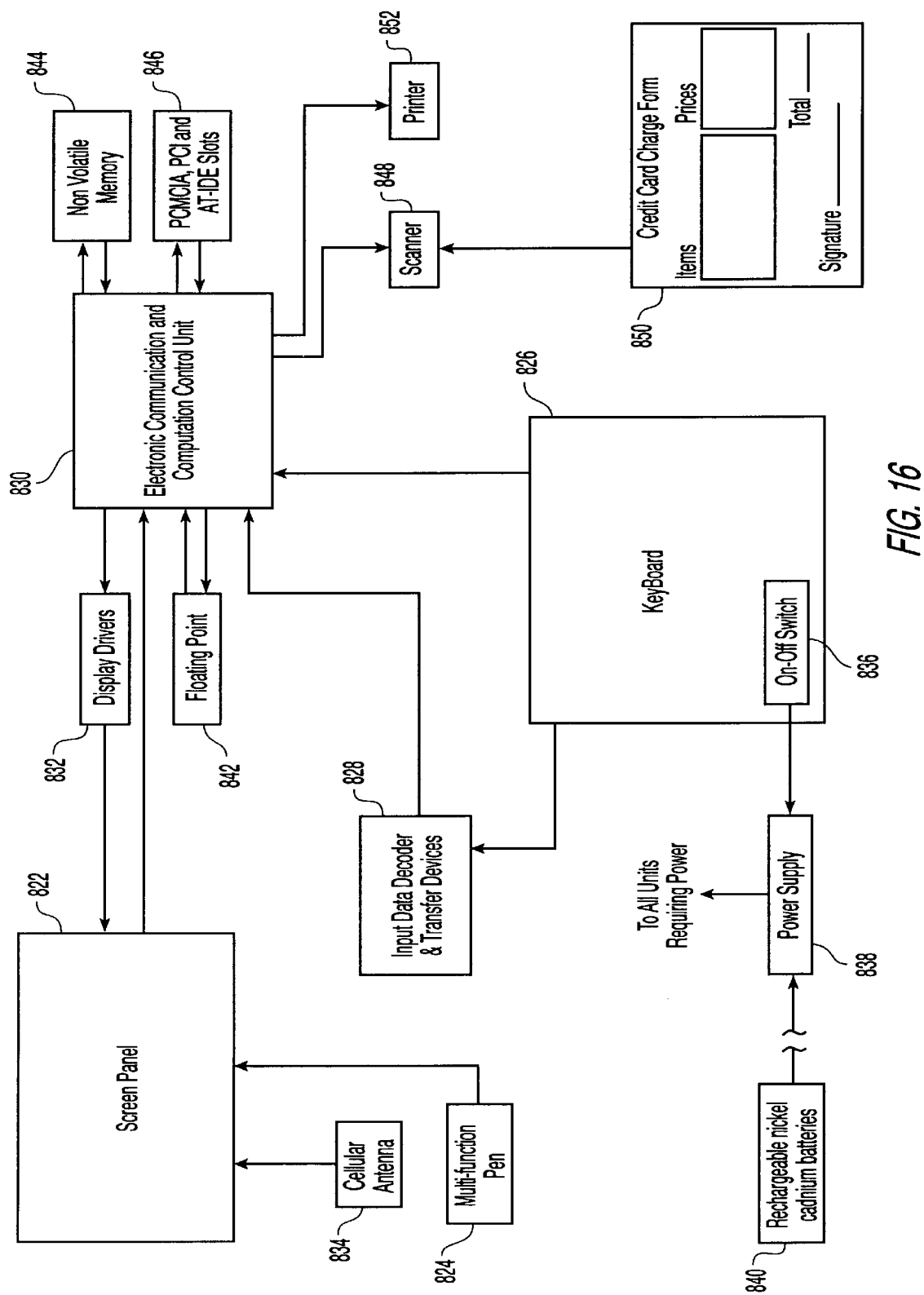
FIG. 16 illustrates a block diagram of a MyNet™ SmartPurse™, SmartWallet™ or SmartCard™ device.

Depicted in FIG. 16 is a block diagram of the MyNet™ SmartPurse™ and SmartWallet™ device illustrating the component parts of the device including input, output and external communications facilities of these MyNet™ devices. Although the device is novel, many components of the device are standard in the art, and it will be clear to those trained in the art that other components can be incorporated into the MyNet™ device to perform other duties.

A screen panel 822 is provided and receives input from a multi-function pen 824. Additional input into the Smart-Purse™ can come from a keyboard 826 or other input devices. Such alternative input is applied through an input data decoder and transfer unit 828 to an electronic communication and computation control unit 830 and, in turn, to display drivers 832 to create screen images. A cellular antenna 834 is also connected to the screen panel 822 and wired through to the electronic communication and computation control unit 830 to provide additional input.

The electronic communication and computation control unit 830 may also receive input directly from the keyboard 826. The keyboard 826 contains an on-off switch 836 which is directly connected to the power supply 838. Rechargeable nickel cadmium batteries 840 may be provided as an alternative power source. The input data decoder & transfer device 828 serves as an alternative path of input from the keyboard 826 to the electronic communication and computation control unit 830.

A floating point unit 842 is provided to perform floating point calculations for the electronic communication and computation control unit 830. A non-volatile memory 844 acts as storage for the electronic communication and computation control unit 830. PCMCIA, PCI and AT-IDE slots 846 give input to and receive input from the electronic communication and computation control unit 830.

A scanner 848 receives input from both the electronic communication and computation control unit 830 and a credit card charge form 850. Information from the credit card charge form 850 is obtained by scanning such form, check or other transaction form in order to perform both record keeping and reporting functions. A printer 852 receives input from the electronic communication and computation control unit and can produce hard copies of the transactions or print checks or credit card charge forms.

Figure 17:
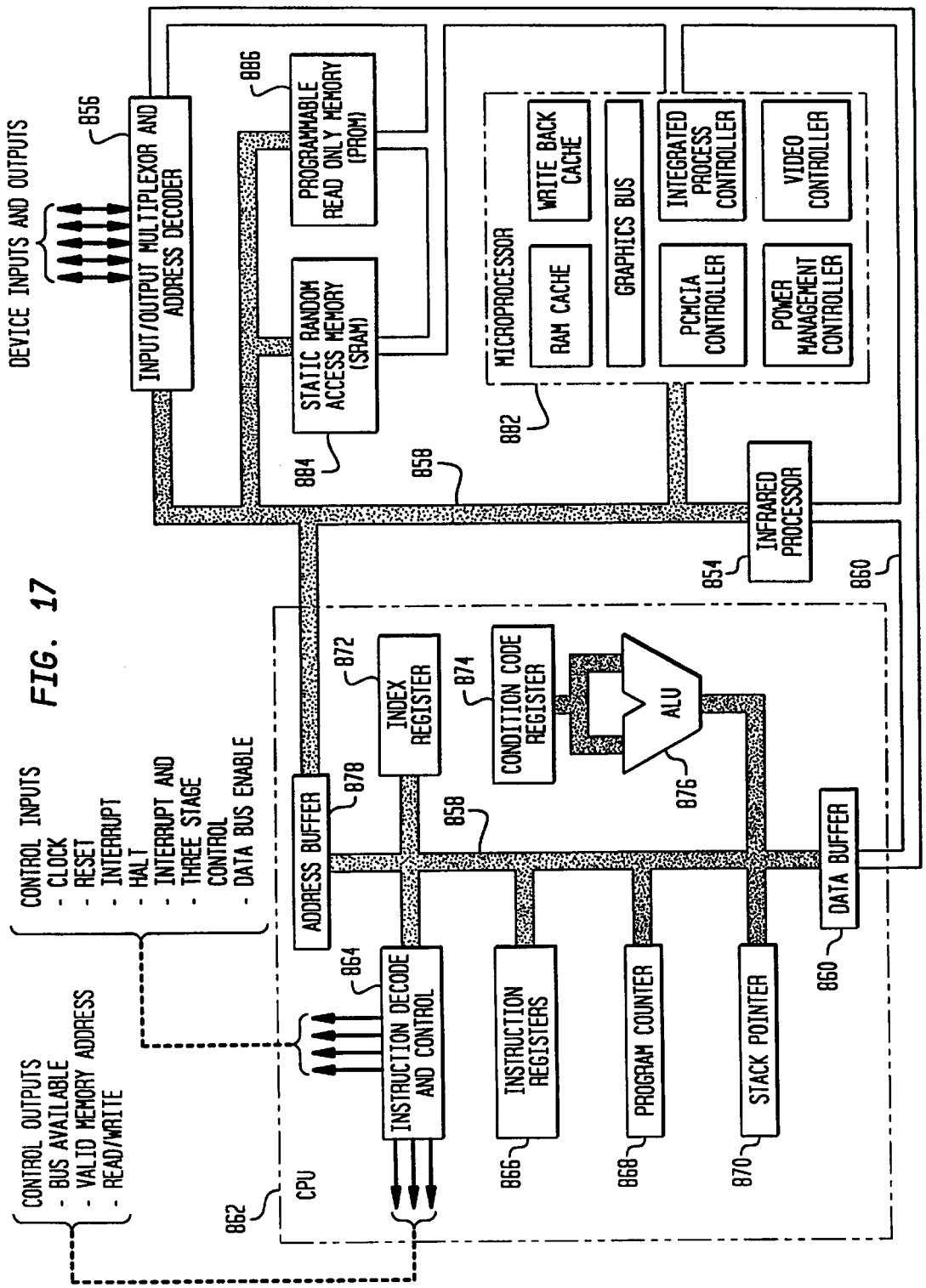
FIG. 17 illustrates a block diagram of the MyNet™ communication and computation control unit.

A more detailed depiction of the components of the MyNet™ SmartPurse™, SmartWallet™ and Smartcard™ device is provided in a block diagram of the MyNet™ Electronic Communication and Computation Control Unit set forth in FIG. 17. The unit incorporates a standard format which can be implemented in a variety of ways by those skilled in the art. The unit further includes an infrared processor 854 which performs digital computation and control for the MyNet™ device. The infrared processor 854 converts infrared signals into digital electrical signals to be processed.

The inputs and outputs of the device are channeled through an input/output multiplexer and address decoder 856 before the signals are sent to the various components. The inputs of each of the components of the unit are connected via an address bus 858 and the outputs are carried on a data bus 860.

A central processing unit (CPU) 862 performs the processing in the computation control unit. Within the CPU, the instruction decode and control component 864 receives instructions from an instruction register 866 which contains the program instructions for the unit. Component 864 decodes the instructions producing control signals for the other components. A program counter 868 contains the address of the instruction to be performed. A stack pointer 870 contains the address of the top of the stack. An index register 872 contains the index to the address to be indexed. A condition code register 874 contains the information to be acted upon. The arithmetic logic unit (ALU) 876 performs all mathematical and algorithmic functions. The CPU further includes an address buffer 878 and a data buffer 880.

A microprocessor 882 containing a RAM cache and a write back cache can retrieve information at a much faster rate if the information is stored in the cache. A graphics bus contained in the microprocessor yields the maximum speed in the transfer of graphics information. A power management controller regulates the power supplied to the units. A PCMCIA controller and integrated process controller regulate communications and processes. The video controller handles graphics and video and controls the PCMCIA and the integrated processes. The memory of the system consists of static random access memory 884, programmable read only memory 886 and/or other forms of memory used to store the information and instructions of the device.

Figure 18:
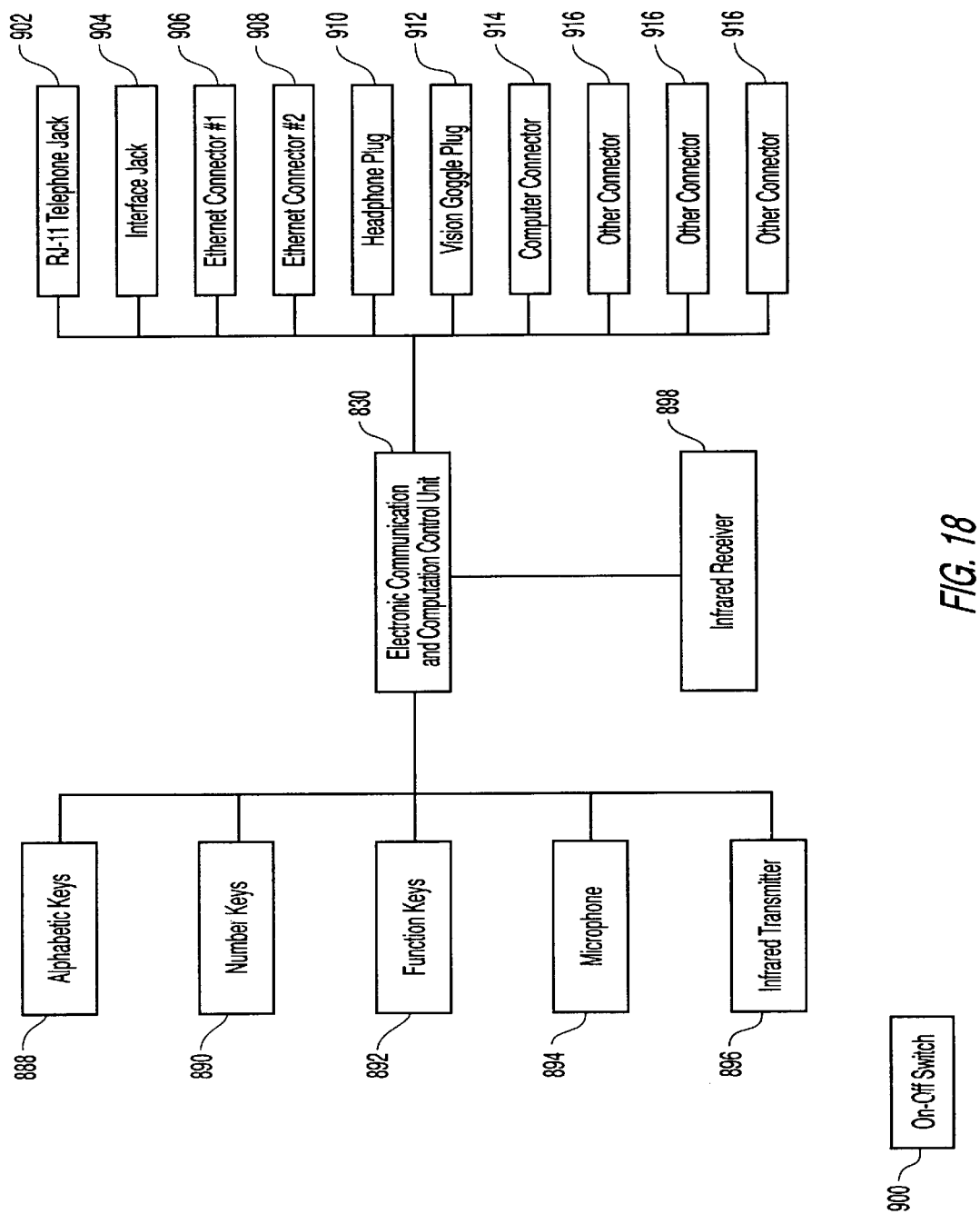
FIG. 18 illustrates a block diagram of a MyNet™ device.

FIG. 18 is a block diagram of the MyNet™ device indicating the essential input and output of the external communication facilities of the MyNet™ devices. Input can be made into the MyNet™ devices through alphabetic keys 888, number keys 890 and function keys 892. Additionally, a microphone 894 can be used to input information verbally or to respond to queries by the MyNet™ device. An infrared transmitter 896 can be used to input information remotely into the device or to remotely communicate with other facilities. An infrared receiver 898 is utilized to receive the infrared input. Other forms of input can be made, such as with video cameras, etc. An on-off switch 900 is used to turn on or off the MyNet™ devices.

Various external communication devices can be utilized with the MyNet™ facilities such as a RJ-11 telephone jack 902 and an interface jack 904. Ethernet connections for standard TCP/IP connections 906, 908, and a headphones plug 910 are included so that one can hear information conveyed from the MyNet™ device. Additionally, various types of vision goggle displays 912 can be used by individuals who do not wish to use a full-screen monitor in order to view the output from the MyNet™ device. Standard computer connections 914 through various types of SCSI, parallel, or serial ports can be used and other connectors 916 can be installed as necessary.

Figure 19:
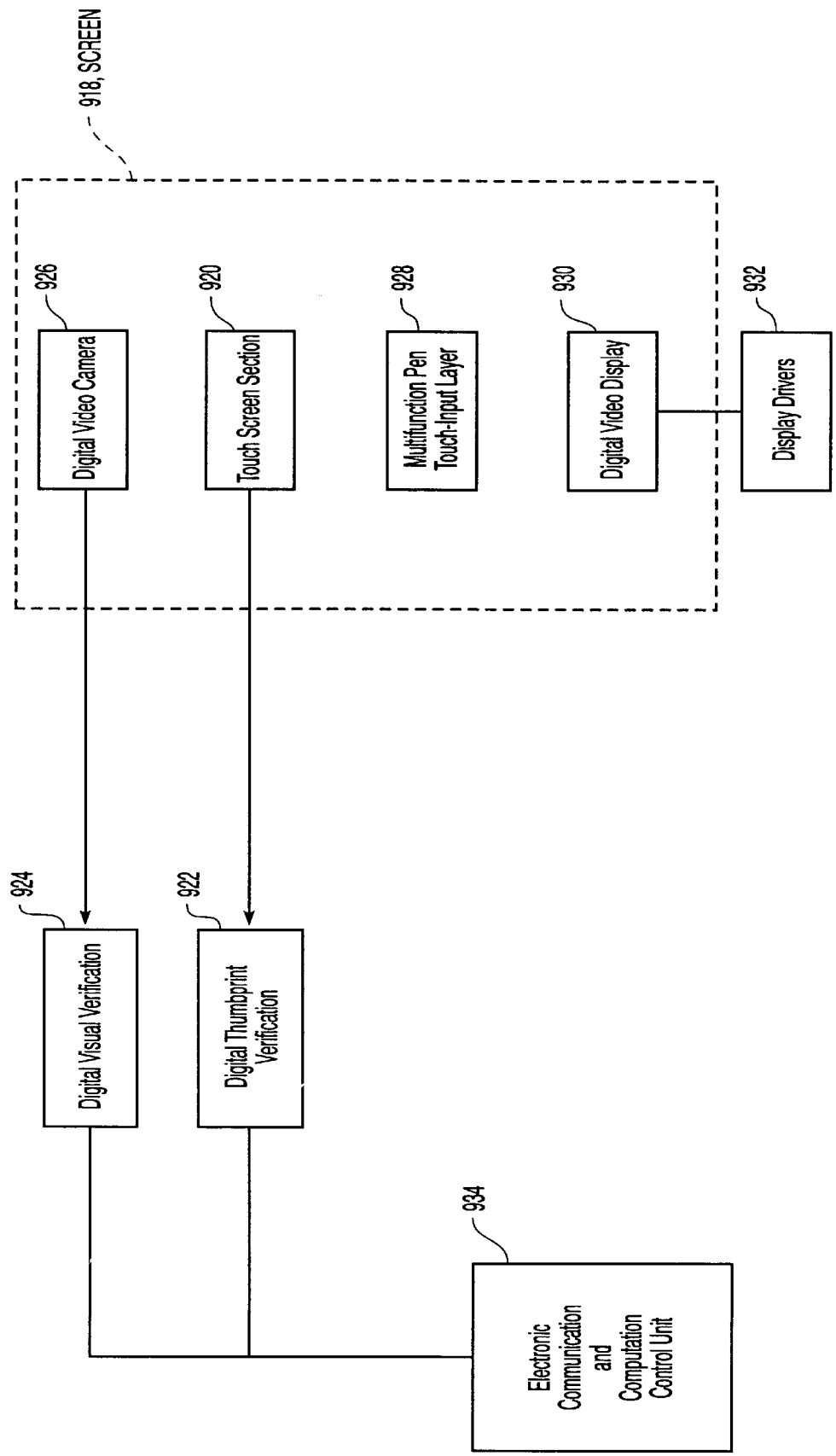
FIG. 19 illustrates a block diagram of the screen panel from an illustrative MyNet™ device.

FIG. 19 depicts a MyNet™ device screen panel block diagram. In the screen panel 918, a digital thumb print may be made on the MyNet™ device's touch screen section 920. In this way, the device can verify the identity of the individual through digital thumbprint verification 922. Additionally, there may be digital visual verification 924 through which a digital visual camera 926 on the screen could be used to view an individual's retina. This has been shown to definitively identify individuals.

A multifunction pen touch-input layer 928 may be utilized to input information into the device. Further, the MyNet™ devices include video displays which may be viewed through the MyNet™ screen's digital video display 930 by means of display drivers 932. The MyNet™'s electronic communication and computation control unit 934 may perform all of the necessary digital computation and give all control signals for the screen panel.

The SmartBox™ Device

Figure 21:
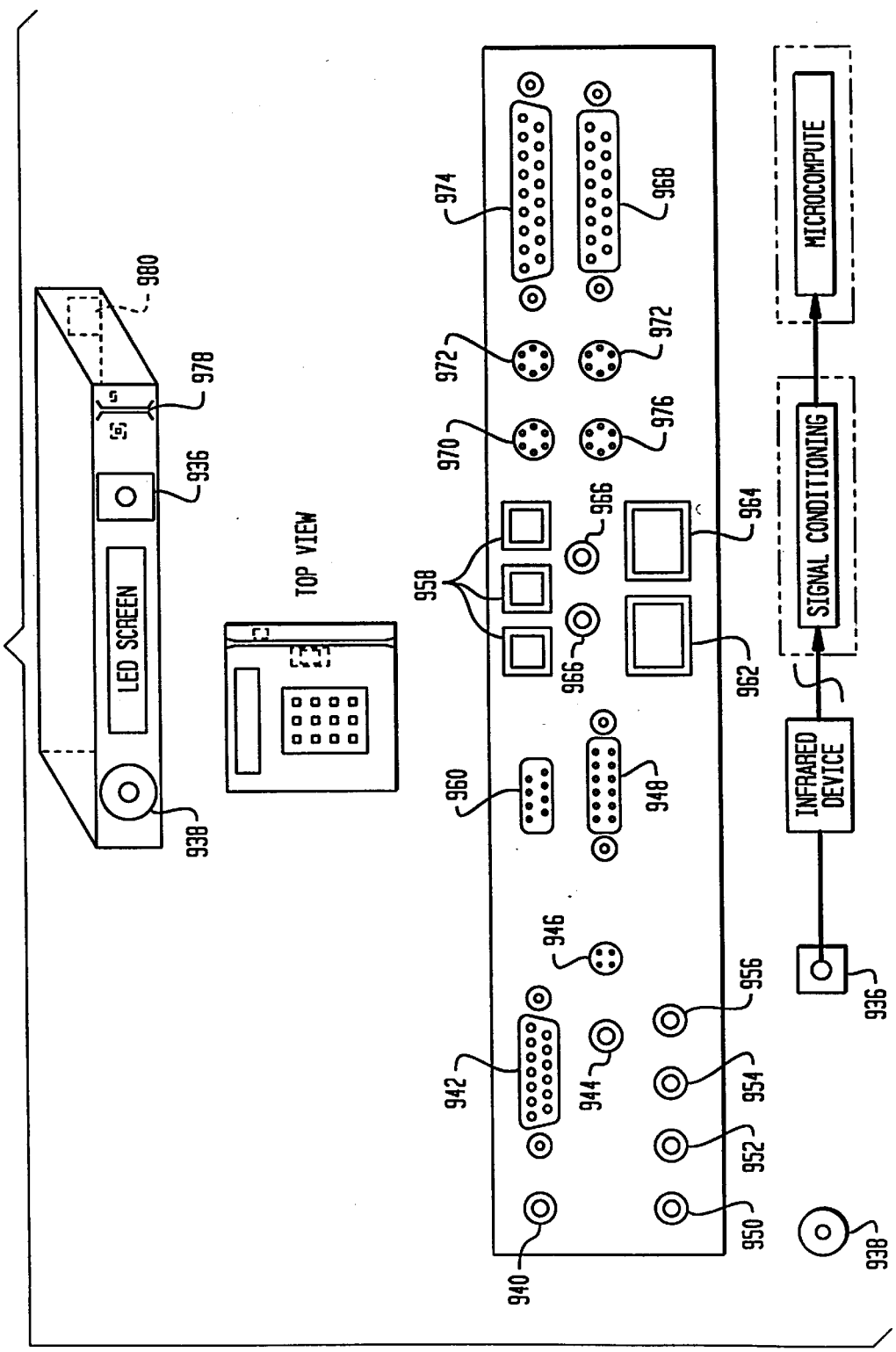
FIG. 21 illustrates a design of a MyNet™ SmartBox™ device.

FIG. 21 depicts a SmartBox™ device. An individual could acquire a SmartBox™ which connects into the HOME Account™ network and performs MyNet™ transactions from a television or computer in their home, office or any other location. The SmartBox™ device also performs the functions of a standard POS terminal which sends and receives infrared transmissions to devices through infrared send and receive apparatus 936.

A video recording could be made of the transaction by a digital video camera 938 and sent to a stereoview 940, a monitor 942, a composite video 944, an S-video 946, or video mail 948 through the various ports in the device. The SmartBox™ device could be connected to headphones 950 which monitor audio input through a microphone 952, analog stereo 954 or digital stereo 956.

In order to effect communications, the SmartBox™ device can be hooked up to regular phone lines through any one of three RJ11 connectors 958, or Ethernet through an Ethernet port 960, an ISDN port 962 or an Ethernet 10Base-T connector 964. Cable TV can be transmitted through the cable hook-up 966.

The SmartBox™ device can be connected to a computer through a SCSI-II connector 968, or it can act independently with a mouse 970 and its own duel serial ports 972, parallel port 974 and keyboard 976. The SmartBox™ device can read regular magnetic cards and SmartCards™ through a card slot 978 and can be attached to a printer through a printer port 980.

The Smartcard™ Device

Figure 22A:
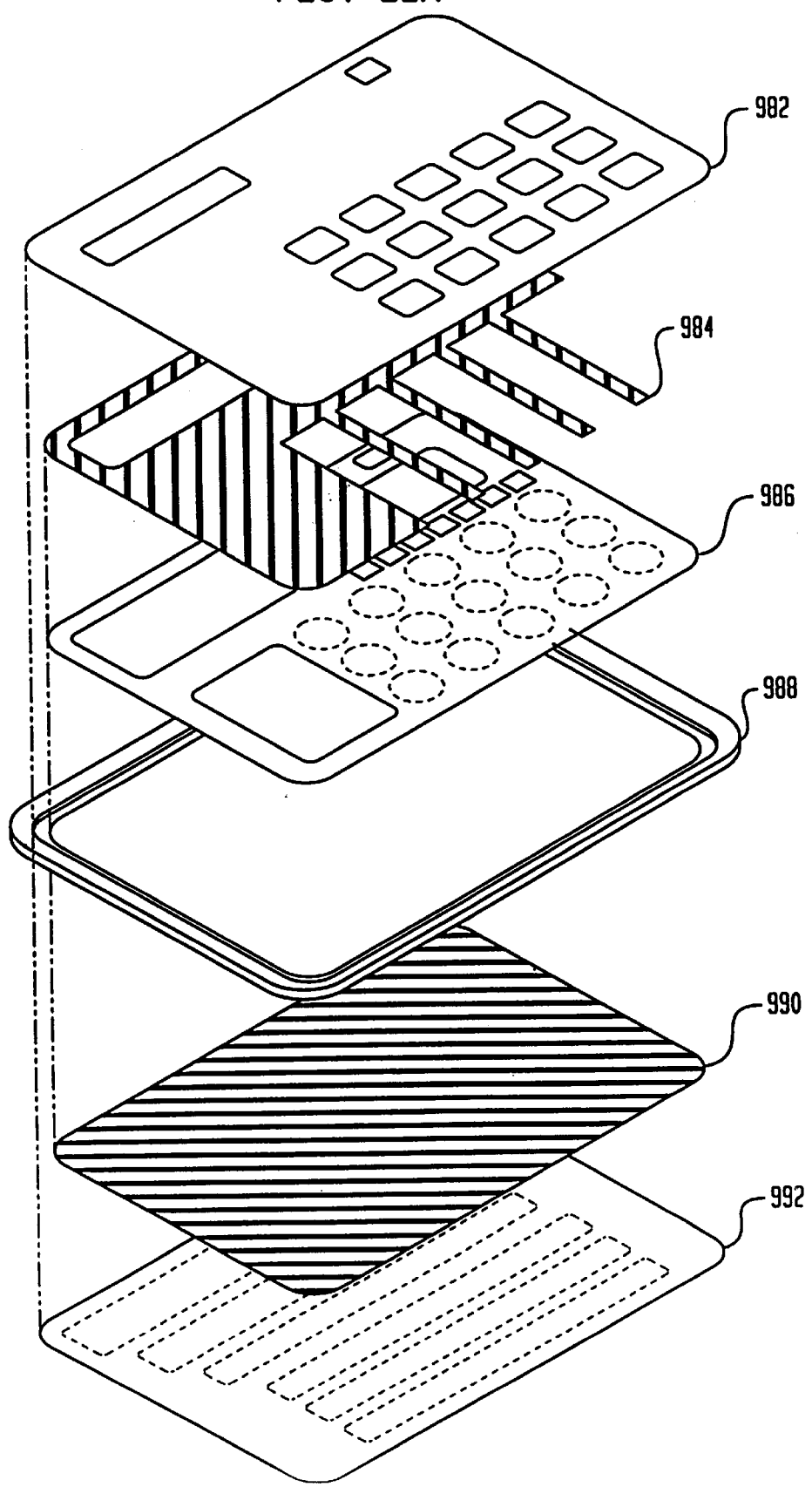
FIG. 22A, 22B, 22C, 22D illustrates the design of the MyNet™ SmartCard™ devices.

The layers of a generic form of the SmartCard™ are shown disassembled in FIG. 22A. The layers generally comprise a cover layer 982, an insulation layer 984, an electronics layer 986, a casing layer 988, a second insulation layer 990 and a back layer 992.

Figure 22B:
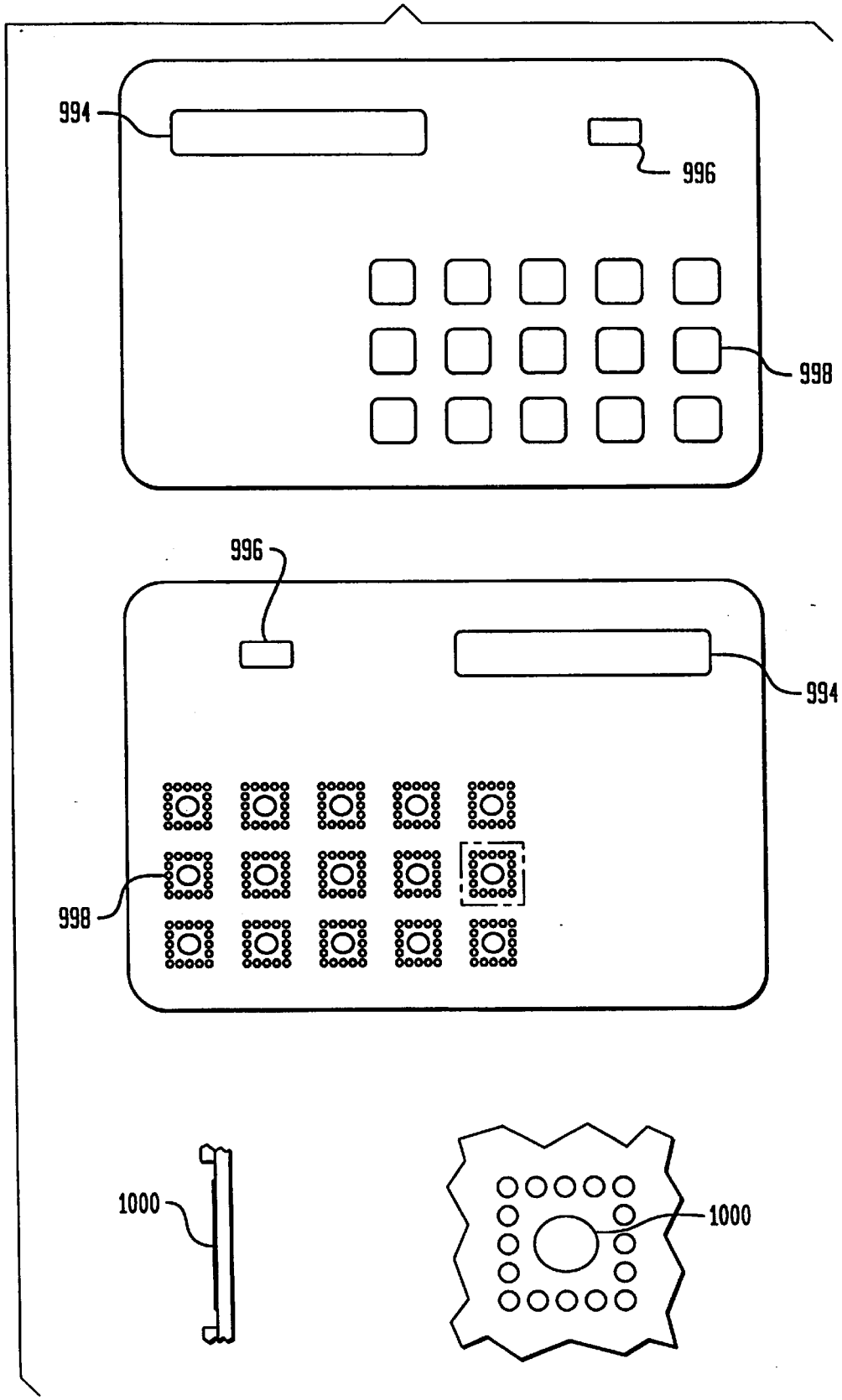

The cover layer 982 is depicted in FIG. 22B in both a frontal view and a back view. A screen display 994 allows for the viewing of the SmartCard™ screen. An infrared send and receive device is protected by the infrared send and receive opening cover 996 comprising a transparent covering that allows signals to penetrate and utilize the infrared send and receive device. Keys 998 are used to input data and are standard keypads with electronic contacts 1000.

Figure 22C:
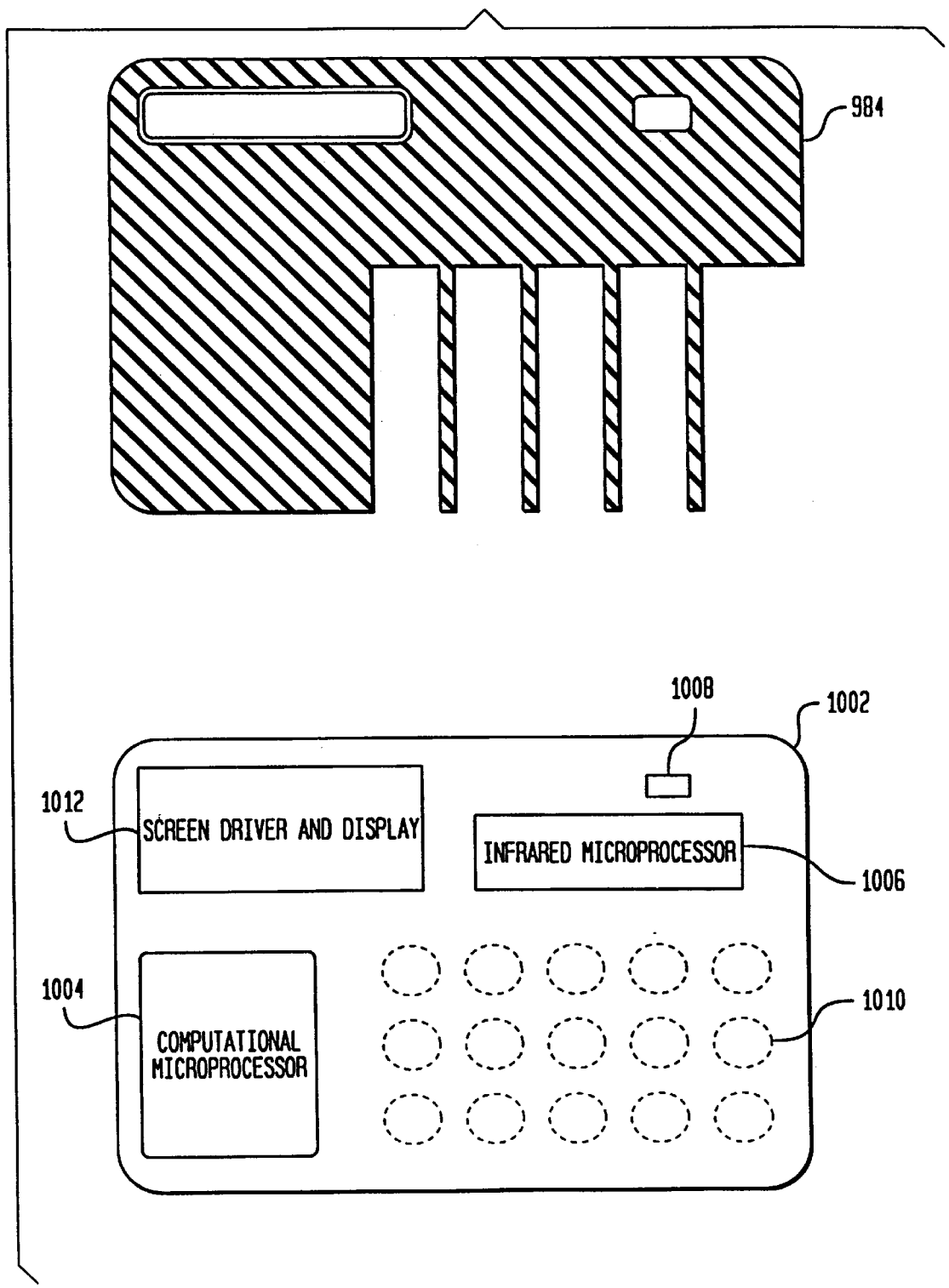

The insulation layer 984 is shown in FIG. 22C. It separates the microprocessor from the other components. In it, there are openings for the screen, the infrared device and the keys.

The electronics layer 986 contains the microprocessing units as well as the circuitry for the SmartCard™. A computational microprocessor 1004 is incorporated into the lower left corner of the board and acts as the main processor providing computational performances and screen driver information. An infrared microprocessor 1006 decodes the in-coming infrared signals and processes the coding of the out-going signals from the infrared send and receive device 1008. Key connections and wiring 1010 provide the input from the user to the computational microprocessor 1004. Additionally, a screen driver and display unit 1012 is included.

Figure 22D:
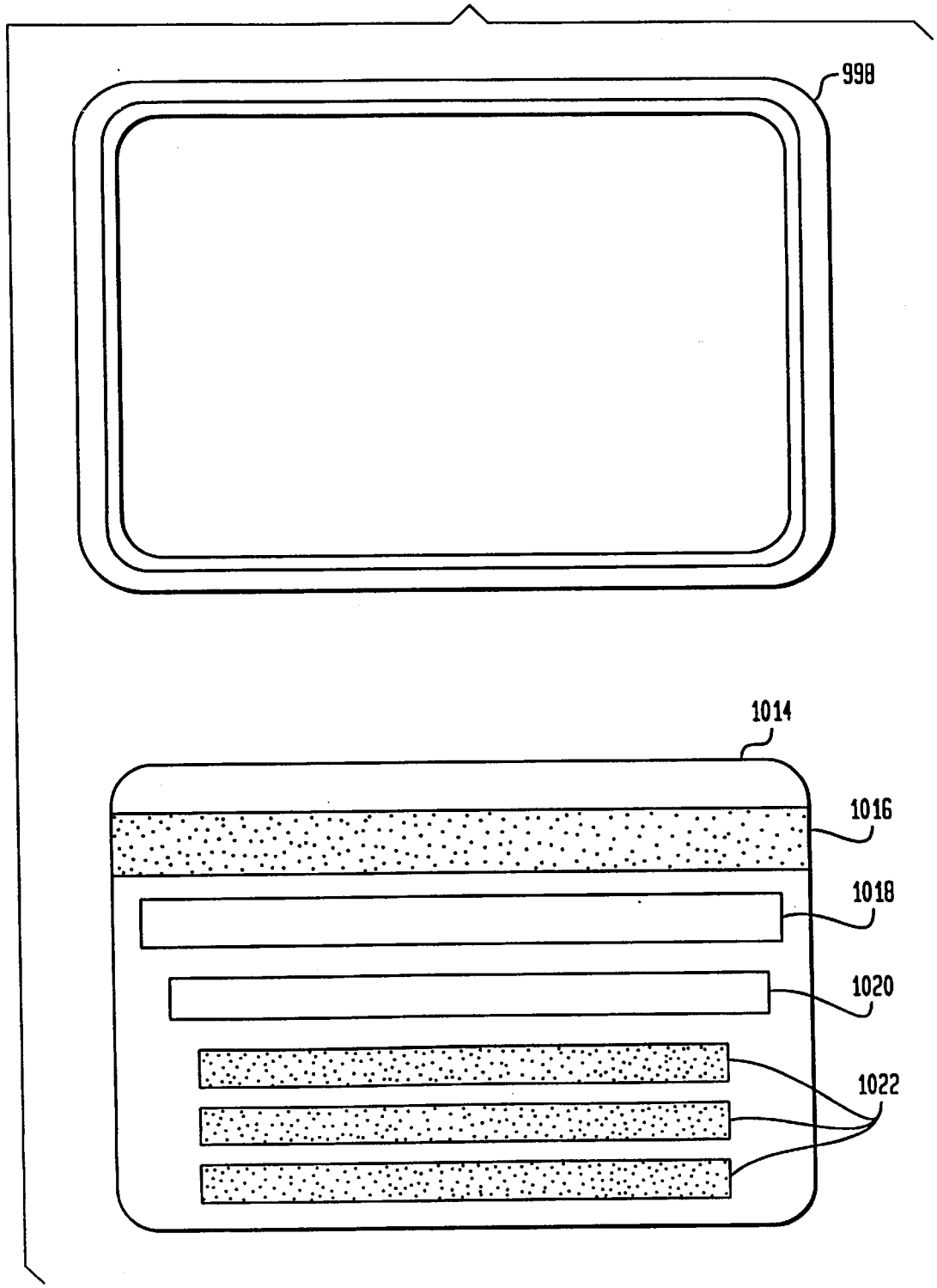

All the layers of the SmartCard™ are assembled with the casing layer 988 (FIG. 22D) and sealed with the back layer 1014 which contains magnetic strips 1016, a magnetically encoded identification strip 1018, a signature strip 1020, and several additional strips 1022 that can be encoded with various codes for the user.

Many of the processes described herein may be performed, in total or in part, by expert or decision support systems implemented by the financial institution. While the invention has been described in conjunction with specific embodiments, it is evident that without departing from the scope of the present invention numerous alternatives, modifications, variations and uses will be apparent to those skilled in the art in light of the foregoing description.

I claim:

1. A computer-based system for operating a plurality of client financial accounts comprising:

processing means;

memory means connected to said processing means for storing information pertaining to the client financial accounts;

means for maintaining in said memory means a database comprising for each client account at least one asset account which receives funds for investment purposes, said asset account having an account balance which is updated by the computer system upon receipt of said funds, and at least one loan secured by a mortgage on a home and one or more assets;

means for allocating said received funds among said accounts;

means for calculating a borrowing power for each client account, said borrowing power being equal to the sum of the product of the value of each asset and an asset to loan ratio, added to the product of the value of the home and a home loan to value ratio less any liabilities including any mortgage balance that may be present in the client account;

means for comparing said borrowing power calculated for each client account to a minimum established for that account;

means for reporting the relationship of the borrowing power to said minimum;

means for updating said borrowing power when changes occur in said asset and liability accounts;

an optimization program utilized to determine an improved allocation of funds received with respect to expected client utility: and a plurality of client computers, each client computer comprising:
means for communicating with said computer system;
means for limiting use of said client computer to one or more clients by one or more identification means; and
means for performing financial transactions which produce changes in a client's assets or liabilities.

2. The computer-based system of claim 1 further comprising a mortgage origination system comprising:

means for completing and verifying mortgage origination documentation;

means for determining an interest and principal payment schedule; and means for determining the adequacy of the security of the mortgage.

3. The computer-based system of claim 1 further comprising a mortgage servicing system comprising:

means for collection;

means for collateral monitoring and forecasting; and means for cash flow monitoring and forecasting.

4. The computer-based system of claim 3 wherein said means for collection comprises:

means for inputting an interest and amortization schedule into the mortgage servicing department's data file;

means for monitoring collection activities; and means for updating reports when collection has occurred or when failure of collection has occurred.

5. The computer-based system of claim 3 wherein said means for collateral monitoring and forecasting comprises:

means for determining whether a client's home equity is greater than a predetermined minimum home equity;

means for determining whether the expected future home equity is greater than a predetermined minimum future home equity;

means for collateralizing assets when the (future) home equity is less than the minimum (future) home equity; and means for reporting the imbalance.

6. The computer-based system of claim 3 wherein said means for cash flow monitoring and forecasting comprises:

means for determining whether any mortgage interest or amortization payment is past due and payable;

means for reporting the amount past due and any penalties;

means for determining whether the expected future return is greater than or equal to the expected future amortization and interest payments; and means for initiating an early warning process when the expected future return is less than the expected future amortization or interest payments.

7. The computer-based system of claim 1 further comprising means for processing a transaction comprising:

means for a client to order a transaction;

means for said transaction to be transmitted to said computer;

means for updating a client's borrowing power and expected future borrowing power based upon said transaction;

means for determining whether the newly calculated borrowing power is greater than a predetermined minimum borrowing power;

means for determining whether the expected future borrowing power is greater than it would be in the absence of the transaction; and means for generating a report indicating approval or denial of the transaction based upon borrowing power analysis.

8. The computer-based system of claim 1 further comprising a priority asset and liability allocation process comprising:

means for entering priority data into the system;

means for verifying said inputted data;

an optimization program used to establish a priority for the allocation of account funds;

means for reporting said priority; and means for updating said priority.

9. The computer-based system of claim 1 further comprising an early warning process comprising:

means for reporting a forecasted future imbalance;

means for determining a priority allocation of account funds to correct said imbalance; and means for reallocating said funds according to said determined priority allocation.

10. The computer-based system of claim 1 further comprising an account compliance routine comprising:

means for determining whether the client's borrowing power is less than a predetermined minimum borrowing power;

means for reporting the imbalance if the client's borrowing power is less than the minimum borrowing power;

means for determining an account reallocation or re-prioritization which would correct the problem if corrective action cannot be taken by the client; and means for liquidating the client's assets if a reallocation or re-prioritization cannot correct the problem.

11. The computer-based system of claim 1 further comprising an emergency liquidation procedure comprising:

means for reporting the initiation of the emergency liquidation procedure;

means for liquidating the client's assets;

means for paying off the client's liabilities based upon a predetermined priority;

means for terminating said liquidation when the borrowing power equals a predetermined minimum borrowing power.

12. The computer-based system of claim 1 further comprising a transaction verification procedure comprising:

means for a customer to initiate a transaction on a system-linked computer;

means for verifying the customer's identification prior to allowing access to the system;

means for determining whether the transaction is within predetermined parameters; and means for allowing the customer to verify the transaction.

13. The computer-based system of claim 1 wherein said each client computer comprises:

a screen panel;

an electronic communication and computation control unit which operates in cooperation with said screen panel;

a keyboard utilized to input information to said electronic communication and computation control unit;

memory means utilized to store information from and provide information to said electronic communication and computation control unit; and a power supply.

14. The computer-based system of claim 13 wherein said screen panel comprises devices which allow for communication with a user and identification of said user including a digital video camera, a touch screen section, a multifunction pen touch input layer and a digital video display.

15. The computer-based system of claim 13 wherein said electronic communication and computation control unit comprises:

a central processing unit; including an address buffer, an instruction decode and control unit, instruction registers, a program counter, a stack pointer, an index register, a condition code register, an arithmetic logic unit and a data buffer;

an input/output multiplexor and address decoder unit connected to said central processing unit via a data bus;

static random access memory and programmable read only memory connected to said central processing unit via said data bus;

a microprocessor connected to said central processing unit via said data bus including RAM cache, write-back cache, a graphics bus, a PCMCIA Controller, an integrated process controller, a power management controller and a video controller; and performing financial transactions which produce changes in a client's assets or liabilities.

16. A method for operating a plurality of client financial accounts comprising the steps of:

maintaining in said memory means a database comprising for each client account at least one asset account which receives funds for investment purposes, said asset account having an account balance which is updated upon receipt of said funds, and at least one loan secured by a mortgage on a home and one or more assets;

allocating said received funds among said accounts;

calculating a borrowing power for each client account, said borrowing power being equal to the sum of the product of a value of each asset and an asset to loan ratio, added to the product of the value of the home and a home loan to value ratio less any liabilities including any mortgage balance that may be present in the client account;

comparing said borrowing power calculated for each client account to a minimum established for that account;

reporting the relationship of the borrowing power to said minimum;

updating said borrowing power when changes occur in said asset and liability accounts;

determining an improved allocation of funds received with respect to client utility; and utilizing a plurality of client computers in cooperation with said accounts comprising the steps of:
communicating with said accounts;
limiting use of said client computer to one or more clients by one or more identification means; and
performing financial transactions which produce changes in a client's assets or liabilities in accordance with said improved allocation.

17. An integrated computer-based system for storing, processing and reporting information concerning a plurality of client financial accounts comprising:

processing means;

memory means connected to said processing means for storing information pertaining to the client financial accounts;

means for maintaining in said memory means data concerning said client financial accounts in a relational data base wherein the data base comprises tables, each table having a domain of at least one attribute in common with at least one other table, said tables comprising:

tables for storing general and personal information about the client;

tables for storing asset account information;

tables for storing liability account information;

tables for storing account balances;

tables for storing operating limitations of the account; and tables for storing system status reports; and an optimization program utilized to determine an improved allocation of funds received in said client financial accounts with respect to expected client utility.

18. The computer-based system of claim 17 wherein said table for storing general and personal information about the client comprises client name, client address, client telephone number and client credit history.

19. The computer-based system of claim 17 wherein said table for storing asset account information comprises type of asset, asset identification indicia, asset account access information, current asset value and projected asset value.

20. The computer-based system of claim 17 wherein said table for storing liability account information comprises type of liability, liability access information, date of origination of liability, liability balance and liability interest rate.

21. The computer-based system of claim 17 wherein said table for storing account balance information comprises asset totals and liability totals.

22. The computer-based system of claim 17 wherein said table for storing operating limitations of the account comprises minimum balances, minimum net cash flow, minimum borrowing power and financial ratios.

23. The computer-based system of claim 17 wherein said table for storing status report information comprises client reports, account manager reports, account supervisor reports and account servicing department reports.

* * * * *